(12) United States Patent
Maeda et al.

(10) Patent No.: US 6,829,674 B2
(45) Date of Patent: *Dec. 7, 2004

(54) SEMICONDUCTOR MEMORY CARD ACCESS APPARATUS, A COMPUTER-READABLE RECORDING MEDIUM, AN INITIALIZATION METHOD, AND A SEMICONDUCTOR MEMORY CARD

(75) Inventors: Takuji Maeda, Shijonawate (JP); Teruto Hirota, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/444,966

(22) Filed: May 27, 2003

(65) Prior Publication Data

US 2003/0200411 A1 Oct. 23, 2003

Related U.S. Application Data

(62) Division of application No. 09/691,269, filed on Oct. 19, 2000, now Pat. No. 6,611,907.

(30) Foreign Application Priority Data

Oct. 21, 1999 (JP) .......................................... 11-299636

(51) Int. Cl.$^7$ ................................................. G06F 12/00
(52) U.S. Cl. ........................ 711/103; 711/170; 711/112; 711/208; 711/4
(58) Field of Search ................................. 711/103, 170, 711/203, 204, 112, 165, 208, 209, 206, 200, 202, 201; 714/8; 365/185.33, 185.11, 230.01, 230.03; 713/2, 100

(56) References Cited

U.S. PATENT DOCUMENTS

| 6,125,435 | A | 9/2000 | Estakhri et al. ............. 711/200 |
|---|---|---|---|
| 6,182,188 | B1 | 1/2001 | Hasbun et al. ............... 711/102 |
| 6,411,552 | B1 | 6/2002 | Chiba ...................... 365/185.33 |
| 6,426,893 | B1 * | 7/2002 | Conley et al. .......... 365/185.11 |
| 6,449,716 | B1 * | 9/2002 | Rickey ........................... 713/2 |
| 6,651,135 | B2 * | 11/2003 | Ito et al. ..................... 711/112 |

FOREIGN PATENT DOCUMENTS

| EP | 0 392 895 A | 10/1990 | |
|---|---|---|---|
| EP | 1 050 887 A | 11/2000 | |
| JP | 7-219720 | 8/1995 | |
| JP | 2001188701 A * | 7/2001 | ........... G06F/12/00 |
| WO | 99/27453 | 6/1999 | |

* cited by examiner

Primary Examiner—Pierre Bataille
(74) Attorney, Agent, or Firm—Wenderoth, Lind & Ponack, L.L.P.

(57) ABSTRACT

A predetermined number of erasable blocks positioned at a start of a volume area in a semiconductor memory card are provided so as to include volume management information. A user area following the volume management information includes a plurality of clusters. A data length NOM of an area from a master boot record & partition table sector to a partition boot sector is determined so that the plurality of clusters in the user area are not arranged so as to straddle erasable block boundaries. Since cluster boundaries and erasable block boundaries in the user area are aligned, there is no need to perform wasteful processing in which two erasable blocks are erased to rewrite one cluster.

19 Claims, 38 Drawing Sheets

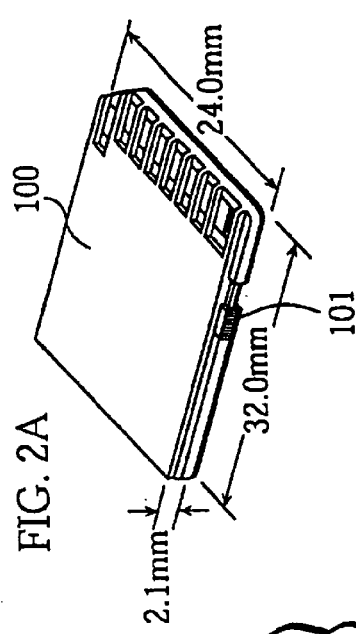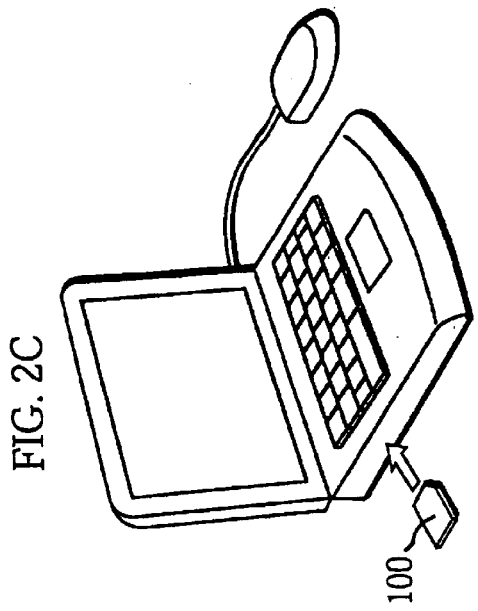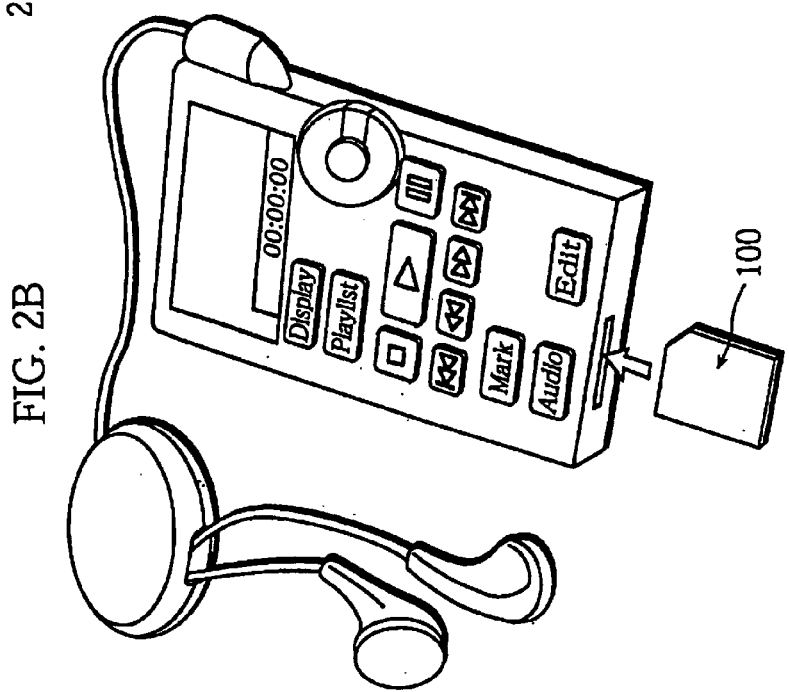

FIG. 6B

| Field Name | Contents |
|---|---|
| Jump Command | 0xEB,0x00,0x90 |
| Creating System Identifier | "SYSTEMID" |
| Sector Size | 512 |
| Sectors per Cluster | 32 |
| Reserved Sector Count | 1 |
| Number of FATs | 2 |
| Number of Root-directory Entries | 512 |
| Total Sectors | 0 |
| Medium Identifier | 0xF8 |
| Sectors per FAT | 12 |
| Sectors per Track | 32 |
| Number of Sides | 8 |
| Number of Hidden Sectors | 39 |
| Total Sectors | 129753 |
| Physical Disk Numbers | 0x80 |
| Extended Boot Record Signature | 0x29 |
| Volume ID Number | 0x01234567 |
| Volume Label | "VOLUME1" |
| File System Type | "FAT12" |
| Signature Word | 0x55aa |

PARTITION BOOT SECTOR n=1 n=16

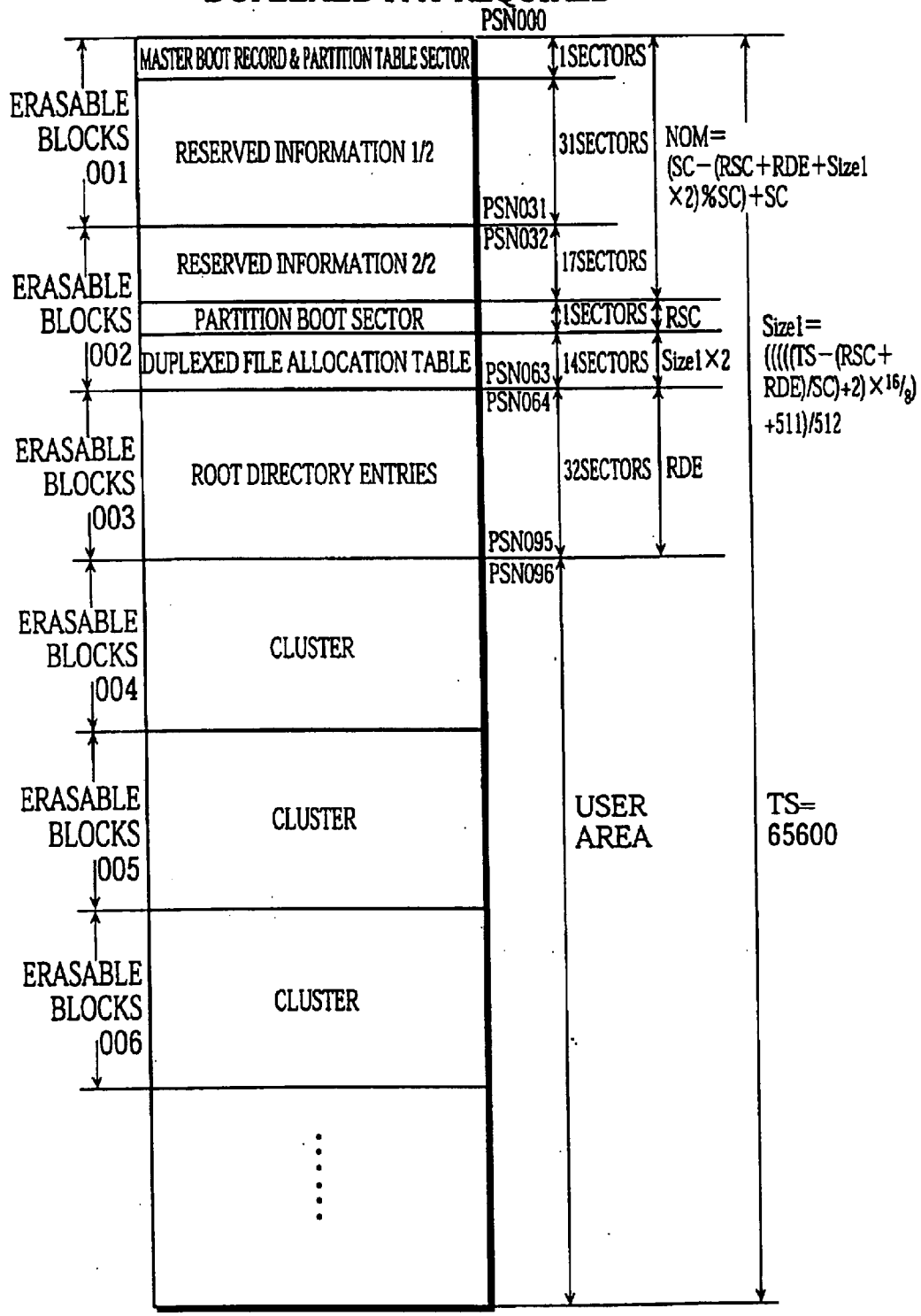
FIG. 12 FORMAT WHEN CLUSTER SIZE IS 16KB(n=1), SIZE TS IS 65600 SECTORS AND A DUPLEXED FAT REQUIRED FIG. 17 LAYOUT OF USER DATA AREA WHEN CLUSTER SIZE IS 16KB(n=1) AND TS IS SET AT 124160 SECTORS LAYOUT OF PROTECTED AREA WHEN CLUSTER SIZE IS 16KB(n=16), AND TS IS SET AT 1280 SECTORS

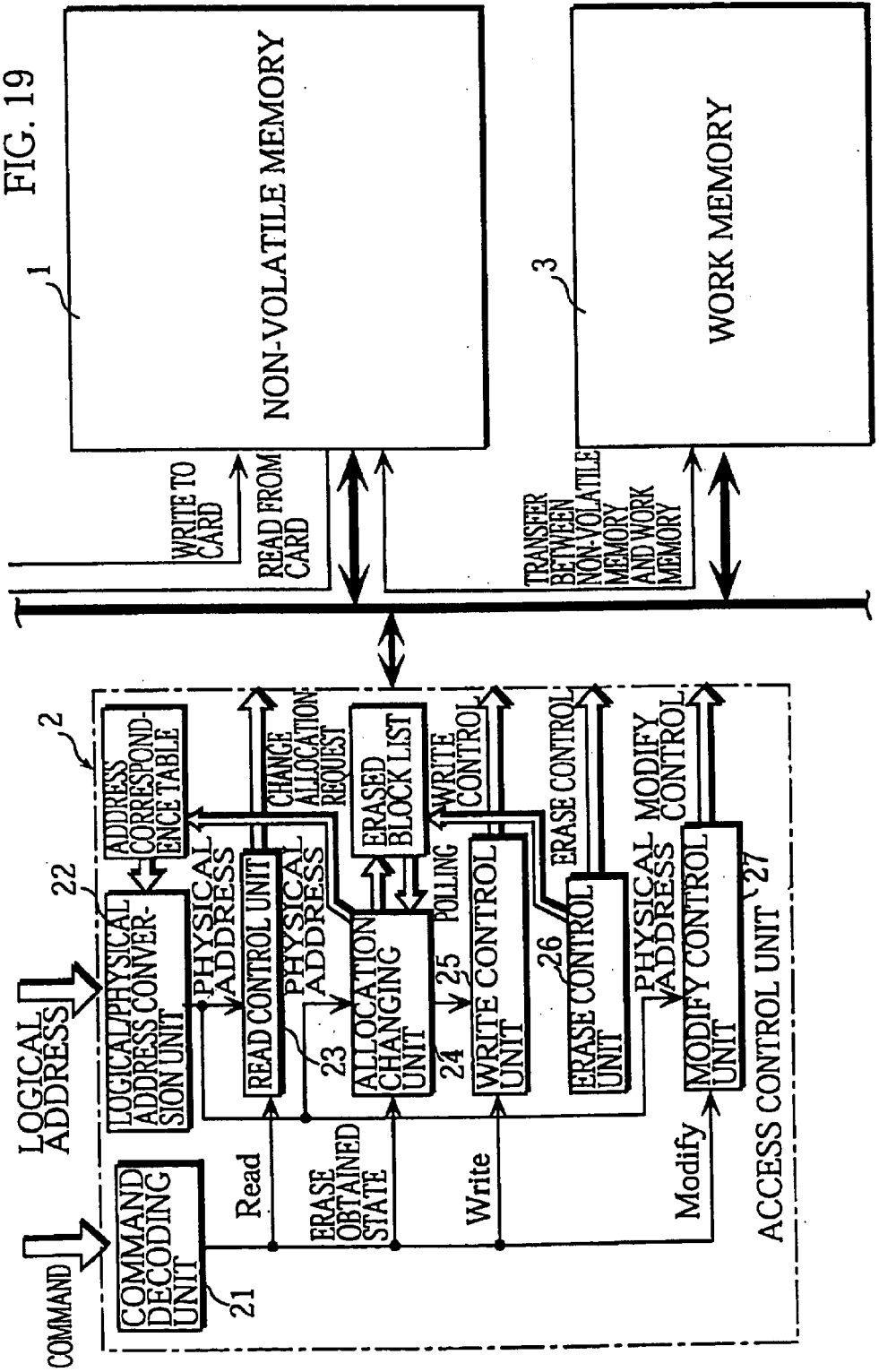

FIG. 20A　WHEN MODIFYING BLOCK 001
(Read & Modify & Write)
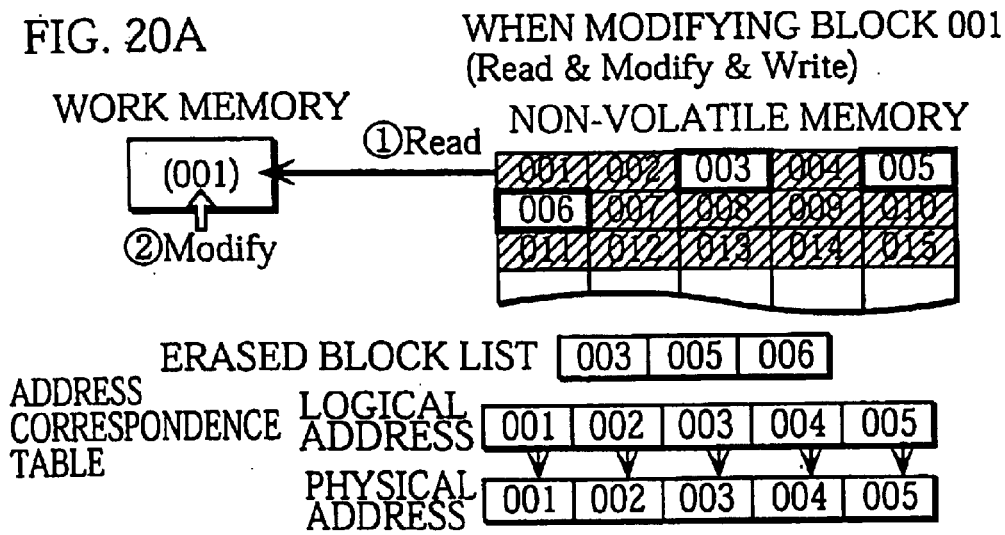
FIG. 20B
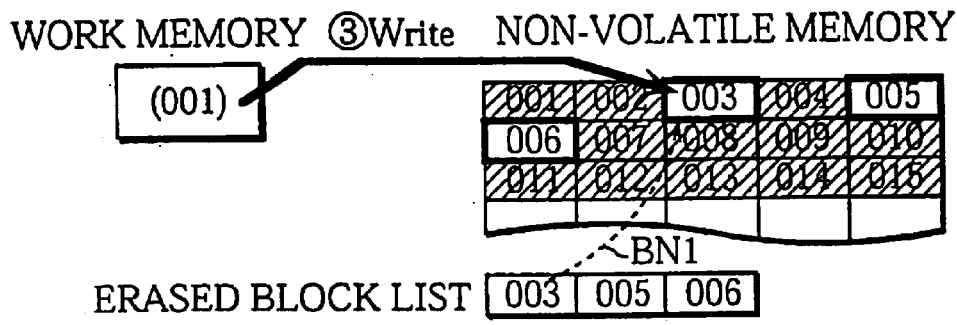
FIG. 20C
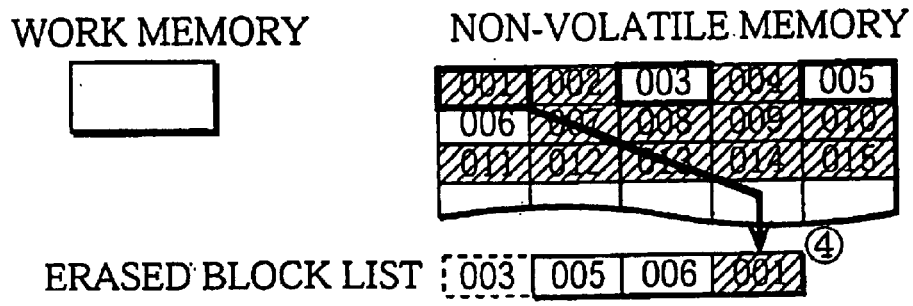
FIG. 20D
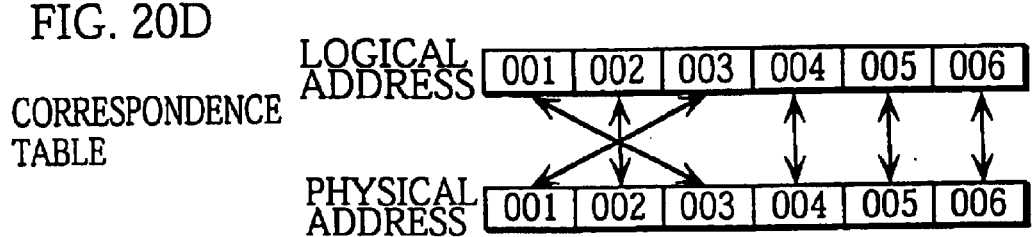

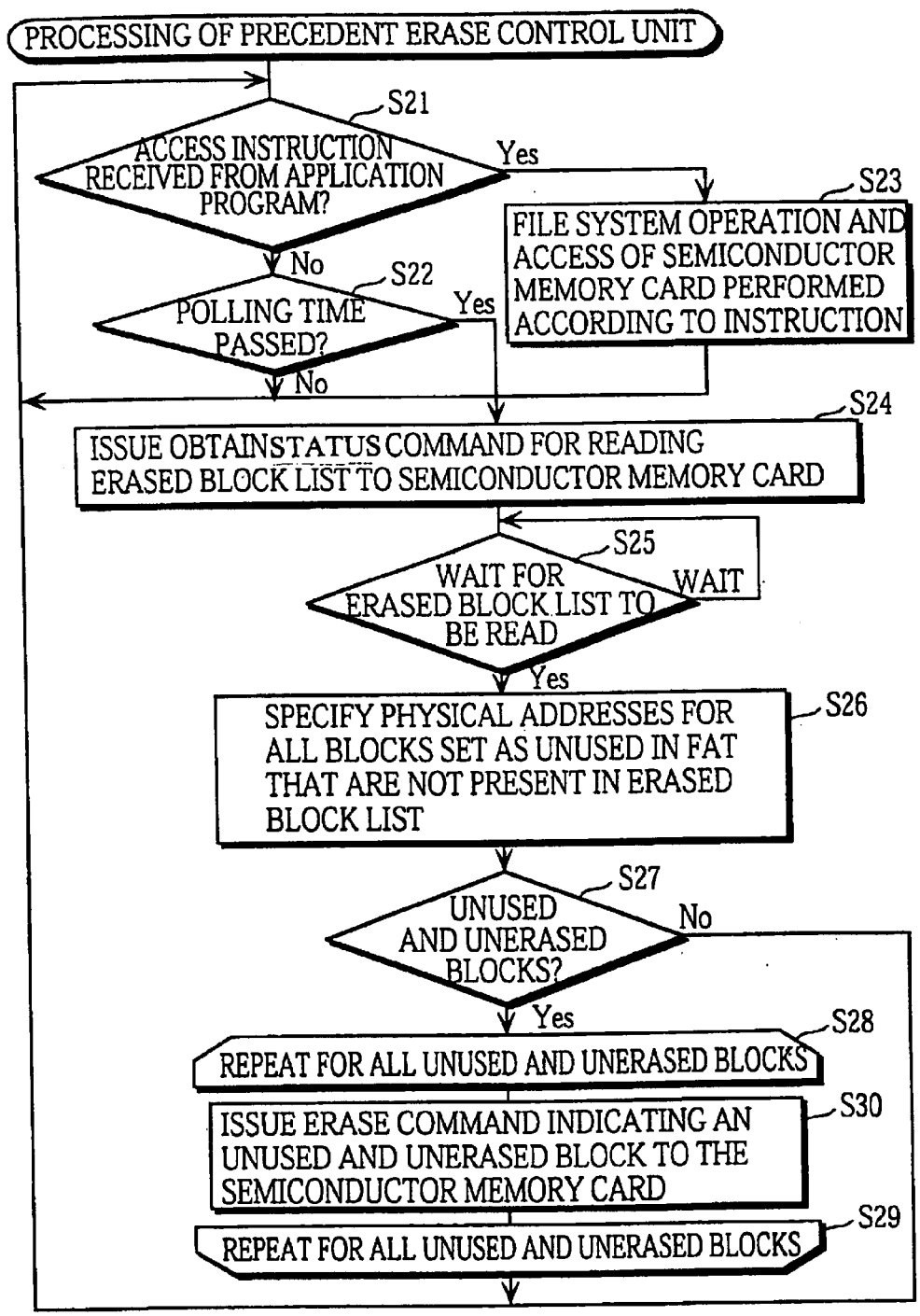

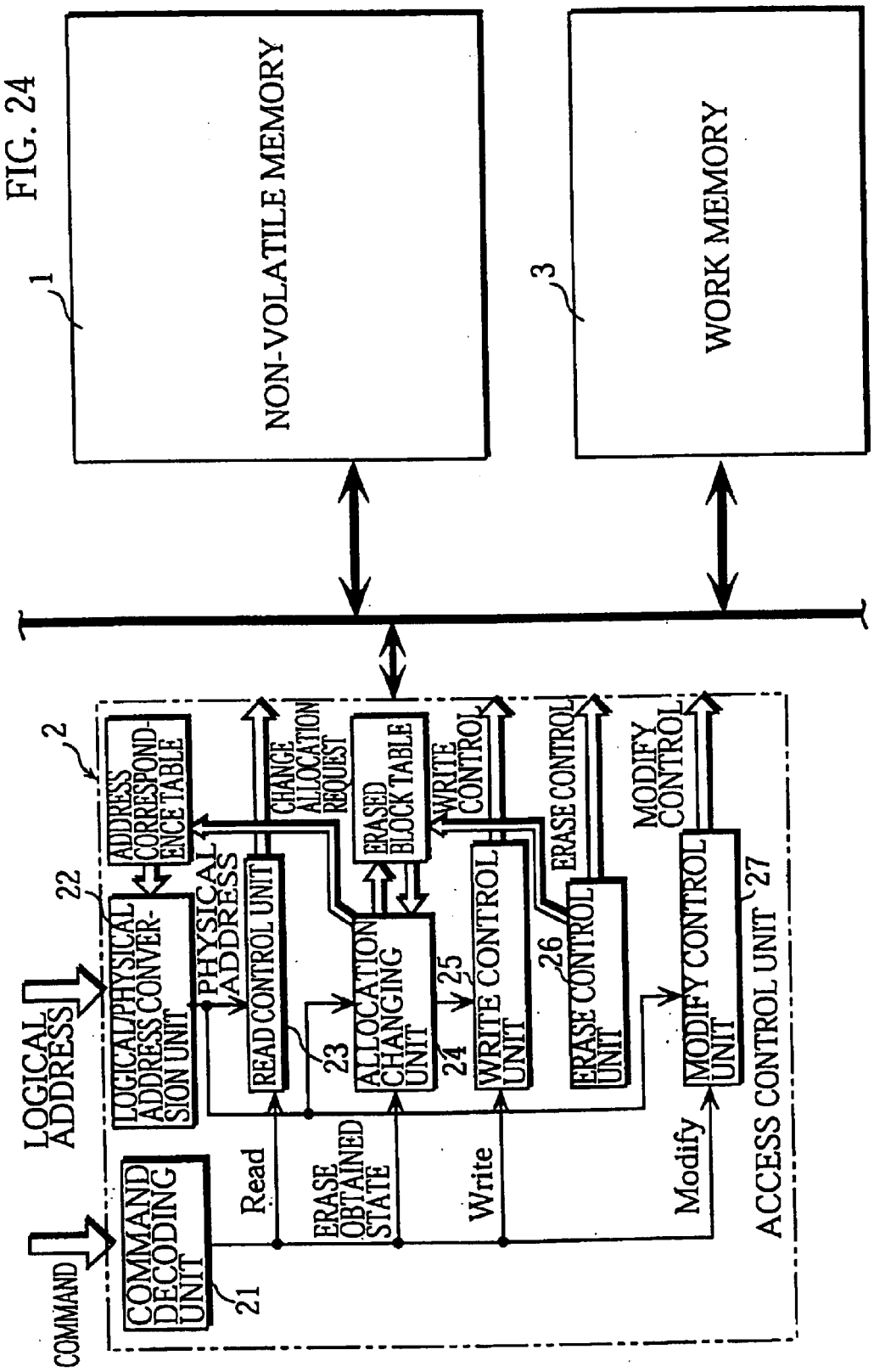

EXAMPLE OF NON-CONSECUTIVE MEMORY

EXAMPLE OF CONSECUTIVE MEMORY

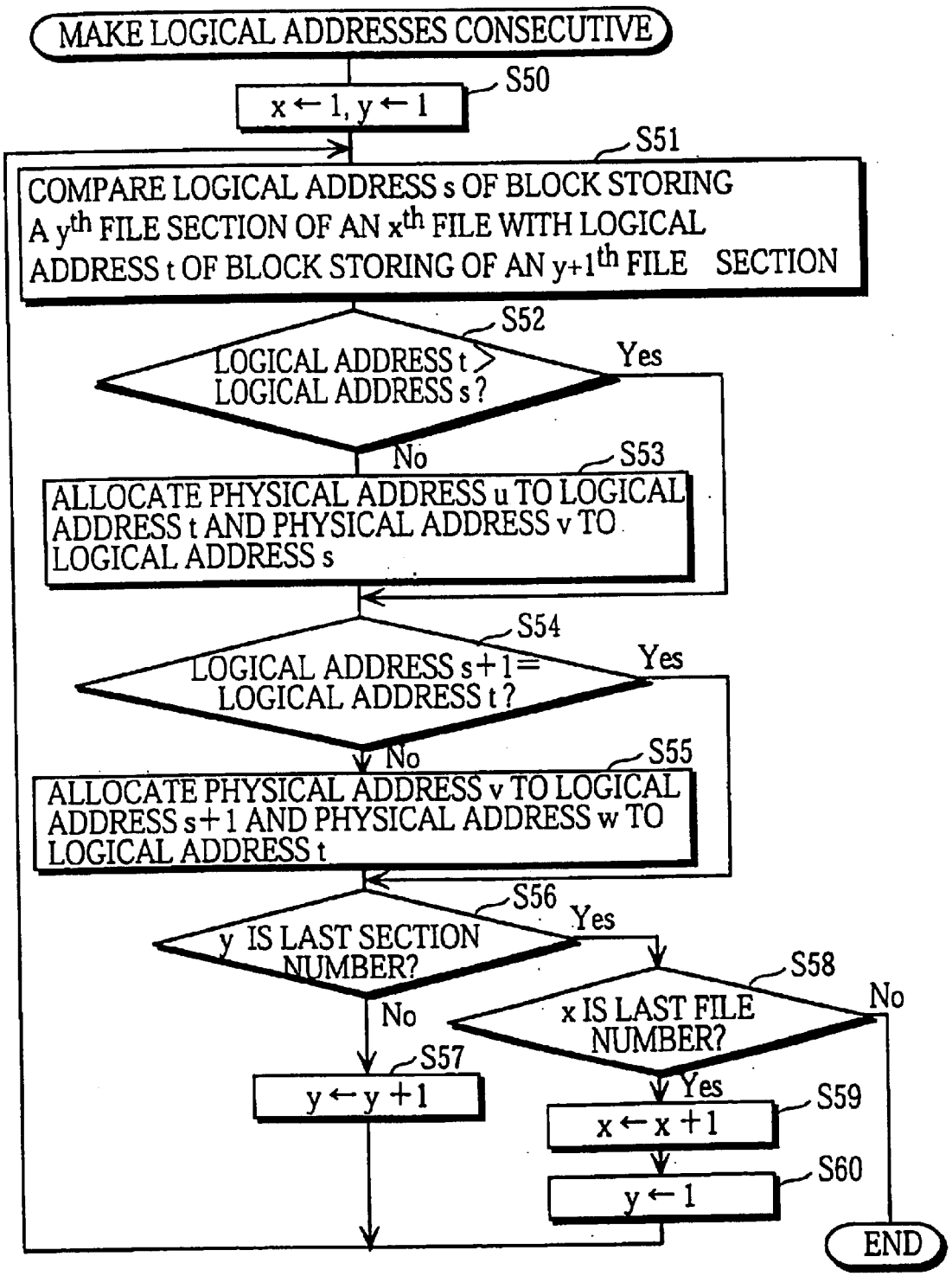

t > s

WHEN t = s +1

WHEN t ≠ s +1

FIG. 34A

USER AREA

| ADDRESS | |
|---|---|
| 0000 | file1 |
| 0001 | file2 |
| 0002 | file1 |
| 0003 | file1 |
| 0004 | file2 |
| 0005 | file3 |
| 0006 | file4 |

BLOCK ATTRIBUTE TABLE

| | |
|---|---|
| 0000 | 0 |
| 0001 | 0 |
| 0002 | 0 |
| 0003 | 0 |
| 0004 | 0 |
| 0005 | 0 |
| 0006 | 0 |

FIG. 34B

USER AREA

| | |
|---|---|
| 0000 | file1 |
| 0001 | file2 |
| 0002 | file1 |
| 0003 | file1 |
| 0004 | file2 |
| 0005 | file3 |
| 0006 | file4 |

SET WRITE PROHIBITED ATTRIBUTE

BLOCK ATTRIBUTE TABLE

| | |
|---|---|
| 0000 | 1 |
| 0001 | 0 |
| 0002 | 1 |
| 0003 | 1 |
| 0004 | 0 |
| 0005 | 0 |
| 0006 | 0 |

SET WRITE PROHIBITED ATTRIBUTE

FIG. 34C

USER AREA

| | |
|---|---|
| 0000 | file1 |
| 0001 | file2 |
| 0002 | file1 |
| 0003 | file1 |
| 0004 | file2 |
| 0005 | file3 |
| 0006 | file4 |

SET READ PROHIBITED ATTRIBUTE

BLOCK ATTRIBUTE TABLE

| | |
|---|---|
| 0000 | |
| 0001 | 2 |
| 0002 | 1 |
| 0003 | 1 |
| 0004 | 2 |
| 0005 | 0 |
| 0006 | 0 |

SET READ PROHIBITED ATTRIBUTE

SEMICONDUCTOR MEMORY CARD ACCESS APPARATUS, A COMPUTER-READABLE RECORDING MEDIUM, AN INITIALIZATION METHOD, AND A SEMICONDUCTOR MEMORY CARD

This application is based on an application No. 11-299636 filed in Japan, the content of which is hereby incorporated by reference.

This application is a divisional application of U.S. patent application Ser. No. 09/691,269, filed Oct. 19, 2000 now U.S. Pat. No. 6,611,907.

BACKGROUND OF THE INVENTION

1. Field of the Invention

The present invention relates to an access apparatus for accessing a semiconductor memory card having internal nonvolatile memory such as EEPROM (electrical erasable programmable read-only memory), a computer-readable recording medium for recording an initialization program for a semiconductor memory card, an initialization method, and a semiconductor memory card, and in particular to an improvement for raising the efficiency with which data can be rewritten in the nonvolatile memory.

2. Description of the Background Art

Semiconductor memory cards have the advantage of being small and lightweight, and are well on the way to consolidating their position as the recording medium of choice in a wide variety of technical fields. A semiconductor memory card has an internalized nonvolatile memory known as EEPROM, which is accessed by a connected device, enabling the semiconductor memory card to be used as a recording medium. Data can be directly written into blank EEPROM sectors in the same way as for magnetic or optical discs. However, when EEPROM sectors already contain data, this data has to be deleted, returning the sectors to a blank state, before new data can be written into the sectors. In the type of EEPROM known as NAND (Not And) used in many semiconductor memory cards, the operation for returning sectors to a blank state has to be performed on 32 sectors at one time (in this nonvolatile memory, a group of 32 sectors is known as an erasable block). Consequently, the semiconductor memory card contains a specialized internal control circuit for realizing memory management using erasable blocks as access units. Status control of erasable blocks, and reading and writing of data to/from erasable blocks, is managed by this control circuit.

This means that the semiconductor memory card has a unique hardware structure (physical layer) that is completely different from that used in magnetic and optical discs. However, a layer model shown in FIG. 1A is formed from physical, file system, and application layers in the same way as in a magnetic or optical disc. FIG. 1B shows a detailed layout of the physical layer. In the drawing, the physical layer includes a volume area in which a plurality of erasable blocks are arranged. Each erasable block is formed from 32 sectors and has a data length of 16 KB. The layout of the file system layer shown in FIG. 1C is what is commonly known as a FAT (file allocation table) file system. In a FAT file system, management of the volume area is performed in units known as clusters. Volume management information is arranged at the start of the volume area, and a user area for recording user data is arranged directly following the volume management information. The volume management information includes a master boot record, a partition table, a partition boot sector, a duplexed file allocation table (FAT), and a root directory entry. The duplexed FAT shows links between the plurality of clusters included in the volume area. This kind of file system layer enables data to be stored in the application layer in a hierarchical structure formed from directories and files. By installing a layer model, the access apparatus can access a semiconductor memory card with the same procedure used to access a recording medium, such as a magnetic or optical disc, without the need to pay attention to differences in the physical layer.

However, a user has many opportunities to determine the data size of the volume area when data is stored in the volume area of the file system. When the size of the volume area is changed in response to a user request, the number of clusters included in the volume area increases or decreases accordingly. If the number of clusters is increased or decreased, the FAT formed from entries corresponding to these clusters also increases or decreases, respectively, as does the size of the volume management information in which the FAT is included. If the size of the volume management information is increased or decreased, a start address of the user area following the volume management information will also be changed. The start address of the user area changes according to the size of the volume area. Consequently, the start addresses of each cluster also change according to the size of the user area.

If the start address of each cluster changes according to the size of the user area, clusters may straddle the boundaries between two erasable blocks, and the end portion of the volume management information may be arranged in the same erasable block as a cluster positioned at the start of the user area. FIG. 1D shows the layout of the volume area when the end portion of the volume management information and the cluster positioned at the start of the user area are in the same erasable block. If clusters are arranged as shown in the drawing, and a user desires to modify data stored in a particular cluster, the two erasable blocks in which the cluster is arranged have to be read and then returned to a blank state. However, nonvolatile memory is formed from a memory component that includes a floating gate buried in an insulating layer. This memory component can only be erased a few tens of thousands of times, so if the phenomenon in which two erasable blocks have to be erased to modify one cluster frequently occurs, the lifespan of the nonvolatile memory will be significantly reduced.

Generally speaking, when 32 sectors are managed as one cluster, writing data into a cluster can be completed in $32 \times 200 \,\mu s$ ($200 \,\mu s$ is the time required to write each sector), provided that the write destination has already been erased. However, if the write destination has to be erased before data can be written, a 2 ms erasure period is added. If the cluster straddles the boundary between two erasable blocks, both blocks need to be erased, and erasing the write destination takes 4 ms. As a result, the time required to write data is significantly lengthened.

SUMMARY OF THE INVENTION

An object of the present invention is to provide an access apparatus that achieves a reduction in the processing time required to modify erasable blocks, as well as forming a data storage format in a semiconductor memory card that enables a nonvolatile memory having a longer lifespan to be realized.

The type of semiconductor memory card known as a secure digital (SD) memory card has made great strides toward resolving the aforementioned problems of reduction in processing time and nonvolatile memory longevity for the following reasons. In an SD memory card, an area known as the protected area, which cannot be used by the general user, is provided. This protected area is used to store secret information, such as an encryption key used for encrypting data, billing information used to bill a user when a copyrighted material is reproduced, and the like. The amount of data which needs to be kept secret varies according to the type of application program used, so that the size of the protected area has to change according to the type of application program. If the size of the protected area is changed, this means that the layout of the volume area also changes in response to the type of application program. If the layout of the volume area changes in this way, a layout in which clusters straddle the boundaries between erasable blocks is often generated, so achievement of the above-mentioned object is particularly desirable.

In order to achieve the above-mentioned object, the semiconductor memory card access apparatus may have the following structure. The access apparatus performs file access on a semiconductor memory card that has a memory area comprising a plurality of sectors by managing data in each group of $2^j$ sectors (j being 0 or a positive integer) as a cluster, and managing one or more clusters as a file. Here, each group of $2^i$ consecutive sectors in the memory area forms a block (i being 0 or a positive integer), which is the smallest unit on which data erasure can be performed. The access apparatus includes a calculation unit, a reserving unit, and a recording unit. The calculation unit calculates a size of volume management information based on a number of clusters in the memory area that are to be managed. Here, the volume management information includes a file allocation table that indicates, for each file, links between clusters corresponding to the file. The reserving unit reserves a first area for recording the volume management information, and a second area for recording user data. The first area has a data size larger than the calculated volume management information, and is formed from $m \times 2^j$ sectors (m being a positive integer), while the second area is formed from sectors following the first area. The recording unit records volume management information in the first area, and user data in the second area, and manages the volume management information and the user data as clusters. In this access apparatus, an area in the volume area having m clusters (m is a positive integer) is reserved for recording volume management information, so there is no possibility of any cluster being stored straddling two erasable blocks. Cluster boundaries can be aligned with erasable block boundaries, and the boundary of the volume management information can be aligned with an erasable block boundary. Consequently, only one erasable block needs to be erased when a cluster is rewritten or overwritten, and the number of times that erasable blocks have to be erased can be reduced. If the number of block erasures is reduced, the semiconductor memory card can write data in a shorter time, and the lifespan of the nonvolatile memory itself can be increased.

Here, the volume management information may include in addition to the file allocation table, a master boot record, a partition table, partition boot sector information, and a root directory entry. Furthermore, the recording unit records the master boot record and the partition table in a first sector of the first area, skips a predetermined number of sectors and then records the partition boot sector information, the file allocation table, and the root directory entry in subsequent sectors. As a result, an end of the first area can be aligned with an end of the root directory entry. The number of sectors between the master boot record showing the start of the drive, and the partition boot sector showing the front of the partition area, can be adjusted, so the volume management information can be restricted to a first area formed from clusters, and compatibility with devices that use a FAT file system preserved.

Here, the calculation unit may calculate a sum SUM by totaling a number of sectors used to record the partition boot sector information, the file allocation table, and the root directory entry. The reserving unit reserves the first area by calculating the value of m based on an {equation 1} NOM+ SUM=$2^j \times$m. Here, NOM is a number of sectors. The recording unit calculates the predetermined number of sectors by subtracting 1 from the number of sectors NOM. Even if the size of the file allocation table changes, a first area which is larger than the size of the volume management information and is an integral multiple of erasable block size is reserved. As a result, a necessary minimum size for the first area can be reserved, no matter how the size of the file allocation table is calculated.

Here, the recording unit may set the predetermined number of sectors in the partition table recording the volume management information. In this structure, even if the size of the first area changes, causing the start address of the second area to change, a number of sectors, obtained by subtracting 1 from the number of sectors NOM, is set in the partition table, so the access apparatus can access the user area accurately by referring to the partition table.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2A is an external view of an semiconductor memory card;

FIGS. 2B and 2C are external views of access apparatuses;

FIG. 6B shows a structure of a partition boot sector;

FIG. 12 is a drawing obtained by constructing the partition control area, the system area and the clusters with a size calculated using equations 11 and 12;

FIG. 19 shows an internal structure of an access control unit 2 in a third embodiment;

FIGS. 20A to 20D show a processing sequence performed when rewriting an erasable block;

FIG. 22 is a flowchart showing detailed processing performed by the file system operation unit 9 in the third embodiment;

FIG. 24 shows an internal structure of an access control unit 2 in a fourth embodiment;

FIG. 28 is a flowchart showing a detailed processing sequence for fragmentation elimination processing performed on a logical address;

FIGS. 34A to 34C show content of processing performed by a file system operation unit 9 in a seventh embodiment.

DESCRIPTION OF THE PREFERRED EMBODIMENTS

The following is a description of embodiments of a semiconductor memory card, and of a system including a semiconductor memory card and an access apparatus, with reference to the drawings.

Figure 1A:
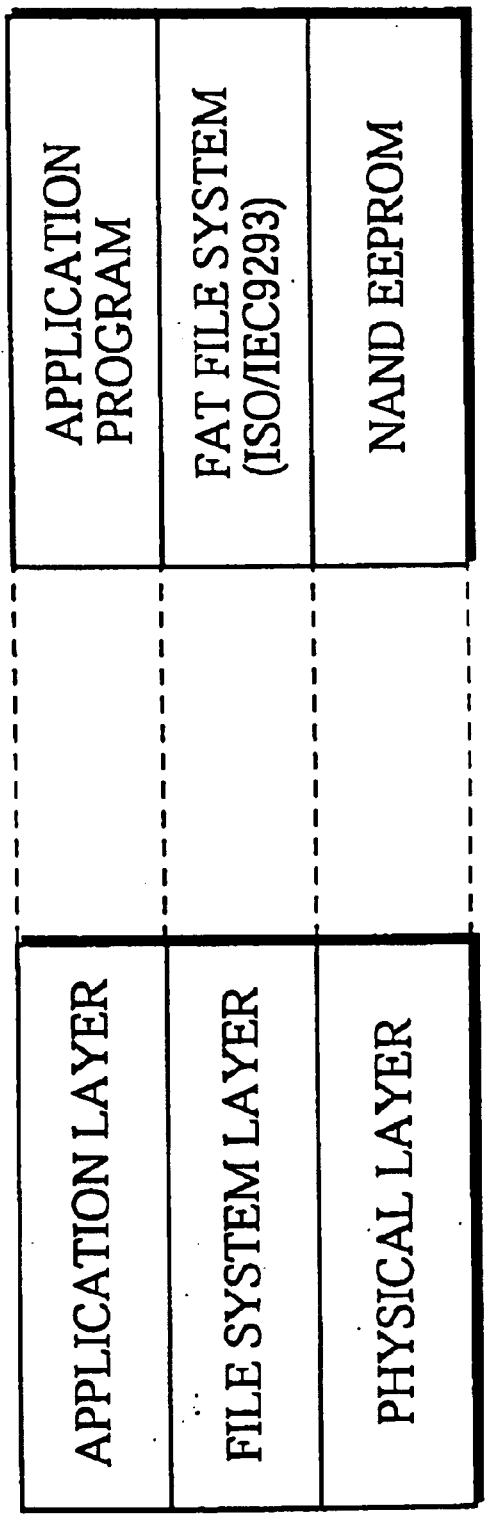
FIG. 1A shows a layout model formed from a physical layer, a file system layer compliant with ISO/IEC9293, and an application layer.
Figure 1B:
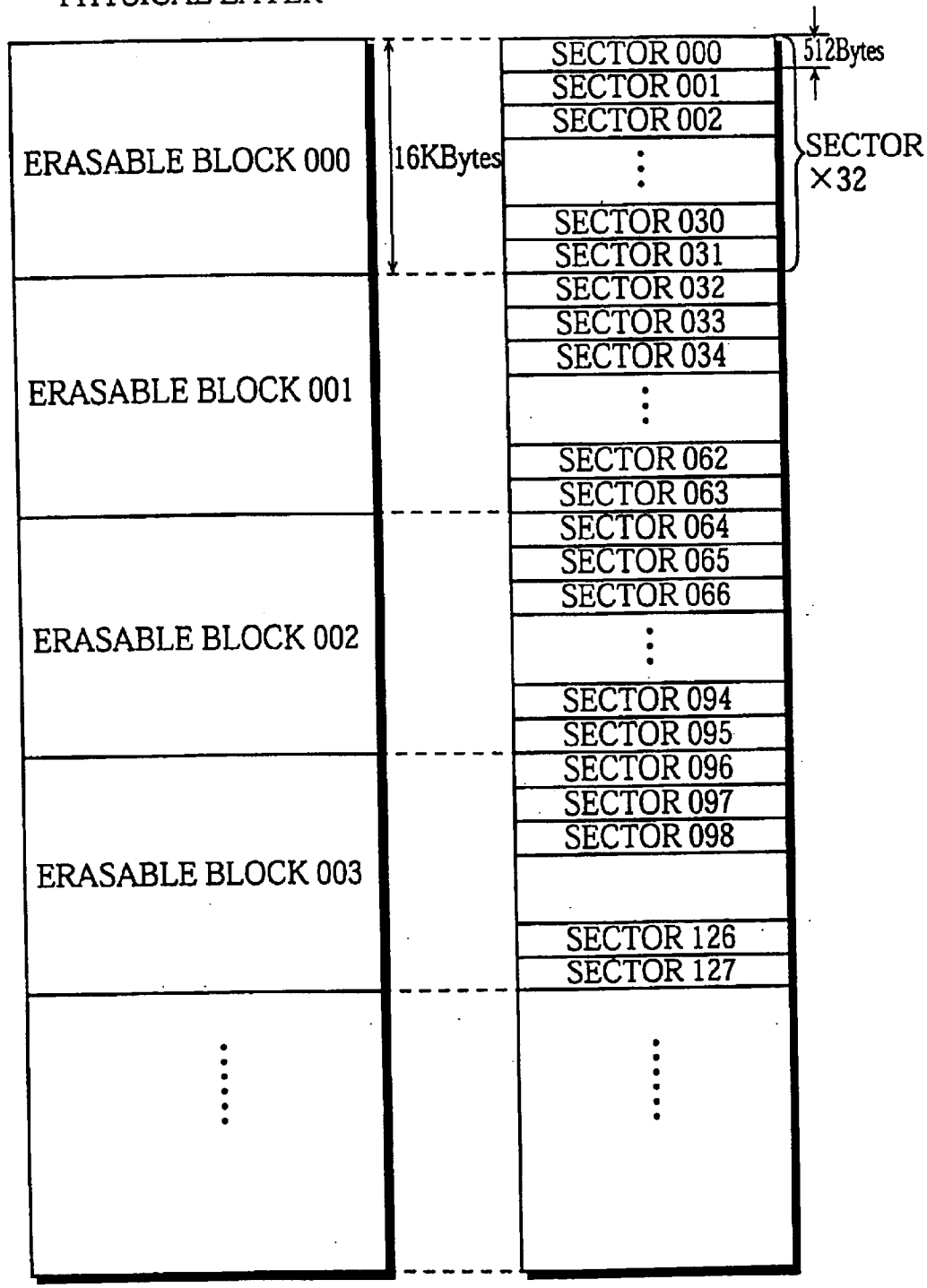
FIGS. 1B and 1C show the format of the physical layer and the file system layer.
Figure 1C:
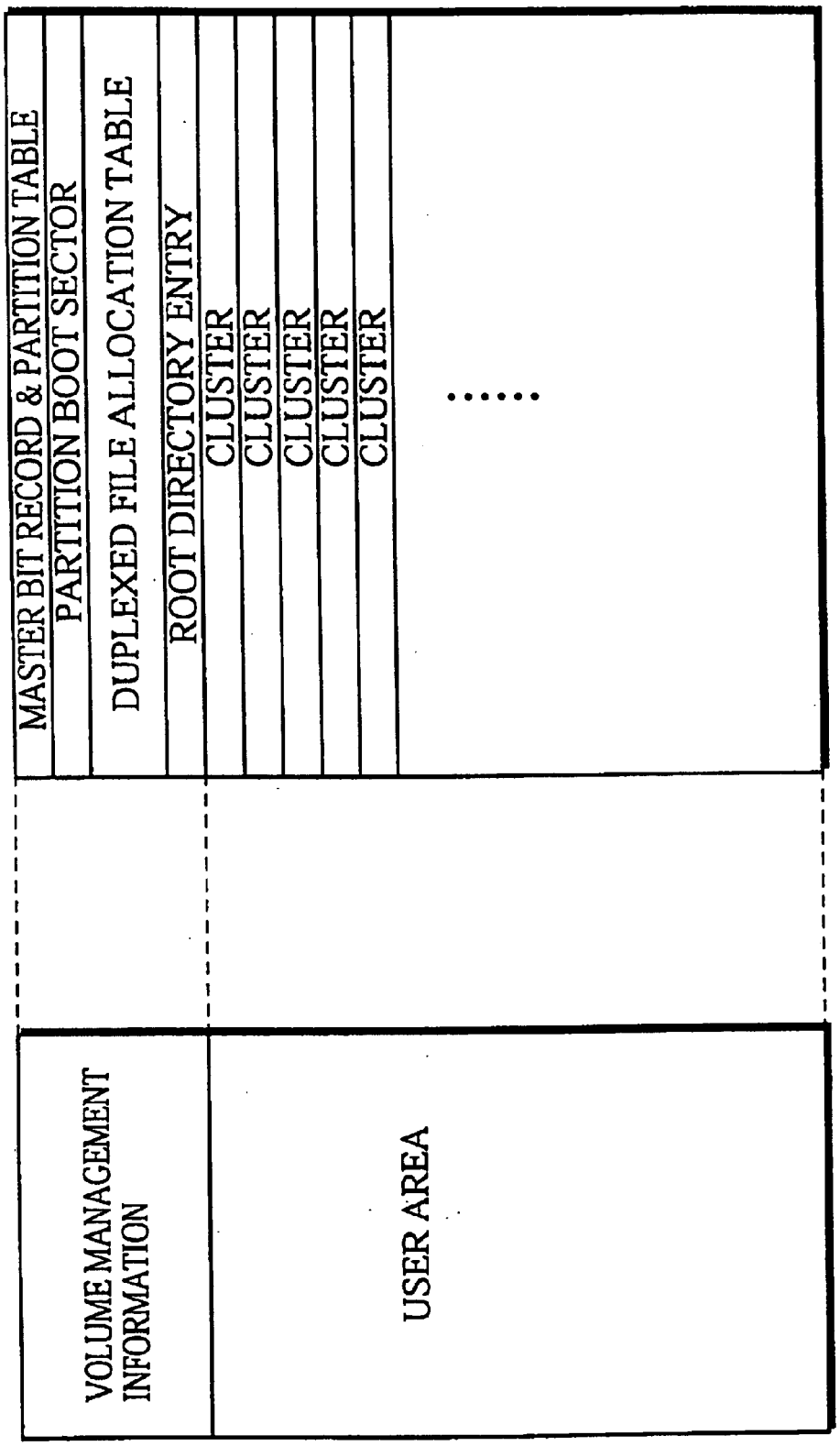
Figure 1D:
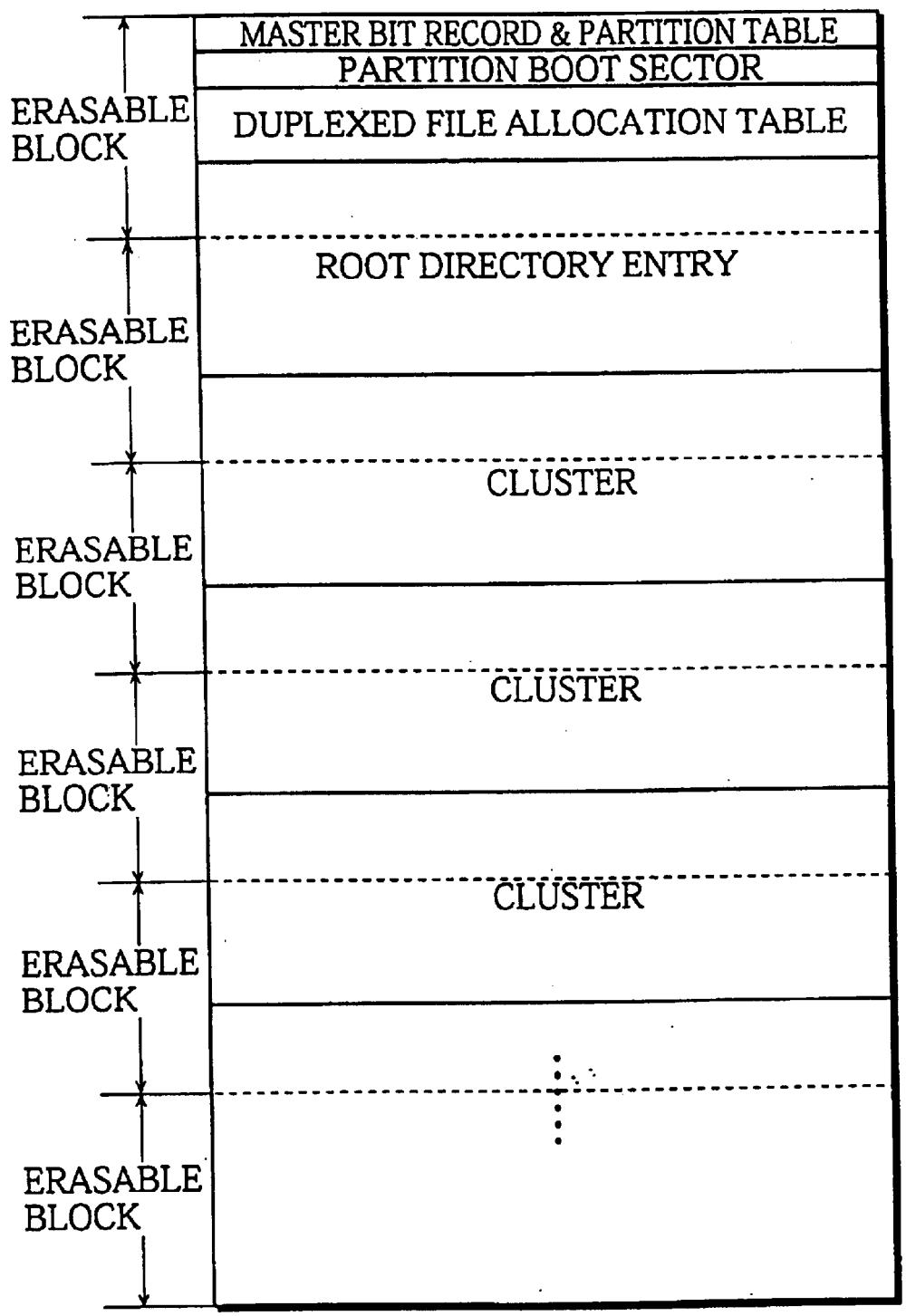
FIG. 1D shows a layout of the volume area when an end portion of the volume management information and a cluster positioned at the start of the user area are arranged in the same erasable block.
Figure 3A:
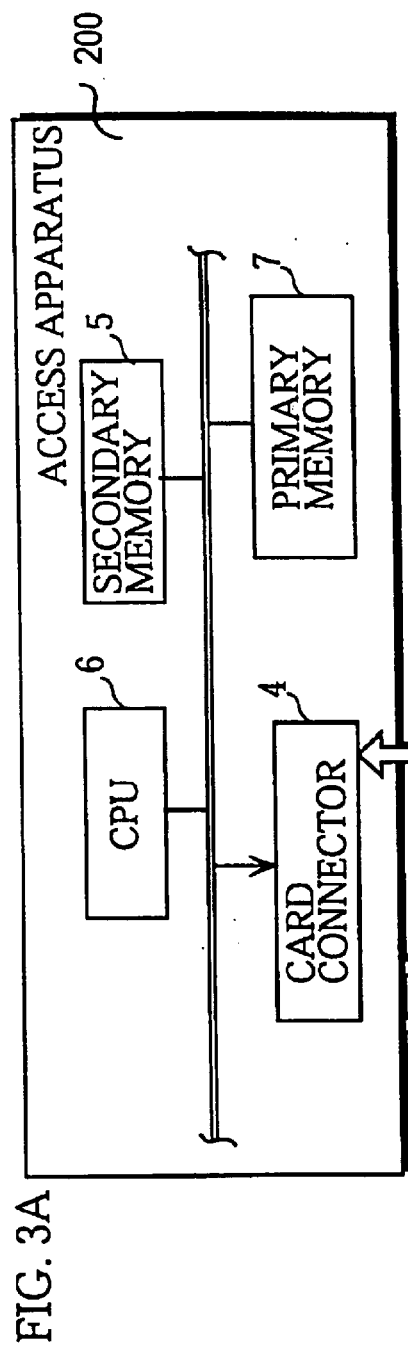
FIG. 3A shows an internal structure of a semiconductor memory card and an access apparatus.

FIG. 2A shows an external view of a semiconductor memory card 100, and FIGS. 2B and 2C show external views of access apparatuses. FIG. 3A shows an internal structure of the semiconductor memory card 100 and an access apparatus 200.

The semiconductor memory card 100 has the external structure of FIG. 2A, being 32.0 mm long, 24.0 mm wide, and 2.1 mm thick: about the size of a postage stamp, and small enough for a user to hold on the tip of one finger. The semiconductor memory card 100 has nine connectors for connecting to an access apparatus 200, and a write protect switch 101 on one side, which can be set by the user to permit or prohibit overwriting of recorded data. As shown in the lower part of FIG. 3A, the semiconductor memory card 100 includes a nonvolatile memory 1 formed from NAND EEPROM, an access control unit 2, and a work memory 3. The access control unit 2 writes data into the nonvolatile memory 1, reads data from the nonvolatile memory 1, and erases data, according to commands issued by the access apparatus 200. The work memory 3 is used for temporary data storage when data read from the nonvolatile memory is rewritten or written back into the nonvolatile memory.

Figure 3B:
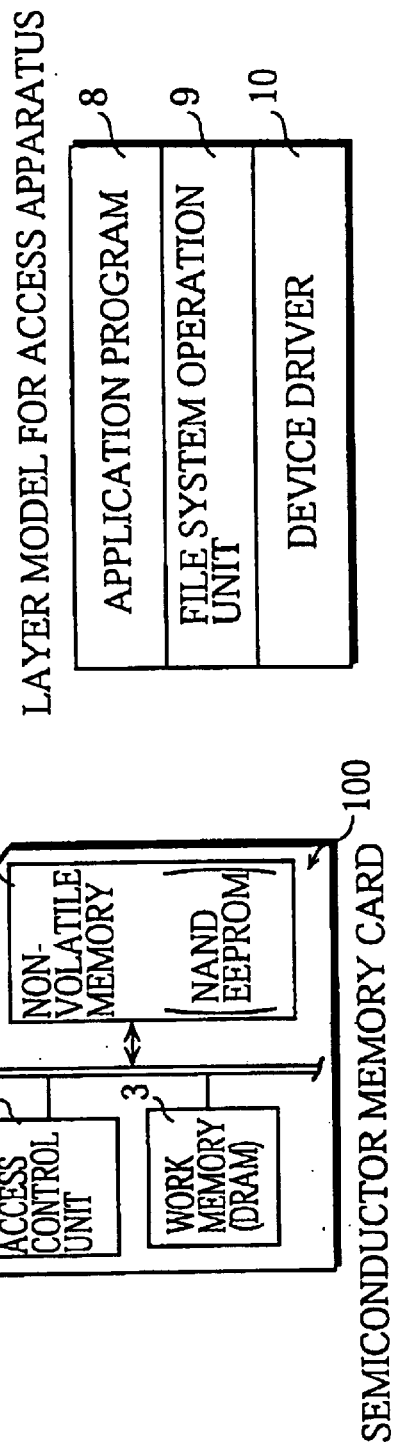
FIG. 3B shows a layer model for software used by the access apparatus.

Next, an access apparatus 200, such as a domestic sound system shown in FIG. 2B or an information processing apparatus such as a personal computer shown in FIG. 2C, is described. Such an access apparatus 200 includes a card connector 4, a secondary memory 5, a CPU 6, and a primary memory 7. The card connector 4 is used to connect to the semiconductor memory card 100. The secondary memory 5 stores various types of software for accessing the semiconductor memory card 100. The CPU 6 performs overall control of the access apparatus 200. The primary memory 7 is used for temporary storage of the FAT and the root directory entry when the semiconductor memory card 100 is accessed. FIG. 3B shows a layout model for software used in the access apparatus 200. In the drawing, the access apparatus software includes an application program 8, a file system operation unit 9, and a device driver 10. The application program 8 performs predetermined processing, such as audio and video reproduction, for the access apparatus 200. The file system operation unit 9 executes file reading, writing, erasing and modifying (rewriting) operations on the file system, according to instructions from the application program 8. The device driver 10 performs operations on the file system by issuing read and write commands to the semiconductor memory card 100.

Figure 4:
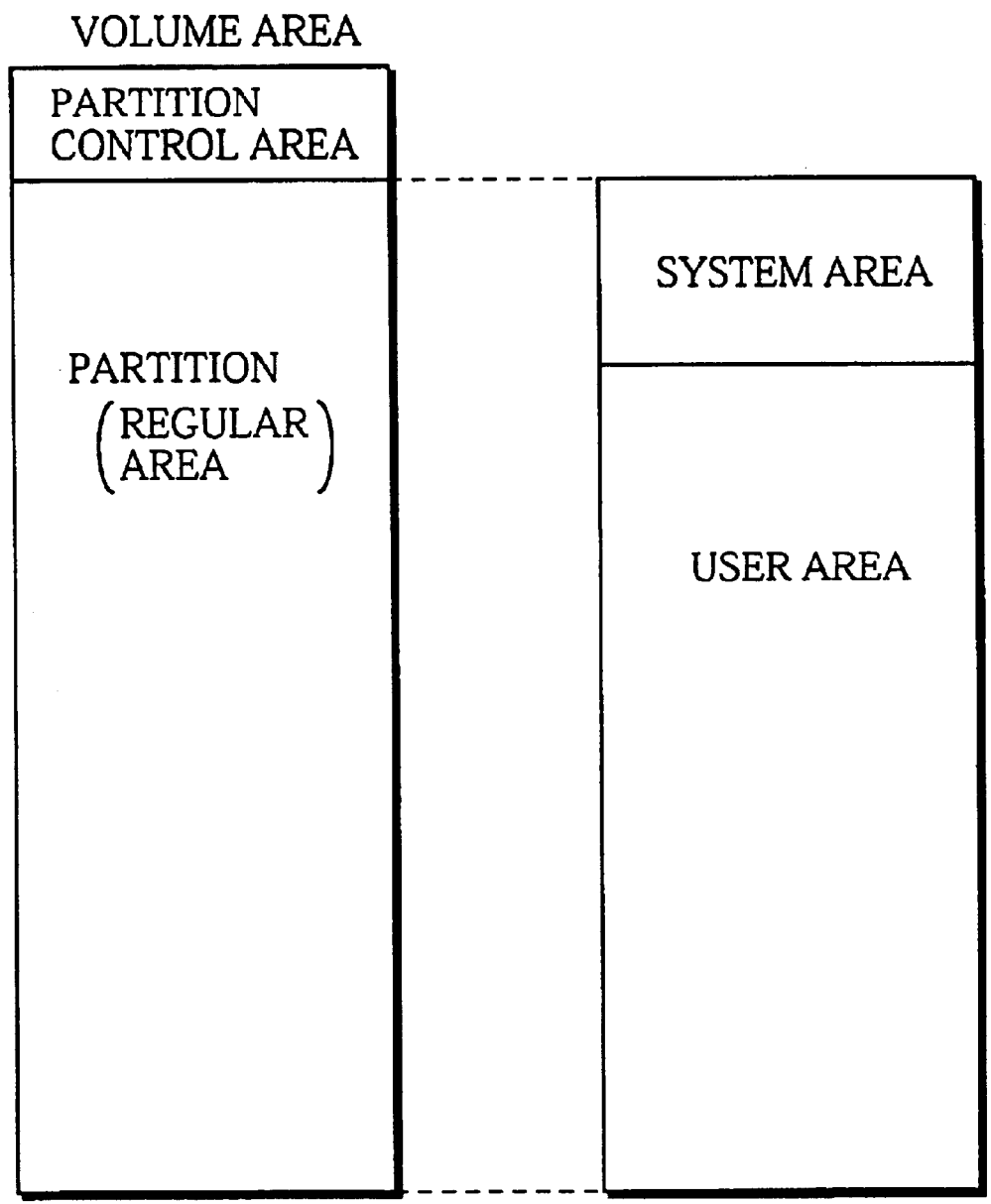
FIG. 4 shows a data storage format, compliant with the ISO/IEC9293 standard, used by a nonvolatile memory 1.

The following is an explanation of an example data storage format for the nonvolatile memory 1. The nonvolatile memory 1 performs data storage using the format shown in FIG. 4. In the drawing, the entire nonvolatile memory 1 is referred to as the volume area. The volume area is managed divided up into a plurality of clusters, and includes a partition control area and a partition (also known as the regular area). The partition is divided into a system area and a user area, as shown on the right-hand side of FIG. 4.

A start address of the user area follows directly after the system area. However, the size of the duplexed FAT in the system area varies according to the size of the user area, so that the start address of the user area changes accordingly, as was explained in the Background Art section. Each sector in the volume area is indicated by a physical address relative to the start of the volume area.

Figure 5:
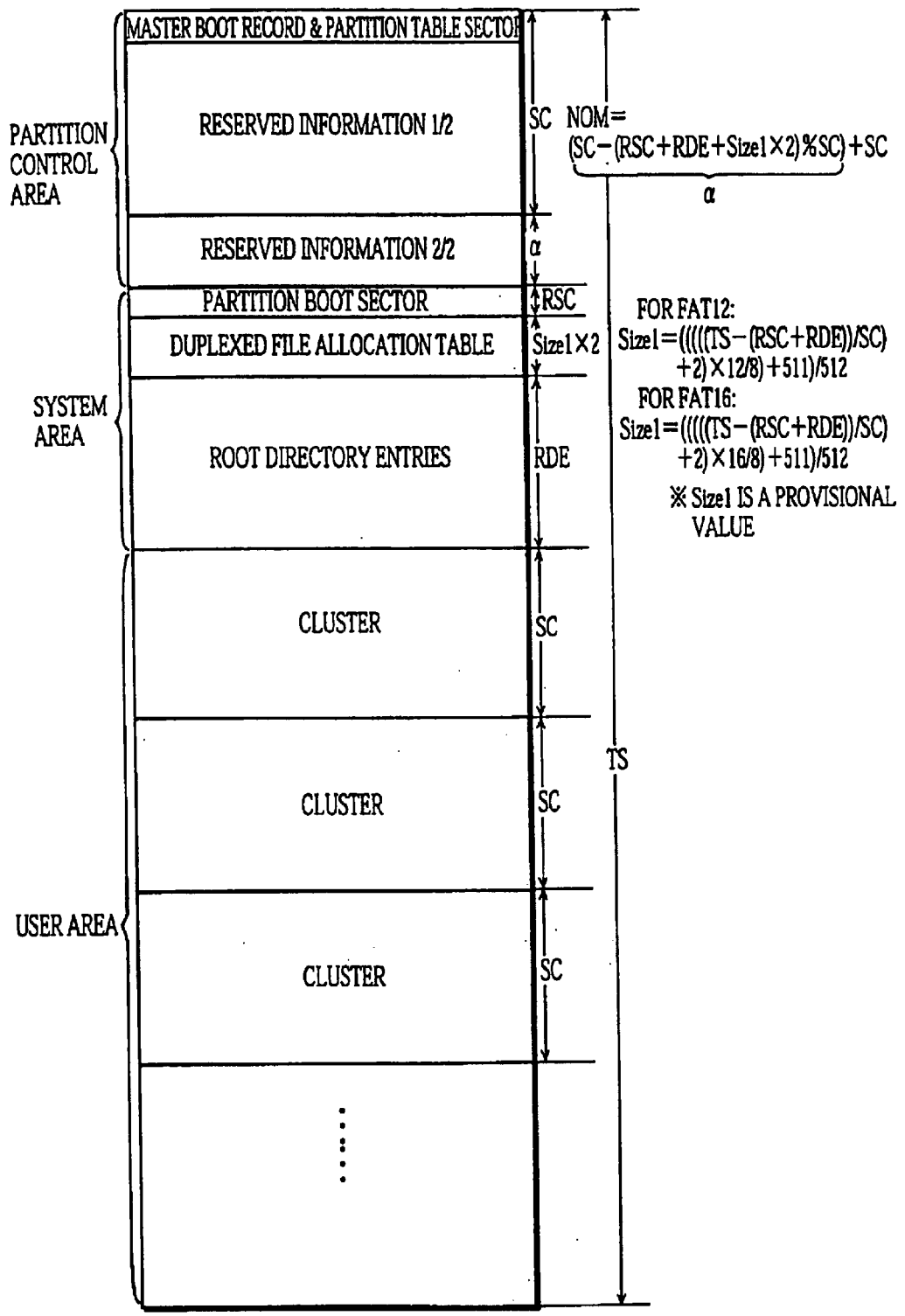
FIG. 5 shows a structure of a partition control area, a system area, and a user area included in the volume area.

Next, each of the areas included in the volume area is described in turn. FIG. 5 shows a structure for the partition control area, the system area, and the user area included in the volume area.

Figure 6A:
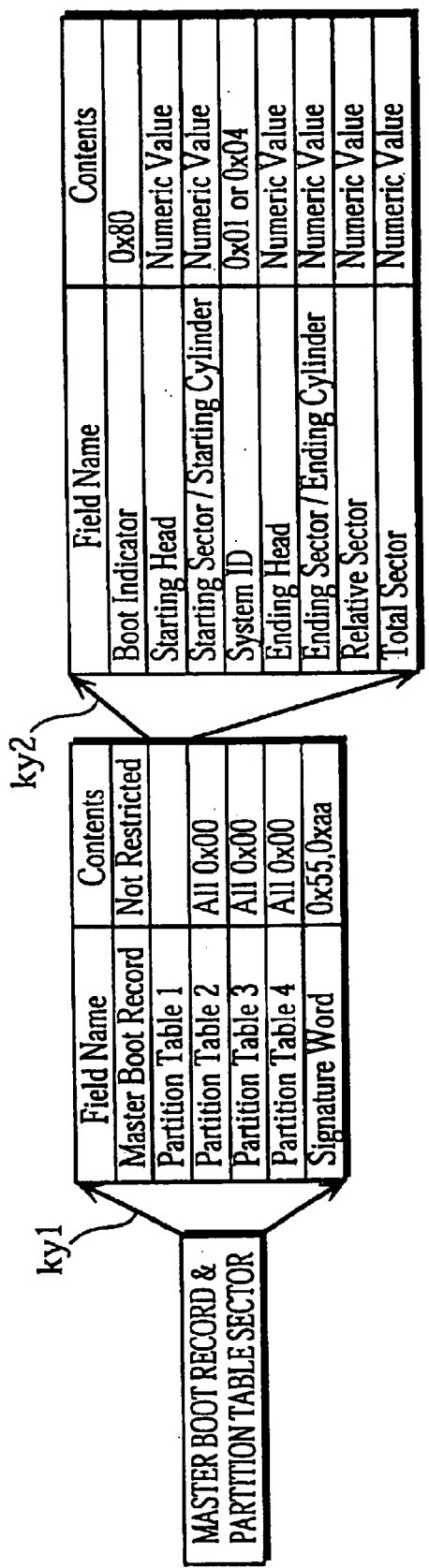
FIG. 6A illustrates a structure of a master boot record and a partition table sector.

The partition control area includes a master boot record & partition table sector, and reserved information 1/2, and 2/2. FIG. 6A shows a detailed structure of the master boot record & partition table sector. In the drawing, the content of the master boot record & partition table sector is shown hierarchically between a pair of arrows ky1. The master boot record & partition table sector includes a master boot record, four partition tables 1, 2, 3, and 4, and a signature word.

The master boot record is a sign indicating to the access apparatus 200 that a subsequent area is physically one medium (one physical medium). In FIG. 6A, the volume area has only one master boot record, so the volume area is recognized by the access apparatus 200 to be one physical medium. Generally, if two master boot records are arranged in the volume area, two physical media are recognized by the access apparatus 200.

The partition table is a table recording partition information. As shown by the arrows ky2, when the semiconductor memory card 100 is used as a starter drive, the partition table includes the following fields: 'boot indicator', 'starting head', 'starting sector/starting cylinder', 'system ID', 'ending head', 'ending sector/ending cylinder', 'relative sector', and 'total sector'. The 'boot indicator' field is set at '0x80'. The 'starting head' field specifies the starting head of a partition. The 'starting sector/starting cylinder' field specifies the starting sector and starting cylinder of the partition. The 'system ID' specifies a file system type, by being set at '01' when the partition size is less than 32680 bytes, and at '04' when the partition size is less than 65536. The 'ending sector/ending cylinder' field specifies the ending sector and ending cylinder of the partition. The 'relative sector' field specifies the number of sectors existing before the starting sector of the partition. The 'total sector' field specifies the number of sectors in the partition.

The following is an explanation of the partition in the semiconductor memory card 100. The partition is formed from the system area, followed by the user area, but this explanation begins with a description of the user area, with reference to FIG. 7C.

Figure 7A:
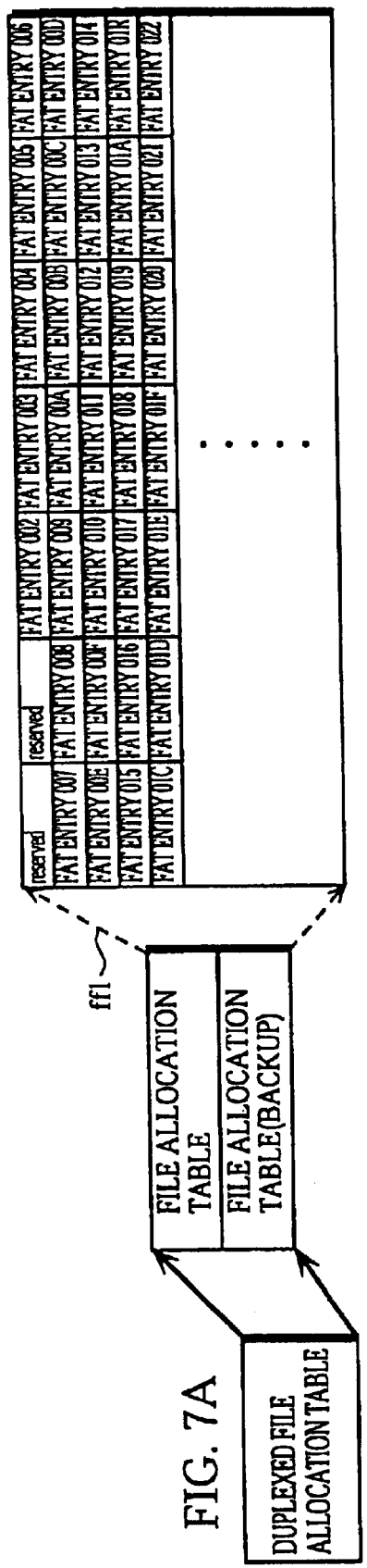
FIG. 7A shows a structure of a duplexed FAT.
Figure 7B:
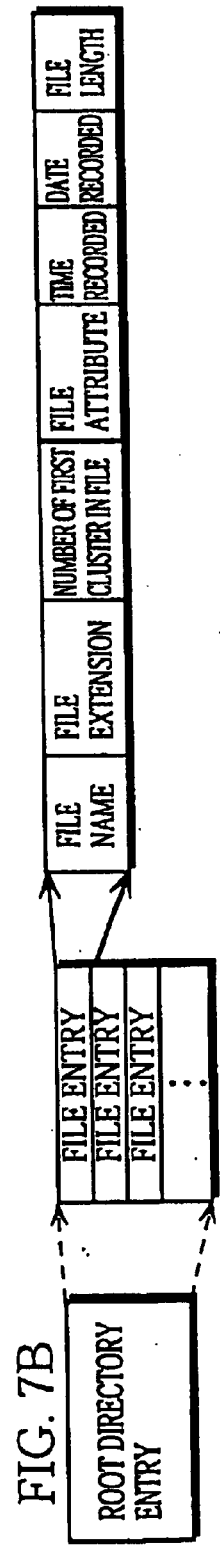
FIG. 7B shows a structure of a root directory entry.
Figure 7C:
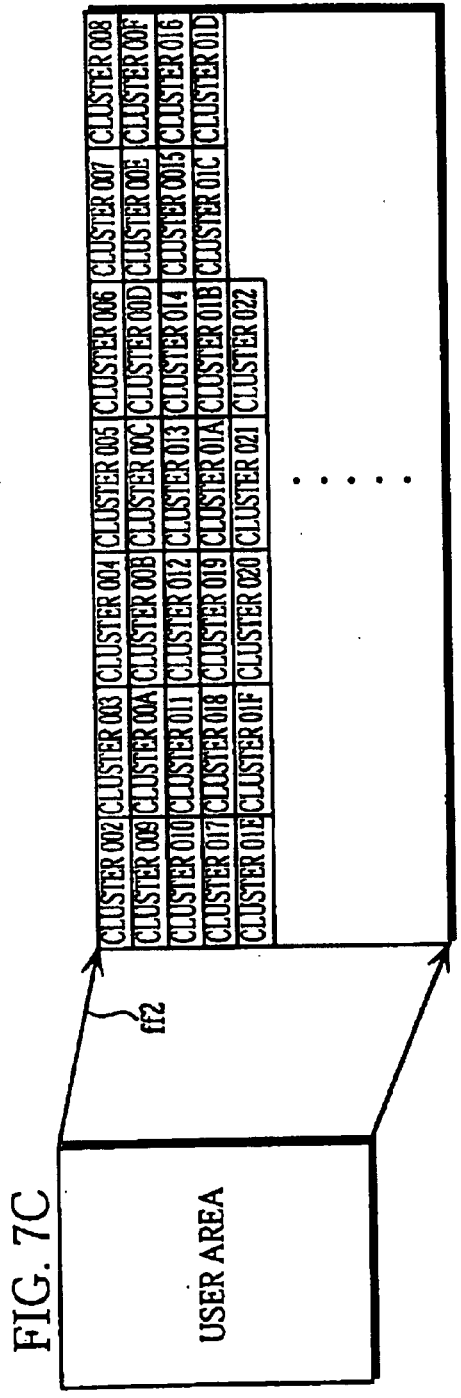
FIG. 7C shows a structure of the user area.

The user area stores files in units no smaller than a cluster. The arrow ff2 drawn using a broken line in FIG. 7C shows the plurality of clusters 002,003,004,005 . . . included in the user area. The numbers 002,003,004,005,006,007,008 . . . used in FIG. 7C are three-digit hexadecimal cluster numbers that are exclusively assigned to identify each cluster. Since the smallest unit by which access can be performed is one cluster, storage positions within the user area are indicated using cluster numbers.

The system area includes a partition boot sector, a duplexed file allocation table, and a root directory entry. The partition boot sector, the duplexed FAT and the root directory entry are described in turn, with reference respectively to FIGS. 6B, 7A and 7B.

An extended FDC (floppy disc controller) descriptor with the information fields shown in FIG. 6B is set in the partition boot sector. The extend FDC descriptor includes the following fields: 'jump command', 'creating system identifier', 'sector size', 'sectors per cluster', 'reserved sector count', 'number of FATs' (number of FATs included in the duplexed FAT), 'number of root directory entries' (data length of the root directory entry), 'total sectors', 'medium identifier', 'sectors per FAT', 'sectors per track', 'number of sides', 'number of hidden sectors', 'total sectors' (the total number of sectors in the system area and the user area), 'physical disk numbers', 'extended boot record signature', 'volume ID number', 'volume label', 'file system type', and 'signature word'.

The duplexed FAT is formed from two FATs compliant with the ISO/IEC (International Organization for Standardization/International Electroteachnical Commission) 9293 standard. Each FAT includes a plurality of FAT entries each linked to a cluster. FAT entries indicate whether a corresponding cluster is in use or not, being set at '0' if the cluster is not in use, and with the corresponding cluster number if the cluster is in use. The cluster number indicates a link to a next cluster that should be read following this cluster. The arrow ff1 drawn using a broken line in FIG. 7A shows a plurality of FAT entries 002, 003, 004, 005 . . . included in the FAT. The numerical values '002, 003, 004, 005 . . . ' attached to each FAT entry show the cluster number of the corresponding cluster.

The root directory entry includes a plurality of file entries for a plurality of files present in the root directory. Each file entry includes a 'filename' of an existing file, a 'file identifier', a 'number of first cluster in file' stored at the start of the file, a 'file attribute', a 'recording time' and a 'recording date' indicating when the file was recorded, and a 'file length'.

Figure 8:
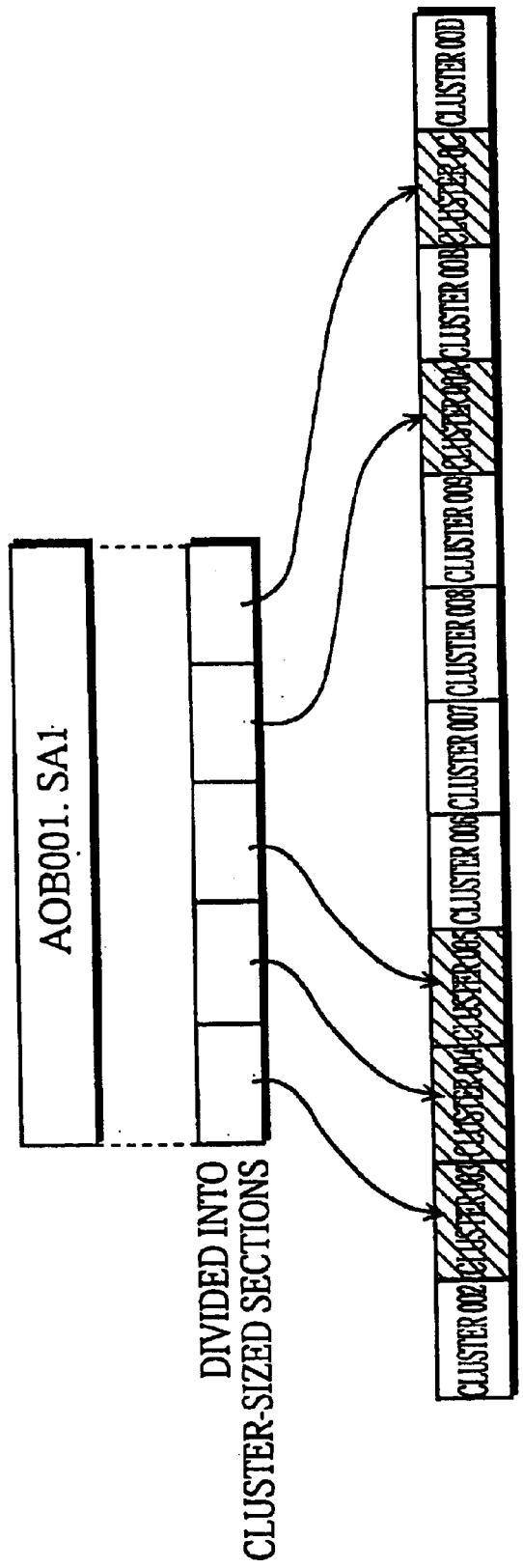
FIG. 8 shows an example of a file storage method.

The following describes the file storage method by showing how a file named 'AOB001.SA1' is stored in the root directory, with reference to FIG. 8. Since the smallest unit by which the user area can be accessed is one cluster, the file 'AOB001.SA1' needs to be stored in the data region in sections that are no smaller than one cluster. The file 'AOB001.SA1' is therefore stored having first been divided into clusters. In FIG. 8, the file 'AOB001.SA1' is divided into five sections in keeping with the cluster size, and the resulting sections are stored into the clusters numbered 003, 004, 005, 00A, and 00C.

Figure 9:
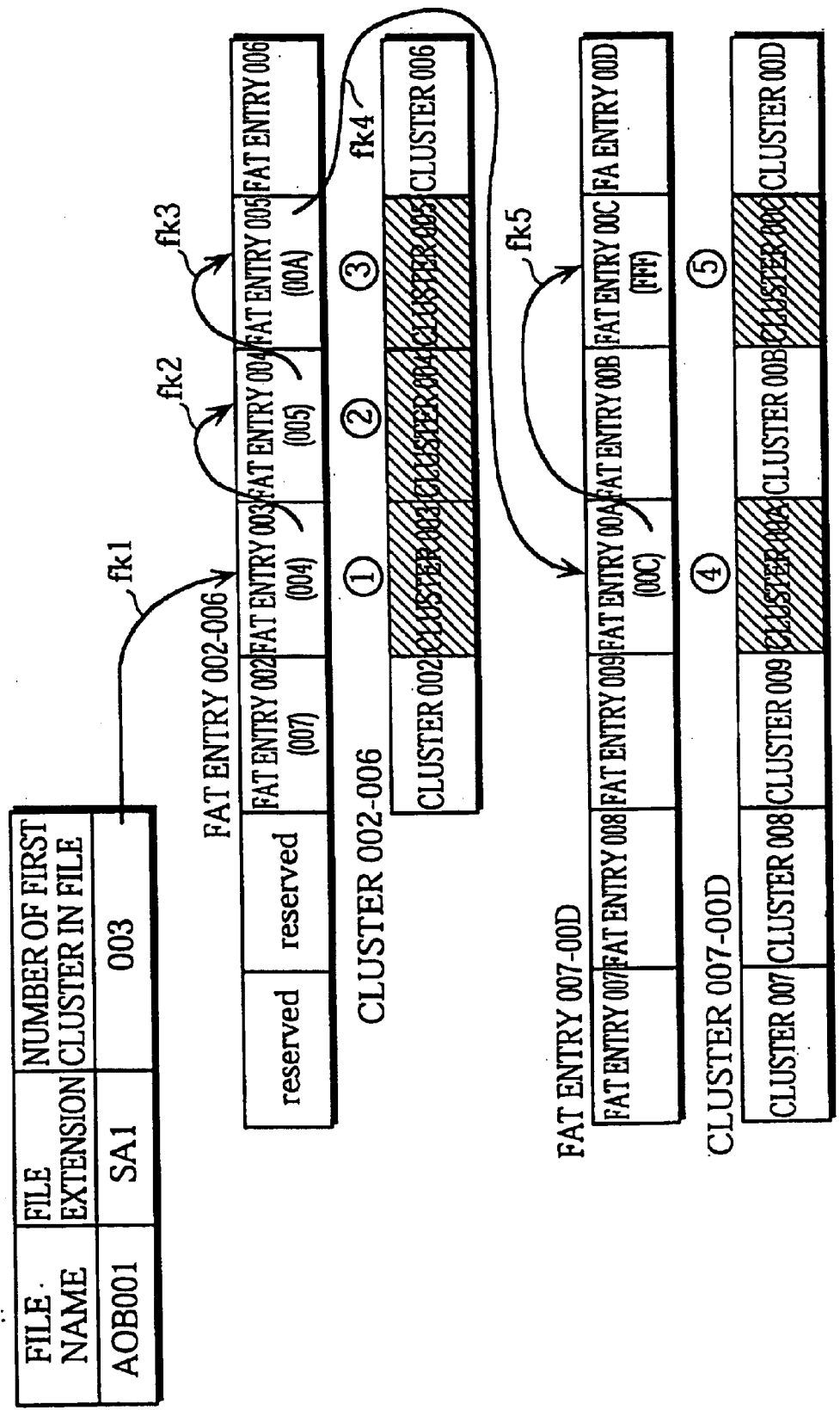
FIG. 9 shows an example of settings for the root directory entry and the FAT when a file AOB001.SA1 is stored in a plurality of clusters.

FIG. 9 shows one example of how the root directory entry and FAT need to be set when the file 'AOB001.SA1' is stored having been divided up into sections and stored. In the drawing, the start of the file 'AOB001.SA1' is stored in cluster 003, so that cluster number 003 is written into 'the number of first cluster in file' in the root directory entry to indicate the cluster storing the first section of the file. The subsequent sections of the file 'AOB001.SA1' are stored in clusters 004 and 005. As a result, while the FAT entry 003 (004) corresponds to cluster 003 that stores the first section of the file 'AOB001.SA1', this entry indicates cluster 004 as the cluster storing the next section of the file 'AOB001.SA1'. In the same way, while the FAT entries 004 (005) and 005 (00A) respectively correspond to clusters 004 and 005 that store the next sections of the file 'AOB001.SA1', these entries respectively indicate cluster 005 and cluster 00A as the clusters storing the next sections of the file 'AOB001.SA1'. By reading the clusters with the cluster numbers written into these FAT entries in order as shown by the arrows fk1, fk2, fk3, fk4, fk5 . . . in FIG. 9, all of the sections produced by dividing the file 'AOB001.SA1' can be read. As explained above, the user area of the semiconductor memory card 100 is accessed in units of clusters, each of which is associated with a FAT entry. Note that the FAT entry that corresponds to the cluster storing the final section of an AOB file (the cluster 00C in the example shown in FIG. 9) is set with the cluster number 'FFF' to show that the corresponding cluster stores the final section of a file.

The above explanation gave a brief overview of the file system in the nonvolatile memory 1 of the present invention.

Figure 10A:
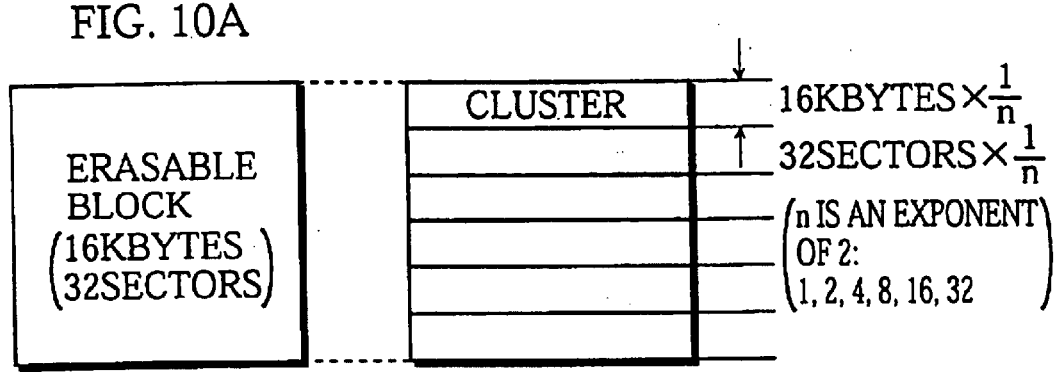
FIG. 10A shows the relationship between erasable blocks and clusters.
Figure 10B:
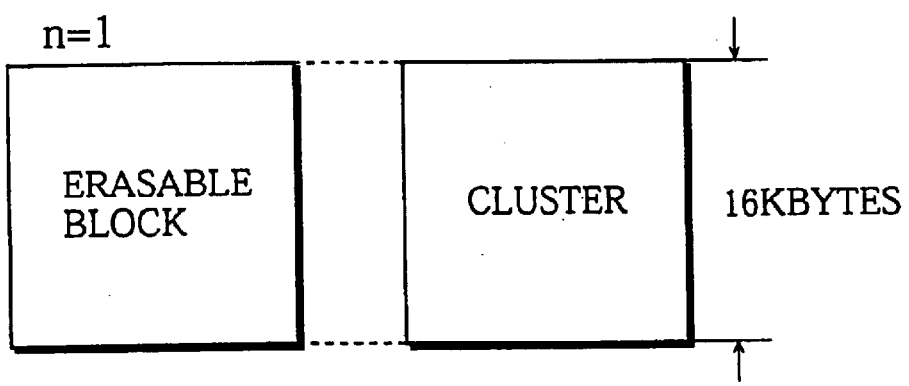
FIG. 10B shows clusters when n=1.
Figure 10C:
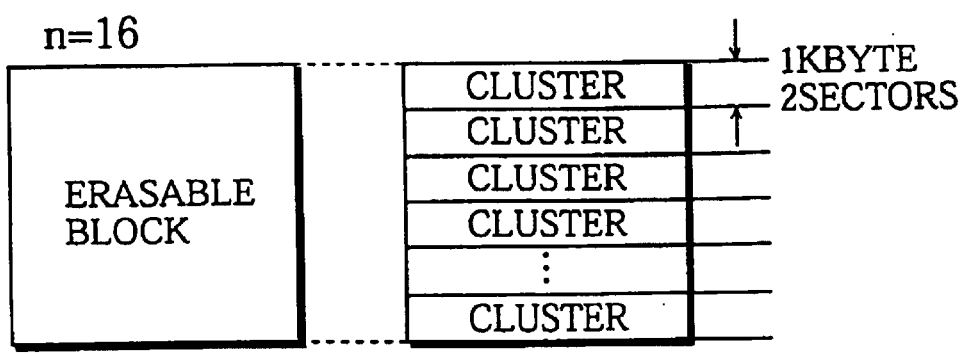
FIG. 10C shows clusters when n=16.

The following explanation concentrates on the principle objective of the embodiments, describing how cluster boundaries and erasable block boundaries are aligned, in other words how the boundary of the system area and the user area is aligned with a boundary between two erasable blocks. The embodiments execute two improvements in order to realize this boundary alignment. The first of these involves setting cluster size at 1/nth the size of erasable block size (n being 1, 2, 4, 8, 16, or 32). FIG. 10A shows the relationship between erasable blocks and clusters. Here, a cluster is specified to be 1/n of the size of an erasable block, that is 1/n of 16 KB (1/n of 32 sectors). FIG. 10B shows a number of clusters when n=1, and FIG. 10C a number of clusters when n=16.

Figure 11A:
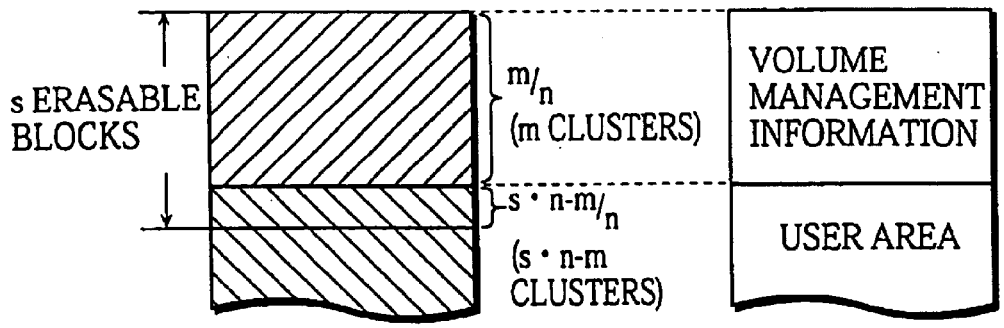
FIG. 11A envisages a situation when m clusters out of s erasable blocks are allocated for recording of volume management information.

The second improvement involves allocating an area in the volume area, having a size m times the size of a cluster, for recording the volume management information. FIG. 11A envisages a situation when m clusters from among s·n clusters included in s erasable blocks are allocated for recording the volume management information. If m clusters are allocated for recording the volume management information, an area m/n inside the s erasable blocks will be occupied by the volume management information, and the remaining (s·n−m)/n area will be allocated to the user area.

By setting the size of the volume management information at m times cluster size, the volume management information and s·n−m clusters can be compressed so that clusters do not straddle the boundaries between two erasable blocks.

Figure 11B:
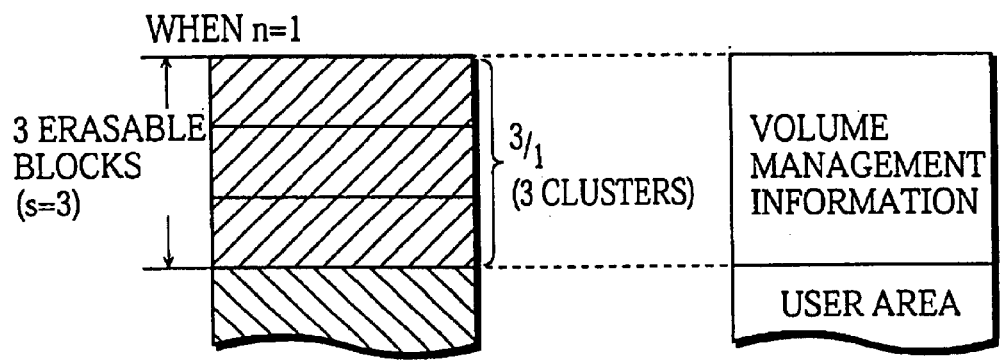
FIG. 11B shows the number of clusters allocated for recording of volume management information when n=1.
Figure 11C:
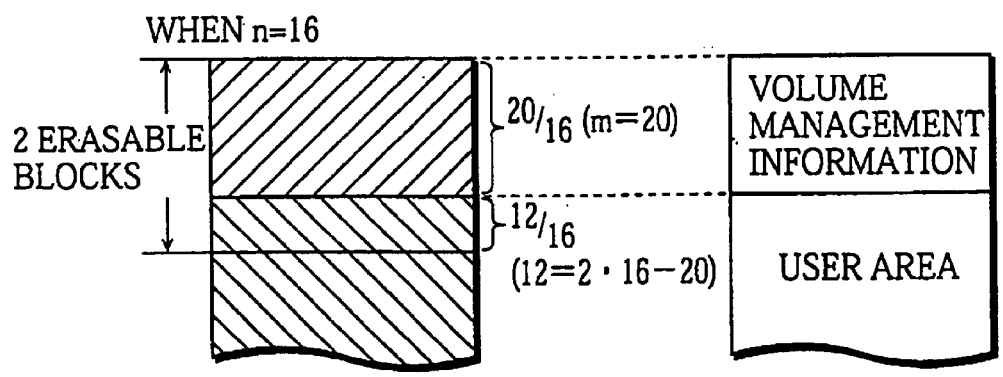
FIG. 11C shows the number of clusters allocated for recording of volume management information when n=16.

FIG. 11B shows the number of clusters allocated to the volume management information when n=1, and FIG. 11C shows the number of clusters allocated to the volume management information when n=16. As these drawings clearly show, a plurality of clusters are fitted precisely into a plurality of erasable blocks by setting the volume management information, so that no clusters straddle the boundaries between erasable blocks. A detailed layout of a volume area whose size has been adjusted in this way is shown in FIG. 5. In the drawing, the size of the partition control area is NOM, the size of the partition boot sector is RSC, the size of the duplexed FAT is Size 1×2, the size of the root directory entry is RDE, the total sector size is TS, and the number of sectors included in a cluster SC.

In FIG. 5, a Size 1 of the FATs included in the duplexed FAT, is determined according to total sector size TS. More specifically, it is a value calculated using an equation 11 described hereafter.

For FAT12: Size 1=(((((TS−(RSC+RDE))/SC)+2)×12/8)+511)/512

For FAT16: Size 1=(((((TS−(RSC+RDE))/SC)+2)×16/8)+511)/512    Equation 11

Here, FAT12 indicates a file system in which each FAT entry is allocated 12 bits, and FAT16 a file system in which each FAT entry is allocated 16 bits.

In equation 11, (TS−(RSC+RDE)) is the number of clusters required for the recording performed by the user area. The indicator number 2 is added to this number, the resulting value then being multiplied by the byte length of the FAT entry (12 or 16), and then divided by 8 to obtain the FAT byte length. An offset value of 511 bytes is added to the result of this calculation, and the resulting figure divided by a sector byte length of 512 to calculate the number of sectors required to store one FAT. If the FAT data length were to be 1 byte, dividing the FAT data by 521 would result in the number of sectors in the FAT being calculated as 0. However, addition of the offset value 511 by equation 11 ensures that a Size 1 having at least one sector will be calculated.

One important point to note in FIG. 5 is the size of the partition control area, known as NOM. The NOM is set at a value 'SC+α' to ensure that the partition control area and the system area belong to different clusters. The reason for setting the NOM in this way is to prevent failures to modify clusters in the system area from having a knock-on effect on the partition control area. In other words, if the master boot record & the partition table sector in the partition area are damaged by such a modify failure, the semiconductor memory card 100 will no longer be recognized as an authorized recording medium by the access apparatus 200. The NOM is set at SC+α, in order to avoid such a worse-case scenario.

The value SC+α set in the following way. Value α is calculated by dividing (RSC+RDE+Size 1×2) by SC so that the sum of RSC, Size 1×2, and RDE is an integral multiple of SC, and subtracting the remainder of this calculation from SC. If these facts are taken into account, the NOM is calculated as in equation 12.

NOM=(SC−(RSC+RDE+Size 1×2)%SC)+SC    Equation 12

If α is specified in this way, the partition control area and the user area will be formed so as to fit exactly into a plurality of erasable blocks, and the boundary between the system area and the user area will be aligned with the boundary of erasable blocks.

If such alignment of boundaries can be realized, the boundaries of all subsequent clusters will be aligned with boundaries of erasable blocks.

Here, an example, showing how the NOM and Size 1 are calculated when the SC is 32 sectors (16 KB), the RDE is 32 sectors, the RSC is 1 sector, and the TS is 65600 sectors, is described. If the type of the duplexed FAT is FAT12, Size 1 is calculated in the following way using equation 11.

$$\text{Size } 1 = (((((TS - (RSC + RDE))/SC) + 2) \times 12/8) + 511)/512$$

$$= (((((65600 - (1 + 32))/SC) + 2) \times 12/8) + 511)/512$$

$$= 7 \text{ sectors.}$$

Furthermore, the NOM is calculated in the following way using equation 12.

$$NOM = (SC - (RSC + RDE + \text{Size } 1 \times 2)\% \; SC) + SC$$

$$= (32 - (1 + 32 + 7 \times 2)\% \; 32) + 32$$

$$= 47 \text{ sectors.}$$

FIG. 12 illustrates a partition control area, a system area, and clusters, according to the calculated sizes. The master boot record & partition table sector, and the reserved information 1/2 are arranged in sectors PSN000 to PSN031, and there served information 2/2, the partition boot sector, and the duplexed FAT are arranged in sectors PSN032 to PSN063. The root directory entry is arranged in sectors PSN064 to PSNO95. In the volume area, 32 sectors form one erasable block, so the master boot record, the partition table, and the reserved information 1/2 are arranged in a first erasable block 001, the reserved information 2/2, the partition boot sector, and the duplexed FAT are arranged in a second erasable block 002, and the root directory entry is arranged in a third erasable block 003. The root directory entry is stored in a same-sized erasable block, so that the boundary between the user area and the system area matches a boundary between erasable blocks.

The above volume area layout is realized when the file system operation unit 9 performs initialization on the non-volatile memory 1. The procedure for performing this initialization processing is explained with reference to the flowchart of FIG. 13.

At step S1, the file system operation unit 9 determines cluster size in accordance with a size of the area to be formatted (TS) and a total storage capacity of the semiconductor memory card 100, a operation system operated by the access apparatus 200, and instructions from a user.

Once cluster size has been determined, at step S2, the file system operation unit 9 uses cluster size SC and the total sector size TS to determine whether a FAT12 or a FAT16 file system should be used. Once one of a FAT12 and FAT16 file system has been determined, at step S3 the file system operation unit 9 determines the length RDE of the root directory entry (in these embodiments the RDE is fixed at 32 sectors), and following this, in step S4, determines the length RSC of the partition boot sector (in these embodiments the RSC is fixed at 1 sector). Once the RDE and the RSC have been obtained, the file system operation unit 9 uses the equation 11 to calculate the data length of the FAT, at step S5. Then, at step S6, the file system operation unit 9 uses the equation 12 to calculate the NOM so that the master boot record and the partition boot sector are in different clusters.

The processing performed in the above steps S5 to S7 is virtually identical to that performed in the previously described equations 11 and 12. However, the processing performed in steps S7 to S9 is first introduced in this flowchart. At step S7, the file system operation unit 9 calculates a number of clusters CN in the user area using a equation 13.

$$CN=(TS-(RSC+RDE+\text{Size } 1\times 2+NOM))/SC \quad \text{Equation 13}$$

At step S8, the file system operation unit 9 calculates the data length of the FAT using the following equation 14.

For FAT12: Size 2=(((CN+2)×12/8+511)/512

For FAT16: Size 2=(((CN+2)×16/8+511)/512     Equation 14

At step S9, the file system operation unit 9 compares the Size 1 calculated at Step S5, and the Size 2 calculated at Step S8, and if the two values are identical, ends processing. If the values are not identical, the file system operation unit 9 substitutes Size 1 for Size 2 at step S10, moves to step S6, and recalculates the NOM. Since Size 1 is now a different value due to the substitution, a different NOM can be calculated by moving to step S6. Then, the file system operation unit 9 recalculates Size 2 at step S8, based on the newly calculated NOM, and if Size 1 and Size 2 are identical, step S9 is Yes, and processing ends.

The NOM calculated using the above processing is set in the 'relative sector' field in the partition table showing the number of sectors existing before the starting sector of the partition, and the TS is set in the 'total sector' field in the partition table.

The SC is set in the 'sectors per cluster' field in the partition boot sector, showing the number of sectors in each cluster. Furthermore, the RDE, showing a number of sectors, is multiplied by the sector length of 512 bytes, and then divided by 32 to obtain a number of file entries, this number then being set in the 'number of root directory entries' field in the partition boot sector. The Size 1 is set in the 'sectors per FAT' field showing the number of sectors in each FAT, in the partition boot sector. The access apparatus 200 refers to these values set in the partition table and the partition boot sector when specifying the locations of the duplexed FAT, the root directory entry, and the user area.

Figure 13:
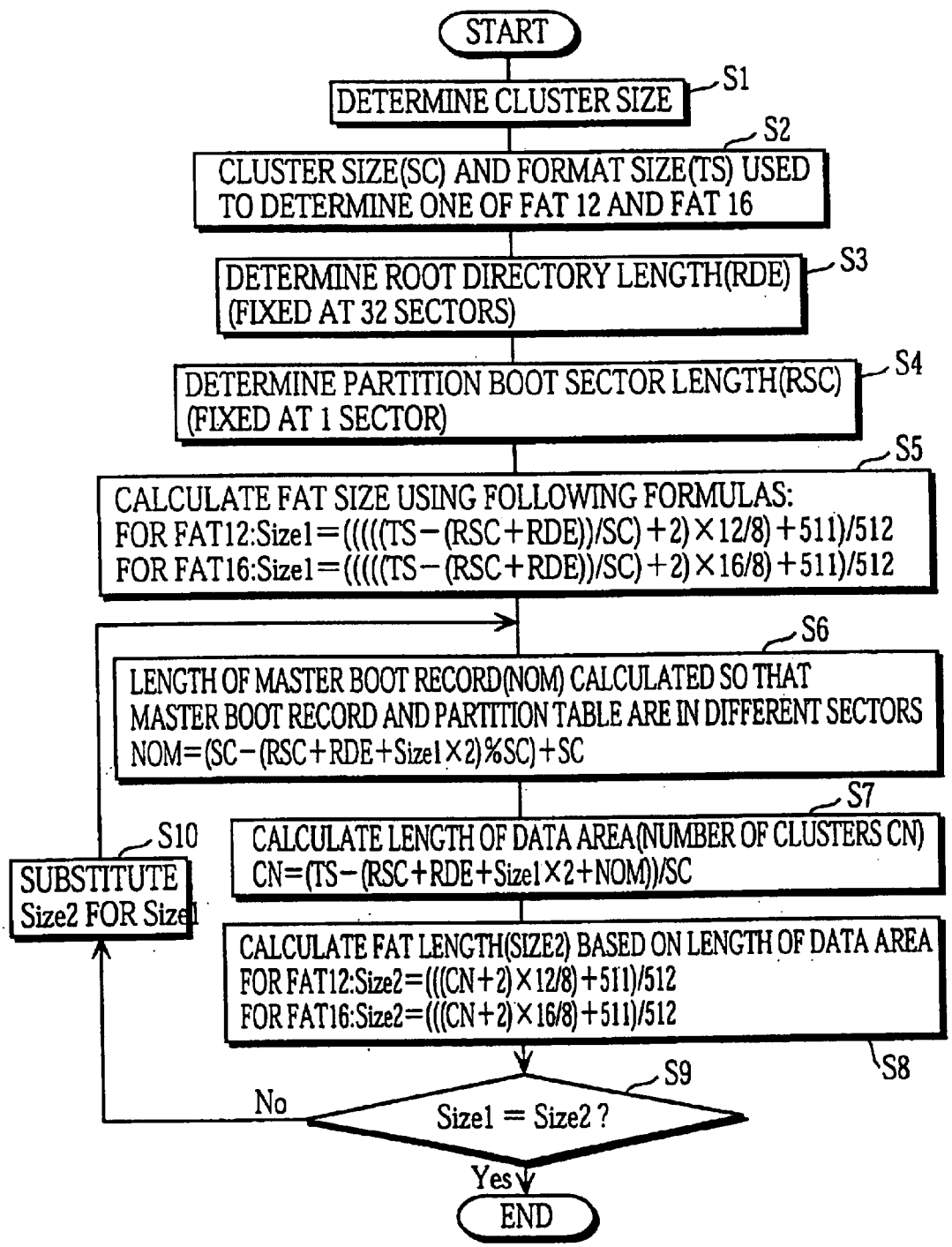
FIG. 13 is a flowchart showing an initialization procedure or the volume area.

This concludes the explanation of the flowchart in FIG. 13. Next, an example calculation illustrating how the size of the partition area and the system area are calculated when the TS is 65568 is described.

Since the TS is 65568, at step S1 the file system operation unit 9 determines the cluster size to be 32 sectors. Once the cluster size has been determined to be 32 sectors, at step S2, the file system operation unit 9 determines that a FAT12 file system should be used by referring to the cluster size SC and the total sector size TS. In these embodiments, the size of the RDE and the RSC are fixed at 32 sectors and 1 sector, respectively, so the calculation of steps S3 and S4 is not performed. At step S5, the file operation system calculates the data length of the FAT using equations 11 and 12. Here, since the FAT is FAT12, the following calculation is performed.

$$\text{Size } 1 = (((((TS-(RSC+RDE))/SC)+2)\times 12/8)+511)/512$$
$$= (((((65568-(1+32))/SC)+2)\times 12/8)+511)/512$$
$$= 7 \text{ sectors.}$$

Once the Size 1 has been calculated, at step S6, the file system operation unit 9 calculates the NOM using equation 12 so that the master boot record and the partition boot sector are in different clusters.

$$NOM = (SC-(RSC+RDE+\text{Size } 1\times 2)\% \ SC)+SC$$
$$= (32-(1+32+7\times 2)\% \ 32)+32$$
$$= 49 \text{ sectors.}$$

Once the NOM has been calculated, at step S7, the file system operation unit 9 calculates the number of clusters in the regular area using the equation 13.

$$CN = (TS-(RSC+RDE+\text{Size } 1\times 2+NOM))/SC$$
$$= (65568-(1+32+7\times 2+49))/32$$
$$= 2046 \text{ clusters.}$$

At step S8, the file system operation unit 9 calculates the data length of the FAT using equation 14.

$$\text{For } FAT12: \text{Size } 2 = (((CN+2)\times 12/8)+511)/512$$
$$= (((2046+2)\times 12/8)+511)/512$$
$$= 6 \text{ sectors.}$$

At step S9, the file system operation unit 9 compares the Size 1 calculated at step S5, and the Size 2 calculate at step S8. Here, Size 1 is 7 sectors, and Size 2 is 6 sectors. Since these are not identical values, the file system operation unit 9 moves to step S10, substitutes Size 1 for Size 2, moves to step S6 again and recalculates the NOM.

$$NOM = (SC-(RSC+RDE+\text{Size } 1\times 2)\% \ SC)+SC$$
$$= (32-(1+32+6\times 2)\% \ 32)+32$$
$$= 51 \text{ sectors.}$$

Once the NOM has been calculated, at step S7, the file system operation unit 9 calculates the number of clusters in the regular area.

$$CN = (TS - (RSC + RDE + \text{Size } 1 \times 2 + NOM))/SC$$
$$= (65568 - (1 + 32 + 6 \times 2 + 49))/32$$
$$= 2046 \text{ clusters.}$$

At step S8, the data length of the FAT is calculated.

For FAT12: Size 2=(((CN+2)×12/8)+511)/512

For FAT12: Size 2 = (((CN + 2) × 12/8) + 511)/512
$$= (((2046 + 2) \times 12/8) + 511)/512$$
$$= 6$$

Following this calculation, at step S9, the file system operation unit 9 compares Size 1 and Size 2, and since the two values are identical, the processing of the flowchart ends.

As shown above, the present embodiment enables the NOM to be calculated so that the size of the partition area and the size of the system area are an integral multiple of the number of erasable blocks, thus ensuring that clusters are not stored straddling two erasable blocks. Cluster boundaries can be aligned with erasable block boundaries, and the boundary of the volume management information with an erasable block boundary, so that when one cluster is rewritten or overwritten, the number of erasable blocks that needs to be erased is limited to one, thereby reducing the number of times that any one erasable block needs to be erased. Consequently, the time required to write data into the semiconductor memory card 100 is shortened, and a nonvolatile memory 1 with a longer lifespan can be realized.

Second Embodiment

A second embodiment proposes an arrangement in which the volume area is divided into an area to which the general user can gain access (the user data area), and an area that stores data securely (the protected area).

Figure 14:
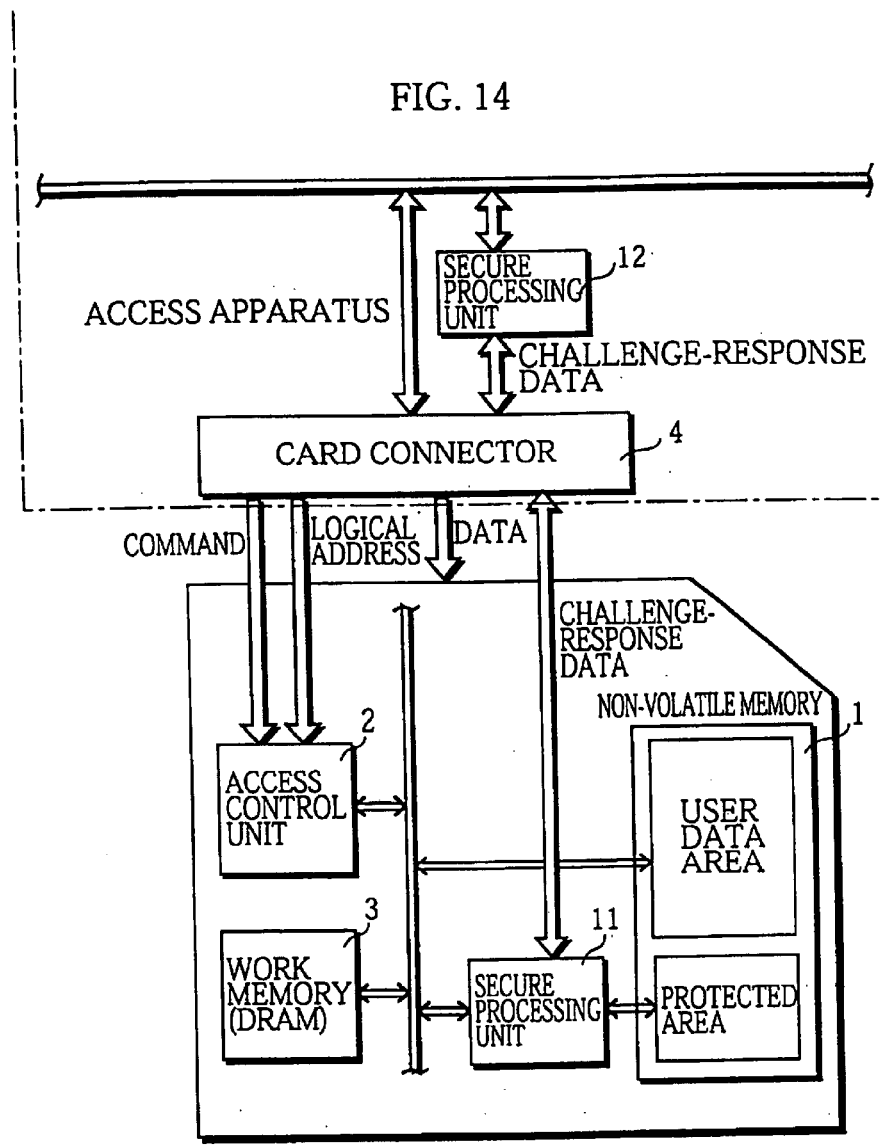
FIG. 14 shows a structure of an access apparatus and a semiconductor memory card in a second embodiment.

A structure of an access apparatus 200 and a semiconductor memory card 100 in the second embodiment are shown in FIG. 14. In the internal structure shown in the drawing, in contrast to that shown in FIG. 3A, the nonvolatile memory 1 has been provided with a protected area, and the semiconductor memory card 100 and the access apparatus 200 have been provided respectively with secure processing units 11 and 12.

Figure 15:
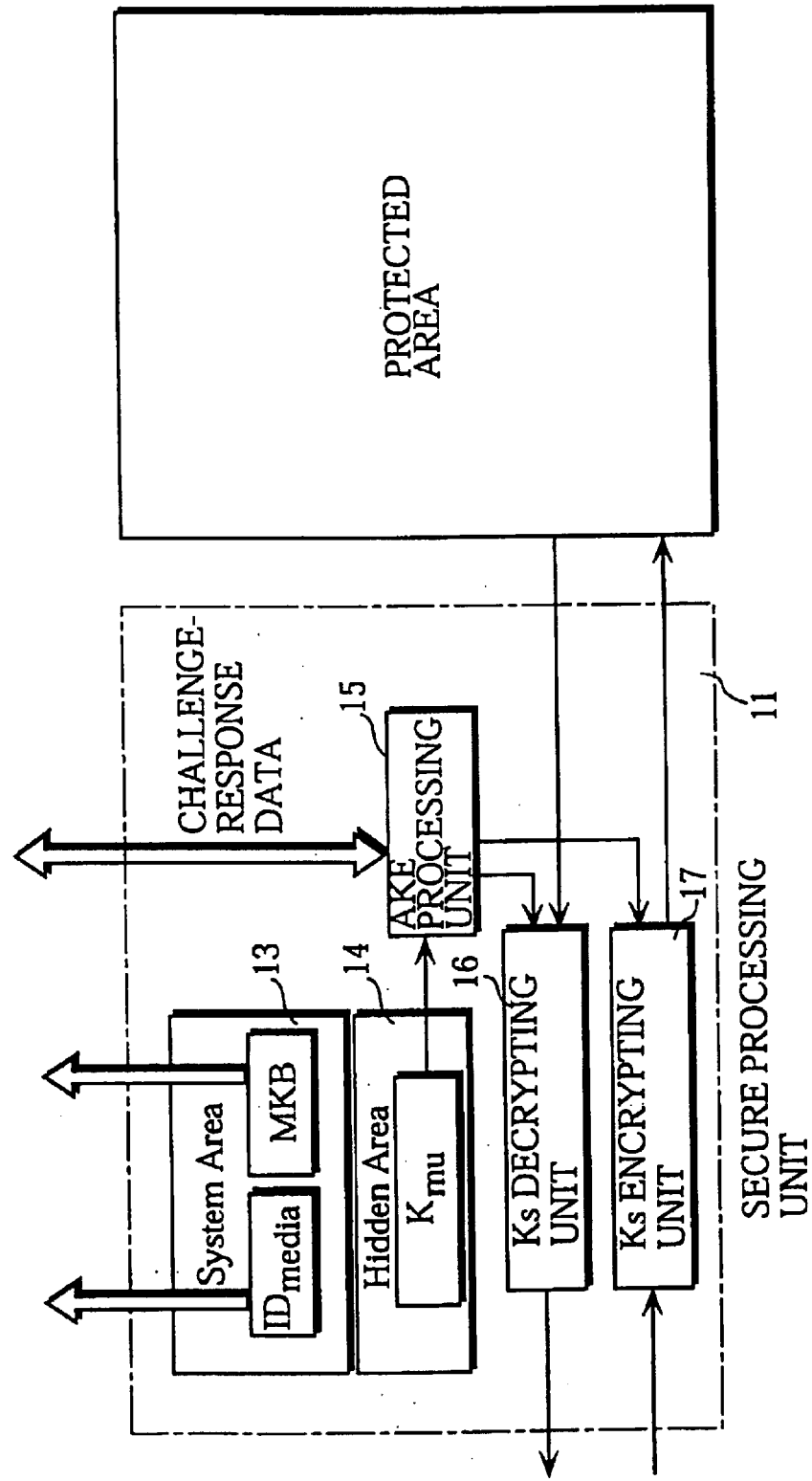
FIG. 15 shows an internal structure of a secure processing unit 11.

The following is an explanation of the secure processing unit 11 provided in order to perform secure reading and writing to and from the protected area in the nonvolatile memory 1. As shown in FIG. 15, the secure processing unit 11 includes a system area 13, a hidden area 14, an AKE processing unit 15, a Ks decrypting unit 16, and a Ks encrypting unit 17.

The system area 13 is a read-only area storing a media key block (MKB) and a media-ID. The MKB and media-ID stored in this area cannot be rewritten. Suppose that the semiconductor memory card 100 is connected to an access apparatus 200, and the MKB and media-ID is read by that access apparatus 200. If the access apparatus 200 correctly performs a specified calculation using the MKB, the media-ID and a device key Kd held internally, it can obtain a correct encryption key Kmu.

The hidden area 14 stores a correct value for the encryption key Kmu, in other words the encryption key Kmu that should be obtained if the access apparatus 200 performs correct calculation using a valid device key Kd.

The AKE (authentication and key exchange) processing unit 15 performs mutual authentication between the access apparatus 200 and the semiconductor memory card 100 using the challenge-response method, verifies the authenticity of the opposing device, and if the opposing device is invalid, stops processing. If the opposing device is valid, however, an encryption key (session key Ks) is shared by the access apparatus 200 and the semiconductor memory card 100. Authentication performed by the access apparatus 200 has three phases. First, in a first challenge phase, the access apparatus 200 generates a random number, encrypts the random number using the encryption key Kmu, and transmits the encrypted random number to the semiconductor memory card 100 as a challenge value A. Then, in a first response phase, the semiconductor memory card 100 uses the encryption key Kmu stored internally to decrypt the challenge value A, and transmits the decrypted value to the access apparatus 200 as a response value B. Following this, in a first verify phase, the access apparatus 200 decrypts the challenge value A held internally using its encryption key Kmu, and compares the decrypted value with the response value B transmitted from the semiconductor memory card 100.

Authentication performed by the semiconductor memory card 100 also has three phases. First, in a second challenge phase, the semiconductor memory card 100 generates a random number, encrypts the random number using the encryption key Kmu, and transmits the encrypted random number to the access apparatus 200 as a challenge value C. Then, in a second response phase, the access apparatus 200 uses the encryption key Kmu stored internally to decrypt the challenge value C, and transmits the decrypted value to the semiconductor memory card 100 as a response value D. Following this, in a second verify phase, the semiconductor memory card 100 decrypts the challenge value C held internally using its encryption key Kmu, and compares the decrypted value with the response value D transmitted from the access apparatus 200.

If the access apparatus 200 uses an invalid encryption key Kmu to perform mutual authentication, challenge value A and response value B in the first verify phase and challenge value C and response value D in the second verify phase will be judged to be non-matching values, and mutual authentication will be stopped. If the authenticity of the opposing devices is verified, however, the AKE processing unit 15 calculates an exclusive OR of challenge value A and challenge value C and obtains the session key Ks by decrypting the exclusive OR using the encryption key Kmu.

When encrypted data to be written into the protected area is output from the access apparatus 200 connected to the semiconductor memory card 100, the Ks decrypting unit 16 uses the session key Ks to decrypt this data which has already been encrypted by session key Ks before being output. The data obtained by this decryption is written into the protected area, as the original data.

The Ks encrypting unit 17 receives a command from the access apparatus 200 connected to the semiconductor memory card 100 instructing it to read data, encrypts the data stored in the protected area using the session key Ks, and then outputs the encrypted data to the access apparatus 200. Reading and writing of data to and from the protected area is performed following decryption performed by the Ks decrypting unit 16 and encryption performed by the Ks encrypting unit 17, so the protected area can only be accessed when the semiconductor memory card 100 and a connected access apparatus 200 have performed AKE processing successfully.

Figure 16:
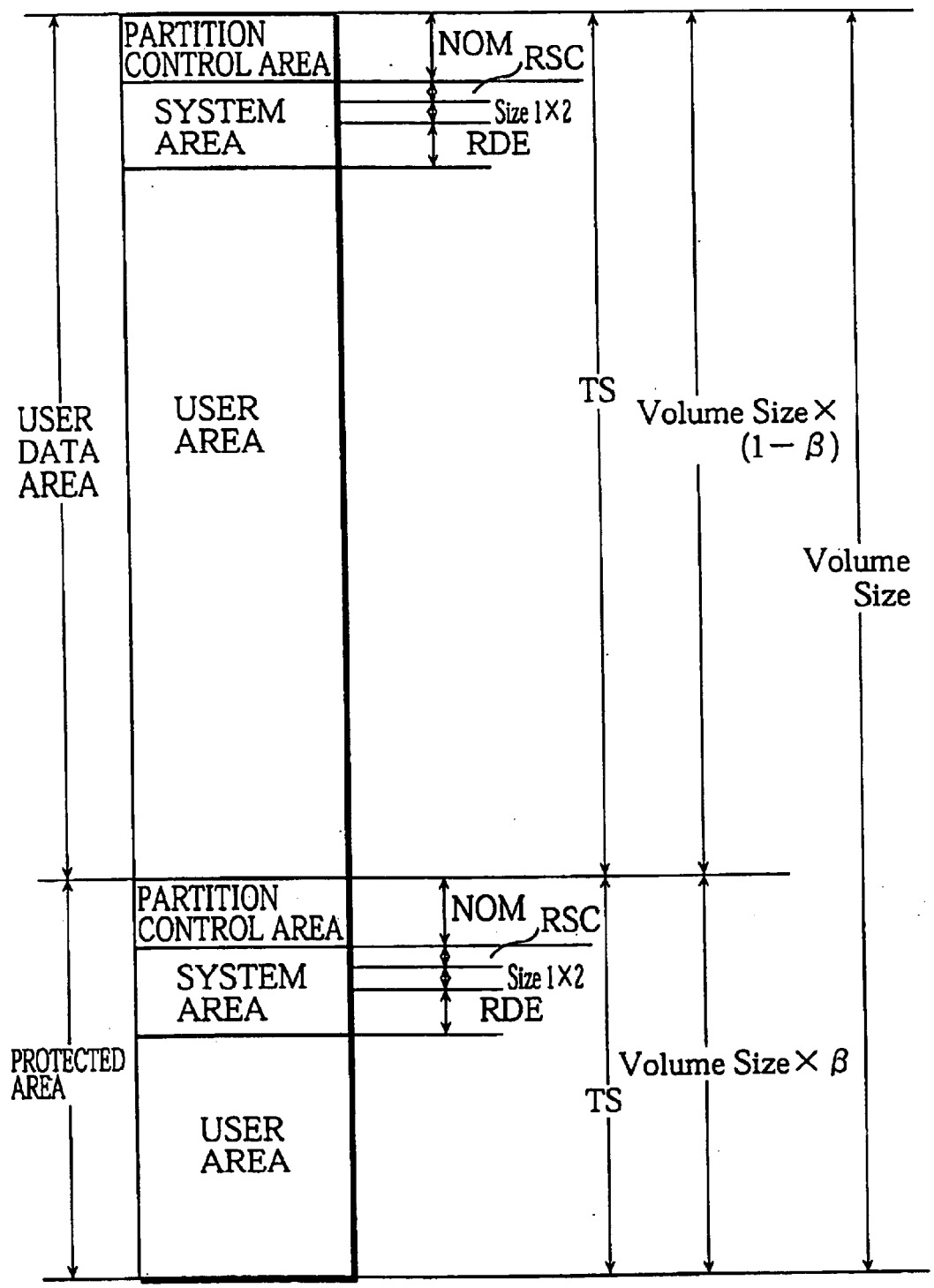
FIG. 16 shows a detailed structure of a volume area provided with a protected area.

Next, the format of the volume area in the second embodiment is explained, with reference to the detailed drawing of the volume area including the protected area shown in FIG. 16. In the drawing, if the total size of the volume area is 'volume size', the user data area is an area 'volume size× (1−β)' extending from the start of the volume area, and an area 'volume size×β' following the user data area is allocated to the protected area. Here, β is a value for which the minimum setting is 0.01. To take one example, if the volume size is 64 MB and β is 0.01, the protected area is set at 640 KB. The format of the user data area and the protected area is realized when the file system operation unit 9 executes the initialization procedure shown in FIG. 9.

The following describes an example calculation that is performed to calculate the size of the partition control area and the system area in the user data area, when the total number of sectors TS in the user data area is 124160.

Since the TS is 124160, at step S1, the file system operation unit 9 determines the cluster size to be 32 sectors. Once the cluster size has been determined to be 32 sectors, at step S2, the file system operation unit 9 determines that a FAT12 file system should be used by referring to the cluster size SC and the total sector size TS. In these embodiments the sizes of the RDE and the RSC are fixed respectively at 32 sectors and 1 sector, so the calculation of steps S3 and S4 is not performed. At step S5, the file operation system calculates the data length of the FAT using equations 11 and 12. Here, since the FAT is FAT12, the following calculation is performed.

$$\text{Size } 1 = (((((TS - (RSC + RDE))/SC) + 2) \times 12/8) + 511)/512$$
$$= (((((124160 - (1 + 32))/32) + 2) \times 12/8) + 511)/512$$
$$= 12 \text{ sectors.}$$

Once the Size 1 has been calculated, at step S6, the file system operation unit 9 calculates the NOM using equation 12 so that the master boot record and the partition boot sector are in different clusters.

$$NOM = (SC - (RSC + RDE + \text{Size } 1 \times 2) \% \ SC) + SC$$
$$= (32 - (1 + 32 + 12 \times 2) \% \ 32) + 32$$
$$= 39 \text{ sectors.}$$

Once the NOM has been calculated, at step S7, the file system operation unit 9 calculates the number of clusters in the regular area using the equation 13.

$$CN = (TS - (RSC + RDE + \text{Size } 1 \times 2 + NOM))/SC$$
$$= (124160 - (1 + 32 + 12 \times 2 + 49))/32$$
$$= 3877 \text{ clusters.}$$

At step S8, the file system operation unit 9 recalculates the data length of the FAT using equation 14.

$$\text{For } FAT12 : \text{Size } 2 = (((CN + 2) \times 12/8) + 511)/512$$
$$= (((3877 + 2 \times 12/8) + 511)/512$$
$$= 12 \text{ sectors.}$$

At Step S9, the file system operation unit 9 compares the Size 1 calculated at step S5, and the Size 2 calculated at step S8. Here, both Size 1 and Size 2 are calculated to be 12 sectors, so they are judged to be identical values and the processing of the flowchart ends.

Figure 17:
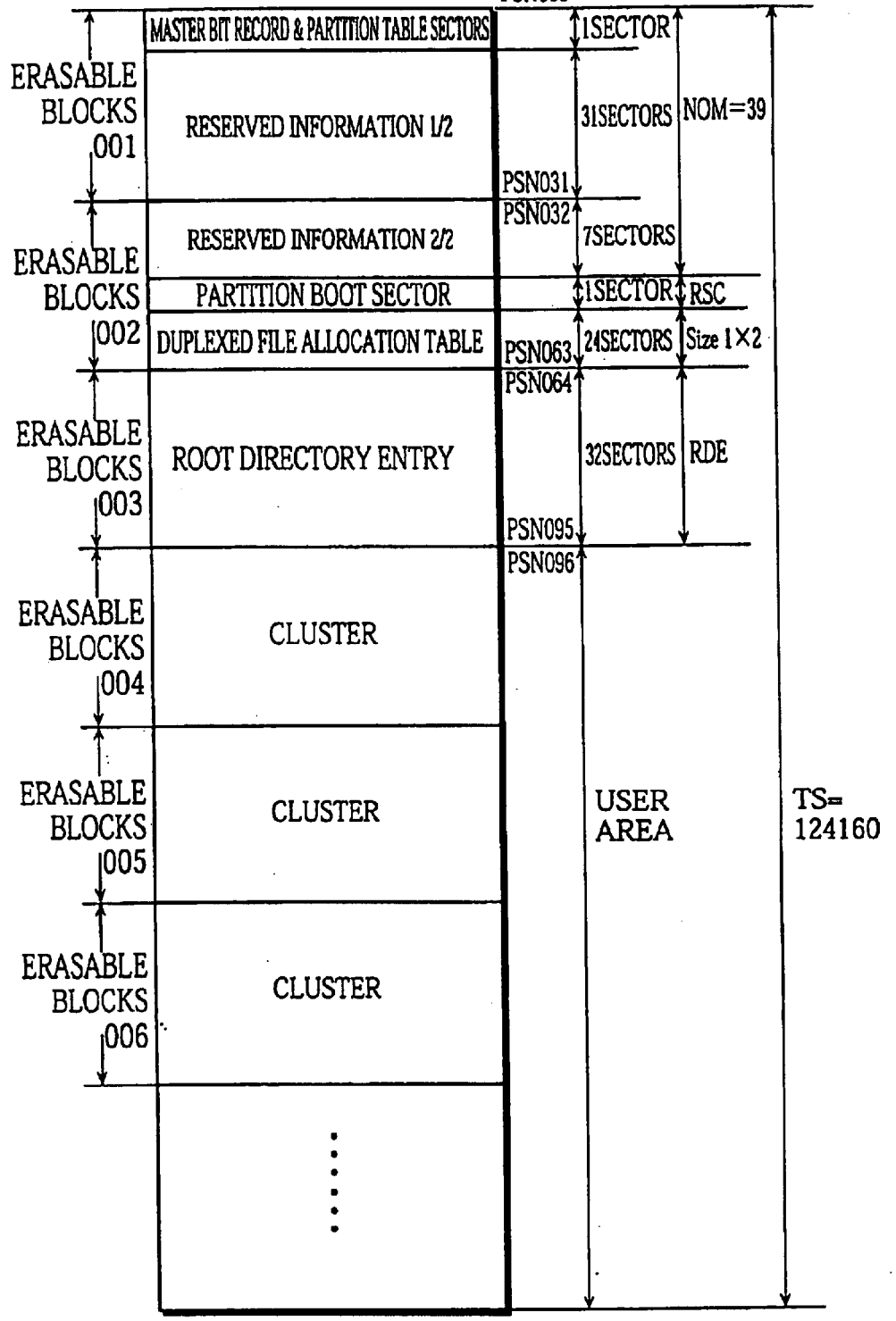
FIG. 17 shows an example layout for the user data area.

A layout of the protected area when the system area, and the partition control area are formed with a TS, Size 1, and NOM sized as calculated by the aforementioned calculations, is shown in FIG. 17. If this drawing is compared with FIG. 12, it can be seen that the size of the duplexed FAT has increased from 14 to 24 sectors, while the size of the reserved information 1/2 and 2/2 has shrunk from 17 to 7 sectors, so that the partition control area and the system area fit exactly into three erasable blocks.

The following describes an example calculation that is performed to calculate the size of the partition control area and the system area in the protected area, when the total number of sectors TS in the user data area is 1280.

Since the TS is determined to be 1280, at step S1, the file system operation unit 9 determines the cluster size to be 2 sectors (1 KB of memory, and only ¹⁄₁₆th the size of the user data area). Once the cluster size has been determined to be 2 sectors, at step S2, the file system operation unit 9 determines that a FAT12 file system should be used by referring to the cluster size SC and the total sector size TS. In these embodiments, the sizes of the RDE and the RSC are fixed at 32sectors and 1 sector, respectively, so the calculation of steps S3 and S4 is not performed. At step S5, the file operation system calculates the data length of the FAT using equations 11 and 12. Here, since the FAT is FAT12, the following calculation is performed.

$$\text{Size } 1 = (((((TS - (RSC + RDE))/SC) + 2) \times 12/8) + 511)/512$$
$$= (((((1280 - (1 + 32))/2) + 2) \times 12/8) + 511)/512$$
$$= 2 \text{ sectors.}$$

Once the Size 1 has been calculated, at step S6, the file system operation unit 9 calculates the NOM using equation 12 so that the master boot record and the partition boot sector are in different clusters.

$$NOM = (SC - (RSC + RDE + \text{Size } 1 \times 2) \% \ SC) + SC$$
$$= (2 - (1 + 32 + 2 \times 2) \% \ 2) + 2$$
$$= 3 \text{ sectors.}$$

Once the NOM has been calculated, at step S7, the file system operation unit 9 calculates the number of clusters in the regular area using the equation 13.

$$CN = (TS - (RSC + RDE + \text{Size } 1 \times 2 + NOM))/SC$$
$$= (1280 - (1 + 32 + 2 \times 2 + 3))/32$$
$$= 620 \text{ clusters.}$$

At step S8, the file system operation unit 9 calculates the data length of the FAT using equation 14.

$$\text{For } FAT12 : \text{Size } 2 = (((CN + 2) \times 12/8) + 511)/512$$
$$= (((620 + 2) \times 12/8) + 511)/512$$
$$= 2$$

At Step S9, the file system operation. unit 9 compares the Size 1 calculated at step S5, and the Size 2 calculated at step S8. Here, Size 1 and Size 2 are both calculated to be 2 sectors, so they are judged to be identical values and the processing of the flowchart is completed.

Figure 18:
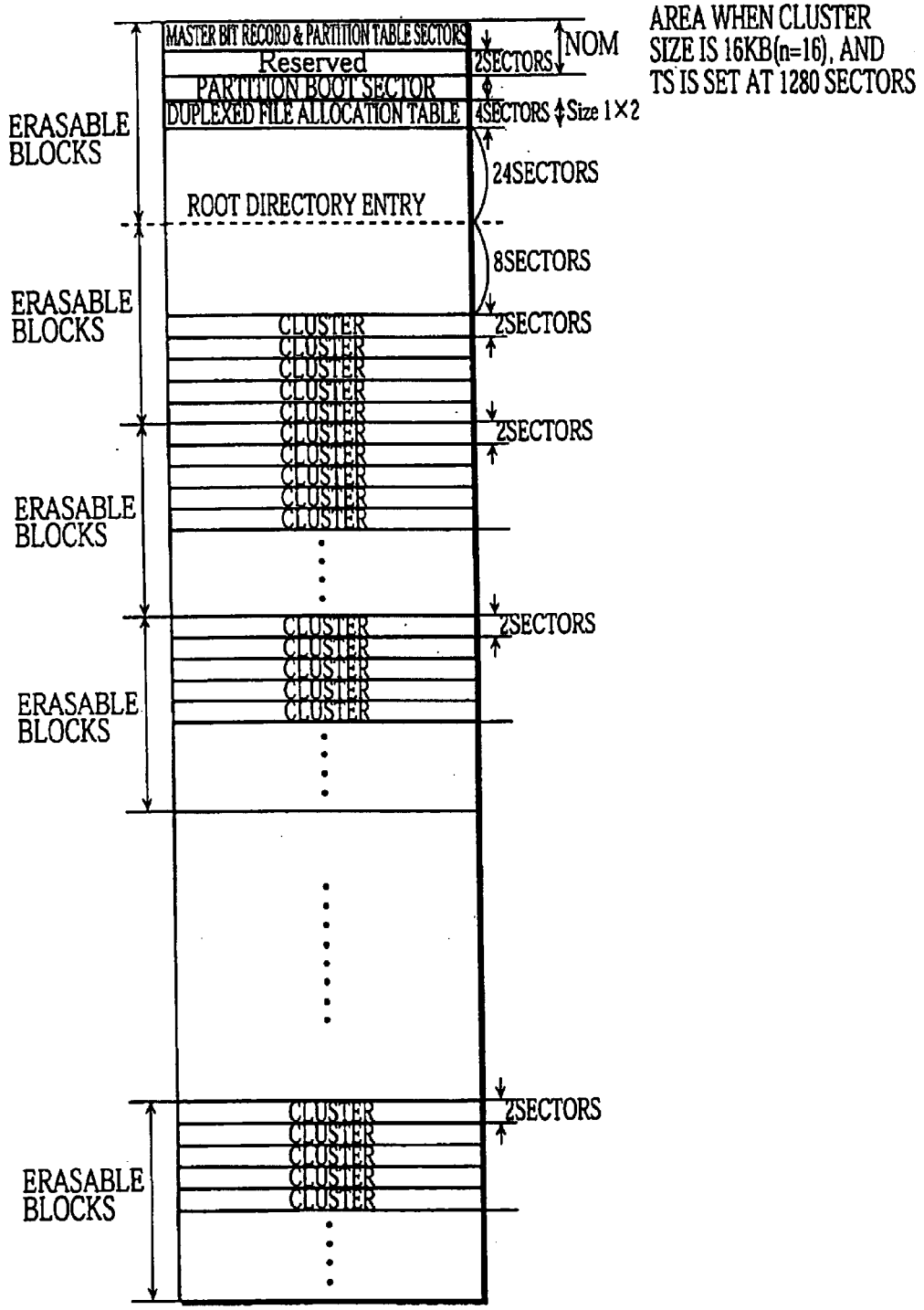
FIG. 18 shows an example layout for the protected area.

A layout of the protected area when the system area, and the partition control management area are formed with a TS, Size 1, and NOM sized as calculated by the aforementioned calculations, is shown in FIG. 18. In this embodiments, both the user data area and the protected area have a partition control area, a system area, and a protected area, so each is treated as an independent physical medium by the access apparatus 200. Thus, although the user data area and the protected area have different cluster sizes, the boundaries of clusters in both the user data area and the protected area can be aligned with the boundaries of erasable blocks.

In the above embodiment, even if the volume area includes two areas, the user data area and the protected area, the boundaries of such areas are aligned with the boundaries of erasable blocks, and so rewriting of clusters can be completed in a short time. In addition, the number of times that erasable blocks need to be erased is reduced, so that the lifespan of the nonvolatile memory is not needlessly shortened.

Third Embodiment

The third embodiment relates to an improvement used when data stored in erasable blocks is erased, the erasable blocks being managed using a logical address and a physical address. A structure of an access control unit 2 in the third embodiment is shown in FIG. 19. The access control unit 2 in the drawing includes a command decoding unit 21, a logical/physical address conversion unit 22, a read control unit 23, an allocation changing unit 24, a write control unit 25, an erase control unit 26, and a modify control unit 27.

The command decoding unit 21 receives a command issued by an access apparatus 200, and decodes the original content of the command at the point of issue. If a read command is received, the command decoding unit 21 instructs the read control unit 23 to read data from the nonvolatile memory 1 (Read). If a write command is received, the command decoding unit 21 instructs the write control unit 25 to write data into the nonvolatile memory 1 (Write). If a write command specifying an unerased block as an access target is received, the command decoding unit 21 instructs the modify control unit to modify (rewrite) data stored in the nonvolatile memory 1 (Modify) If an obtain status command is received, the command decoding unit 21 instructs the allocation changing unit 24 to read an erased block list (described later in this specification). If an erase command is received, the command decoding unit 21 instructs the allocation changing unit 24 to erase the specified erasable block.

The logical/physical address exchanging unit 22 has an address correspondence table showing correspondences between logical and physical addresses for erasable blocks. When a logical address that is to be accessed is specified by the access apparatus 200, the logical/physical address exchanging unit 22 refers to the correspondence for the logical address shown in the address correspondence table, exchanges the logical address for a corresponding physical address, and outputs the physical address to the read control unit 23, the allocation changing unit 24, and the modify control unit 27.

When a read command is issued by the access apparatus 200, the write control unit 23 performs control so as to have the access apparatus 200 read data stored in the read location specified by the read command.

The allocation changing unit 24 holds an erased block list in which physical addresses for erasable blocks that have been erased are arranged in a first in, first out (FIFO) format. When a read command is issued by the access apparatus 200, the allocation changing unit 24 judges whether a physical address corresponding to the logical address specified as a read destination is present in the erased block list. If such a physical address is judged to be present, the allocation changing unit 14 outputs the physical address to the write control unit 25, and deletes the physical address from the erased block list. If the corresponding physical address indicates an erasable block that has not yet been erased, the allocation changing unit 24 allocates a physical address at the start of the erased block list to the logical address as the read destination, and outputs the allocated physical address to the read control unit 25, while adding the physical address that was previously allocated to the logical address as the read destination to the end of the erased block list. Furthermore, when a obtain status command is issued by the access apparatus 200, the allocation changing unit 24 changes physical addresses shown in the erased block list to logical addresses, and outputs an erased block list, indicating erased erasable blocks by using a table of logical addresses, to the access apparatus 200. If an erase command indicating a logical address has already been issued by the access apparatus 200, the allocation changing unit 24 controls operations so that a physical address corresponding to this logical address is added to the erased block list.

The write control unit 25 writes data into the nonvolatile memory 1 in accordance with the physical address output from the allocation changing unit 24, when a write command to write a block is received.

The erase control unit 26 performs polling at fixed intervals to determine whether a physical address for an unerased block has been added to the erased block list. If such a physical address has been added, the erase control unit 24 erases the erasable block indicated by the physical address.

The modify control unit 27 reads data from the nonvolatile memory 1 to the work memory 3, and modifies the data while it is being held in the work memory 3, before writing the modified data from the work memory 3 to the nonvolatile memory 1, when a write command to modify an erasable block in which data is already written is received. The modify processing performed by the modify control unit 27 is realized by cooperative processing with the allocation changing unit 24. The flow of the data modify processing performed by the modify control unit 27 is shown in time sequence in FIG. 20.

In the initial state shown in FIG. 20A, data is currently stored in shaded blocks (blocks with physical addresses 001, 002, 004, 007 to 015), and the remaining blocks 003, 005, and 006 have been erased. Physical addresses 003, 005, and 006 representing erased blocks are arranged in the erased block list. In an address correspondence table showing correspondences between logical and physical addresses, the logical addresses 001, 002, 003, 004, and 005 correspond respectively to physical addresses 001, 002, 003, 004, and 005.

Here, if a write command indicating that a different value is to be written into an erasable block with the logical address 001 is issued by the access apparatus 200, the write control unit 25 transfers the data written in the block with the logical address 001 from the nonvolatile memory 1 to the work memory 3 (see arrow (1) Read in FIG. 20A). Then, the write control unit 25 modifies the data written in the block with the logical address 001 while this block is held in the work memory 3 (see arrow (2) Modify in FIG. 20A).

Next, in FIG. 20B, the modify control unit 27 reads a physical address 003 at the front of the erased block list, as shown by an arrow BN1, and writes data in to the block indicated by the physical address 003, as shown by arrow (3) Write. Then, in FIG. 20C, the modify control unit 27 arranges the physical address 001, whose corresponding block should be erased, in the erased block list, as shown by arrow (4).

Lastly, the modify control unit 27 interchanges logical address/physical address correspondences, as shown in FIG. 20D. Here, the physical address 003 is allocated to logical address 001, and the physical address 001 is allocated to logical address 003. Data can thus be overwritten into the logical address 001 by writing data into the physical address 003, and then switching the correspondences between logical and physical addresses.

Figure 21:
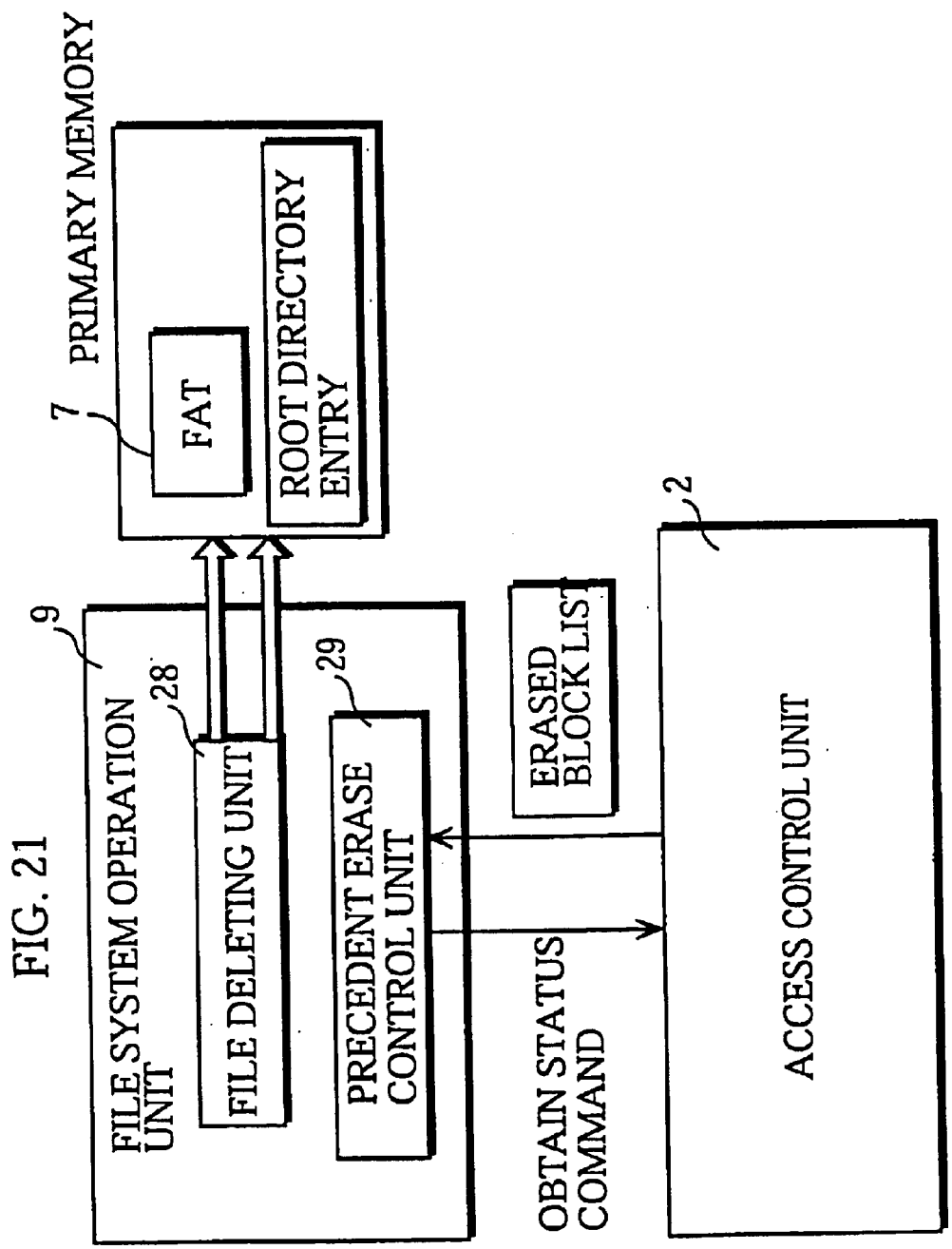
FIG. 21 shows an internal structure of a file system operation unit 9 in the third embodiment.

The following is an explanation of the internal structure of the access apparatus 200. FIG. 21 shows an internal structure of a file system operation unit 9 in the access apparatus 200 of the third embodiment. The file system operation unit 9 shown in the drawing includes a file deleting unit 28, and a precedent erase control unit 29.

The file deleting unit 28 deletes files by updating a FAT read from the primary memory 7, and writing the updated FAT into the semiconductor memory card 100. If the application program 8 issues an instruction to delete a file, the file deleting unit 28 executes file deletion by setting FAT entries corresponding to clusters storing sections of this file at '0', indicating that these clusters are unused. However, the clusters (erasable blocks) storing file sections have not been returned to a blank state, so the clusters must first be erased before another file can be recorded in the same clusters. Therefore, the amount of time required for erasure processing increases proportionally with increases in the number of times that an old file is deleted and a new file is recorded.

The precedent erase control unit 29 issues an obtain status command to the semiconductor memory card 100, instructing it to read the erased memory free list, while waiting for an instruction from the application program 8. Once the command has been issued, and the erased memory free list output, the precedent control unit 29 receives the output erased free list, and compares it with the FAT to specify erasable blocks corresponding to clusters that are set as unused in the FAT. (When one erasable block includes a plurality of clusters, only erasable blocks formed entirely from unused clusters can be specified). Then, of these erasable blocks, blocks that are not present in the erased block list are also specified. The blocks are erasable blocks that are both unused and unerased, and the precedent erase control unit 29 issues an erase command to the semiconductor memory card 100 instructing that such blocks be erased. The erase command includes a logical address specification, and an instruction to add a physical address corresponding to this logical address to the erased block list. If a physical address is added to the erased block list by issuing such an erase command, the block indicated by the erase command is erased in the same way as other unused and unerased erasable blocks, when polling is performed by the erase control unit 26. The same procedure is performed for all unused and unerased blocks. The detailed procedure performed by the precedent erase control unit 29 is explained below, with reference to the flowchart of FIG. 22.

In this embodiment, if the precedent erase control unit 29 is activated, it moves to the loop processing of steps S21 to S22. At step S21, the precedent erase control unit 29 judges whether an access instruction has been received from the application program 8, and at step S22, judges whether a predetermined polling time has passed. If an instruction has been received from the application program 8, the precedent erase control unit 29 moves to step S23, and performs a file system operation and access of the semiconductor memory card 100 in accordance with the instruction. If the predetermined polling time has passed, the precedent erase control unit 29 moves from step S22 to step S24, and issues an obtain status command for reading the erased free list to the semiconductor memory card 100. Following this, at step S25, the precedent erase control unit 29 is in a wait state, waiting for the erased block list to be read. Once the erased block list has been read, at step S26 the precedent erase control unit 29 specifies logical addresses for all erasable blocks that are formed from clusters set as unused in the FAT and that are not present in the erased block list.

At step S27, the precedent erase control unit 29 judges whether unused erasable blocks that have not yet been erased exist, and if no such block exists, returns immediately to the loop processing of steps S21 to S22. If such blocks exist, the precedent erase control unit 29 performs the loop processing of steps S28 to S30. In other words, the precedent erase control unit 29 issues erase commands to the semiconductor memory card 100 stipulating erasure of data at each of the physical addresses for the unused and as yet unerased erasable blocks specified at step S26. Once these commands have been issued, the physical addresses for each of these blocks are added to the erased block list, and are subject to erasure.

Figure 23A:
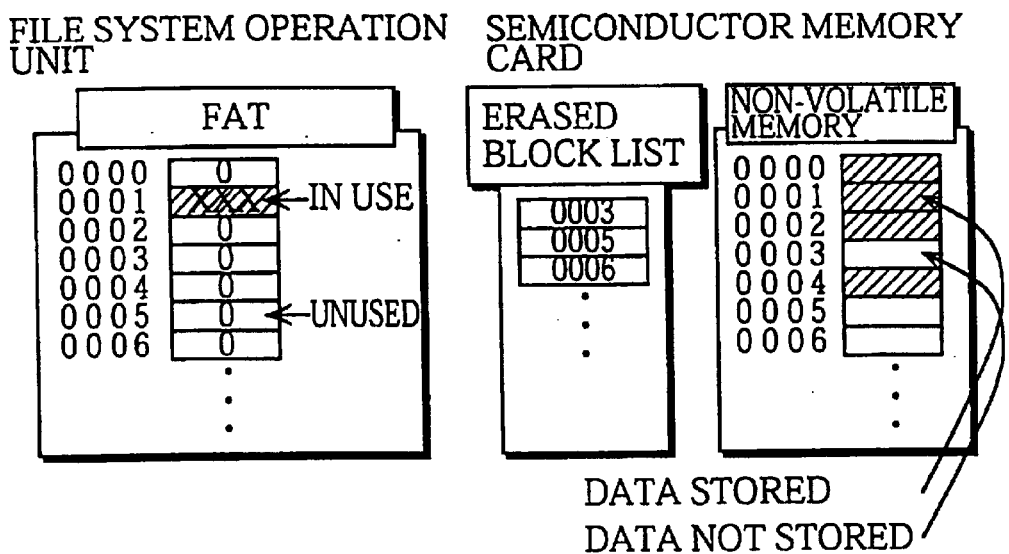
FIGS. 23A and 23B show an erasing process performed on an erasable block in the third embodiment.
Figure 23B:
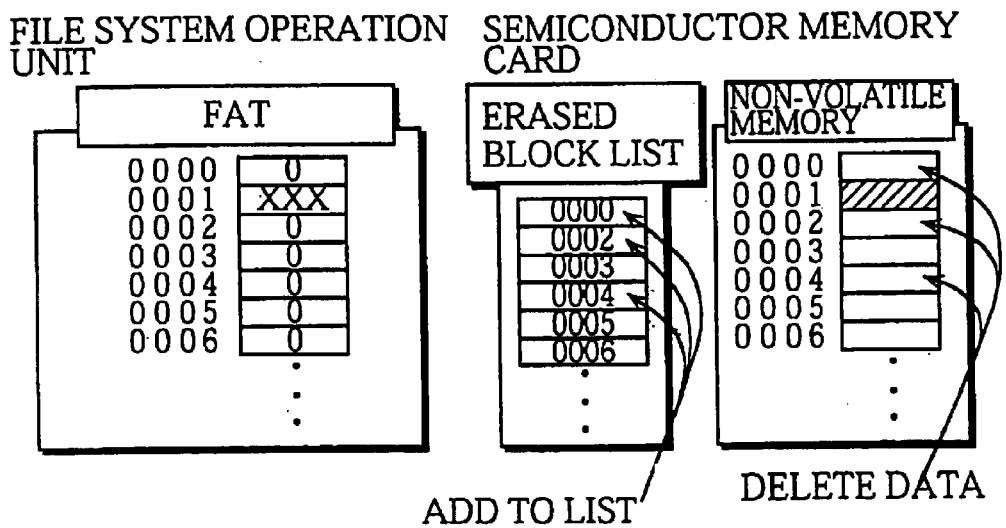

The following is a more detailed explanation of the above operation of the precedent erase control unit 29, described with reference to FIGS. 23A and 23B. In an initial state shown in FIG. 23A, an address 0001 for an erasable block is set in the FAT as being in use, and physical addresses 0003, 0005, and 0006 are arranged in the erased block list as addresses of erased blocks. Data is stored in blocks in the file system that are shaded in the drawing (addresses 0000, 0001, 0002, 0004). In this state, if there is no instruction from the application program 8, and the predetermined polling time has passed (step S21, No, step S22, Yes), the file system operation unit 9 in the access apparatus 200 reads the erased block list by issuing an obtain status command to the semiconductor memory card 100 (step S24), and compares the read erased block list with the FAT (step S25). As a result of this comparison, blocks that are set as unused in the FAT and whose logical addresses do not exist in the erased block list (erasable blocks with addresses 0000, 0002, 0004) are specified (step S26). Since these blocks are not in use, the file system operation unit 9 issues erase commands to the semiconductor memory card 100 to have these erasable blocks erased (steps S28 to S30). Consequently, the addresses 0000, 0002, and 0004 are added to the erased block list, as shown in FIG. 23B, and the erasable blocks indicated by these addresses are erased.

In the above embodiment, the access apparatus 200 reads the erased block list from the semiconductor memory card 100, and compares the FAT with the read erased block list in order to specify unused erasable blocks that have not yet been erased, and instructs the semiconductor memory card 100 to erase these blocks. As a result, the file system operation unit 9 can erase unused erasable blocks that are still unerased while waiting for an instruction from the application program 9, and so erasure of the unused blocks can be performed more efficiently.

In addition, erasure of unused blocks can be performed whenever the access apparatus 200 is free, so that the opportunities for performing block erasure can be greatly increased. As a result, there is no danger of there being insufficient physical addresses in the erased block list, and the efficiency of processing performed when blocks are modified and overwritten is greatly improved.

In the access apparatus 200 of this embodiment, the erased block list is read from the semiconductor memory card 100, and unused and as yet unerased blocks are specified. However, the erase control unit 26 inside the access control unit 2 of the semiconductor memory card 100 may specify blocks that are both unused and unerased by referring to the FAT, and then delete such blocks. Here, the access control unit 2 exchanges physical addresses included in the erased block list for logical addresses, and passes the exchanged addresses to the access apparatus 200. However, the erased block list and the address correspondence table may be passed to the access apparatus 200, and exchange of physical addresses for logical addresses performed in the access apparatus 200. Data erasure may be performed when a file is deleted, or as parallel processing when another command is being executed. Furthermore, other information such as an unerased block list that manages the physical addresses of unerased erasable blocks may be used instead of the erased block list that manages the physical addresses of erased erasable blocks. This embodiment is described using a FAT, but information may be stored as a list or other similar format.

Fourth Embodiment

The fourth embodiment describes an improvement realized when the processing of the third embodiment is performed using an erased block table instead of an erased block list. FIG. 24 shows an internal structure for an access apparatus 200 2 in the fourth embodiment. If this drawing is compared with FIG. 19, it can be seen that the erased block list has been replaced by an erased block table. The erased block table in the fourth embodiment is formed from entries corresponding to each erasable block. If a block is erased, the corresponding entry is set at '1' and if a block is unerased, the corresponding entry is set at '0'. The erased block table expresses the erase state of each erasable block by setting either '1' or '0' in the erased block table.

As a result of the erased block list having been replaced by the erased block table, the processing performed by the write control unit 25 and the erase control unit 26 in the fourth embodiment differs from that performed in the third embodiment in the following respect.

When a write command is generated by the access apparatus 200, the write control unit 25 in the fourth embodiment refers to the erased block table and judges whether the write destination specified by the command is erased, and whether it is an unused block. Then, if the write destination block is an unerased block, the write control unit 25 has the erase control block 26 erase data from the block before writing new data into the block. In other words, the write control unit 25 of the fourth embodiment erases data before performing a data write.

Figure 25:
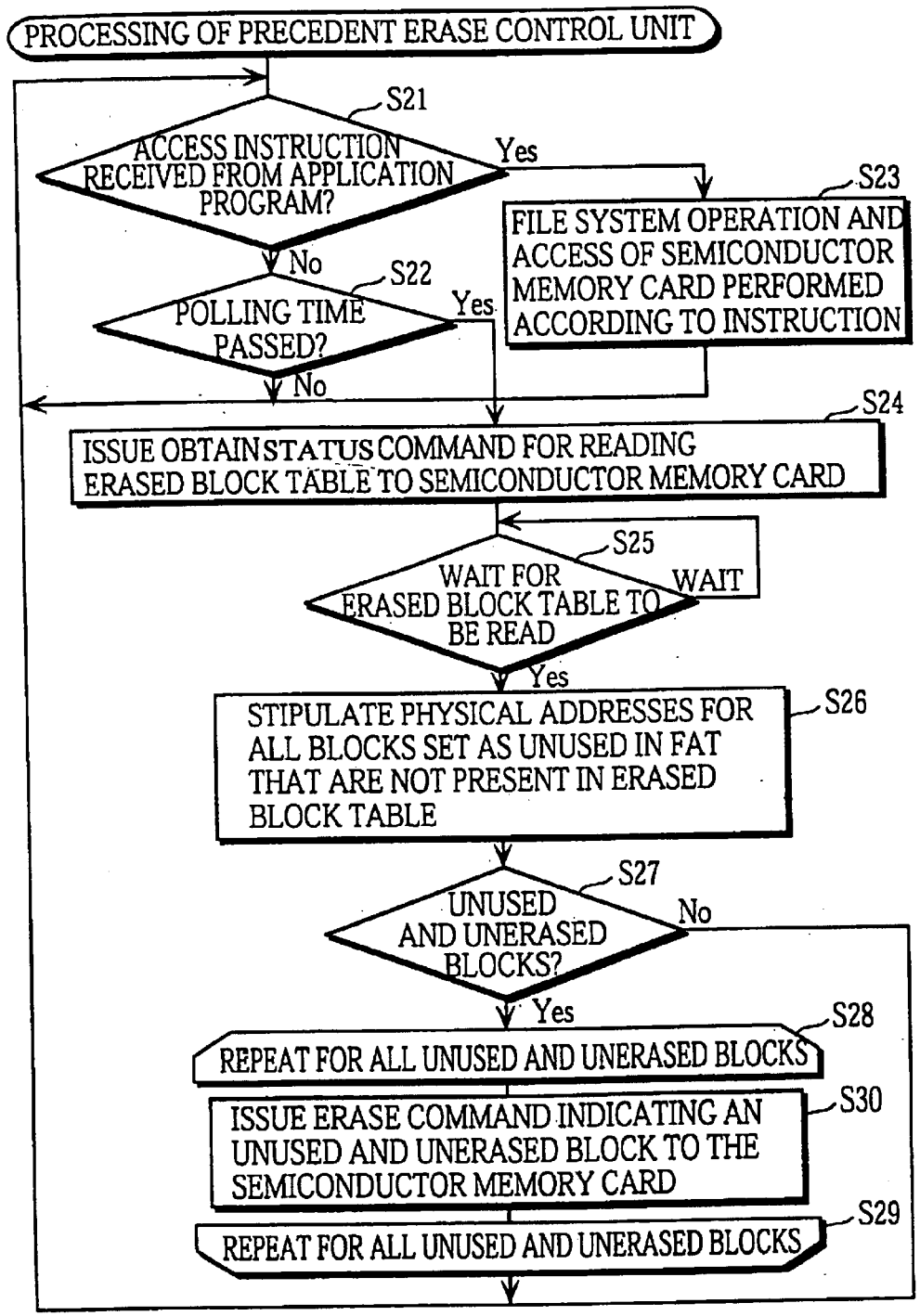
FIG. 25 is a flowchart showing detailed processing performed by the file system operation unit 9 in the fourth embodiment.

Next, the processing of the precedent erase control unit 29 in the fourth embodiment is explained. The precedent erase control unit 29 performs erasure of erasable blocks while waiting for instructions from the application program 8. The erasing procedure is the same as that described in the third embodiment, and is shown in the flowchart of FIG. 25. This flowchart is identical to that shown in FIG. 22, apart from the fact that 'erased block list' has been changed to 'erased block table', and since there is no great variation in content, a detailed description is omitted here. Next, the processing performed by the precedent erase control unit 29 in the fourth embodiment is described with reference to FIGS. 26A and 26B.

Figure 26A:
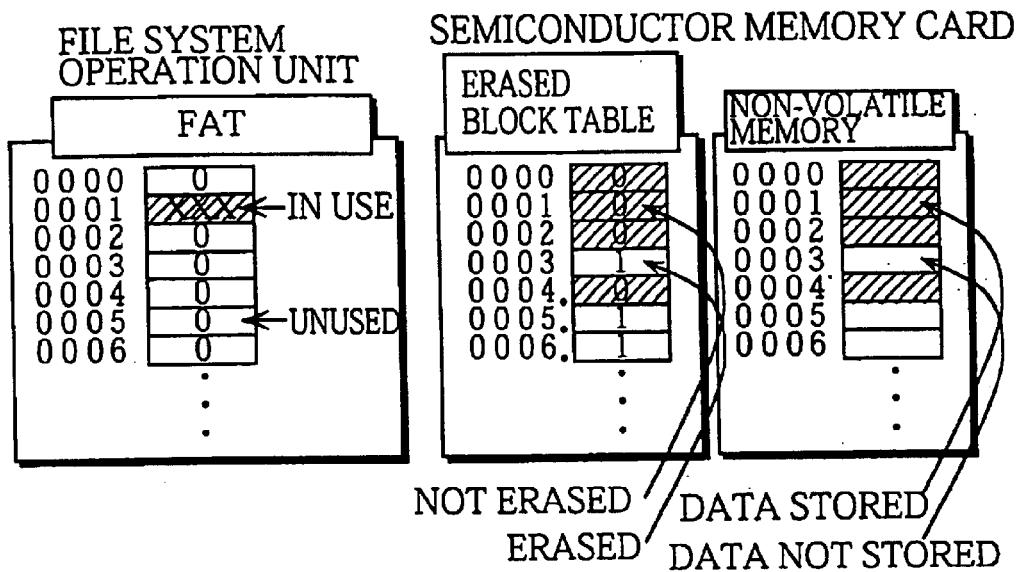
FIGS. 26A and 26B show an erasing process performed on an erasable block in the fourth embodiment.
Figure 26B:
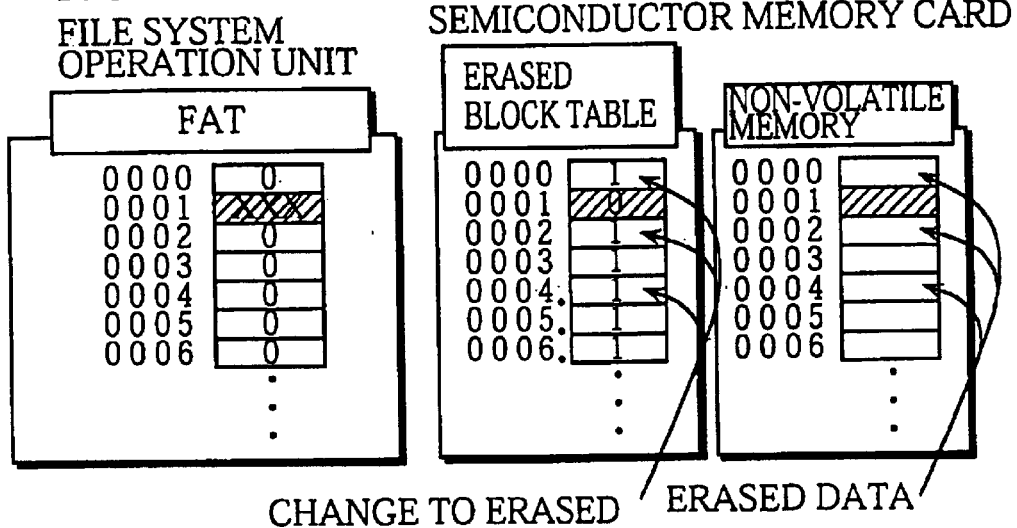

In an initial state shown in FIG. 26A, a block with an address 0001 is managed as a block in use, and blocks with addresses 0003, 0005, and 0006 are managed in the erased block table as blocks from which data has been erased. Data is stored in blocks in the nonvolatile memory that have been shaded in the drawing (addresses 0000, 0001, 0002, 0004). In this initial state, if blocks which are not in use but contain data exist, and write commands to write data into these unused blocks are generated, data erasure processing is required. In this embodiment, if the precedent erase control unit 29 is waiting for an instruction from the application program 8, and the predetermined polling time has passed (step S21, No, step S22, Yes), the precedent erase control unit 29 reads the erased block table by issuing an obtain status command to the semiconductor memory card 100 (step S24), and compares the read erased block table with the FAT (step S25). As a result of this comparison, blocks that are set as unused in the FAT and whose logical addresses are not managed by the erased block table (erasable blocks with addresses 0000, 0002, 0004) are found (step S26). In FIG. 26, '0' is set in both the FAT and the erased block table for blocks with addresses 0000, 0002, and 0004, so these blocks are unused and as yet unerased blocks. Since these blocks are not in use, and thus contain data that may be safely erased, the precedent erase control unit 29 issues erase commands, to set a value '1' for each of the corresponding addresses in the erased block table, indicating that these blocks are to be erased (steps S28 to S30). As a result, all the data in unused blocks is erased, and these blocks are then managed by the erased block table as erased blocks. Therefore, procedure for performing data writing by allocating unused blocks described later in this specification can be performed without requiring any erasure processing, and high-speed data writes can be achieved.

Fifth Embodiment

The fifth embodiment proposes a solution to the problem of file fragmentation. File fragmentation conventionally refers to the process in which a file is divided into a plurality of file sections and these sections are then stored non-consecutively in the memory. If a plurality of file sections are stored non-consecutively on a recording medium such as an optical disc or a magnetic disc, a large number of disc seeks are required to read the non-consecutively stored file sections, and the read processing time is lengthened. In order to resolve the problems created by such fragmentation, the file system operation unit 9 reads the non-consecutively stored file sections, and stores them again consecutively in the memory (defragmentation). If the above processing is performed, the file sections forming a file can be read smoothly without requiring any disc seeks to be performed, enabling data to be read at high speed. This completes the summary of the solution provided to resolve the problem of fragmentation in discs. Next, fragmentation occurring in the semiconductor memory card 100 is considered. Disc seeking is not required when reading data from the semiconductor memory card 100, so if the file sections are stored non-consecutively, there is no likelihood that processing will be lengthened for this reason.

However, although disk seeks are not a problem, fragmentation causes both 1. overhead generated when commands are issued, and 2. cache misses generated when the FAT is read (both described in more detail below) to increase considerably, thereby lengthening the time required to read a file.

1. Overhead Generated when Commands are Issued

Figure 27A:
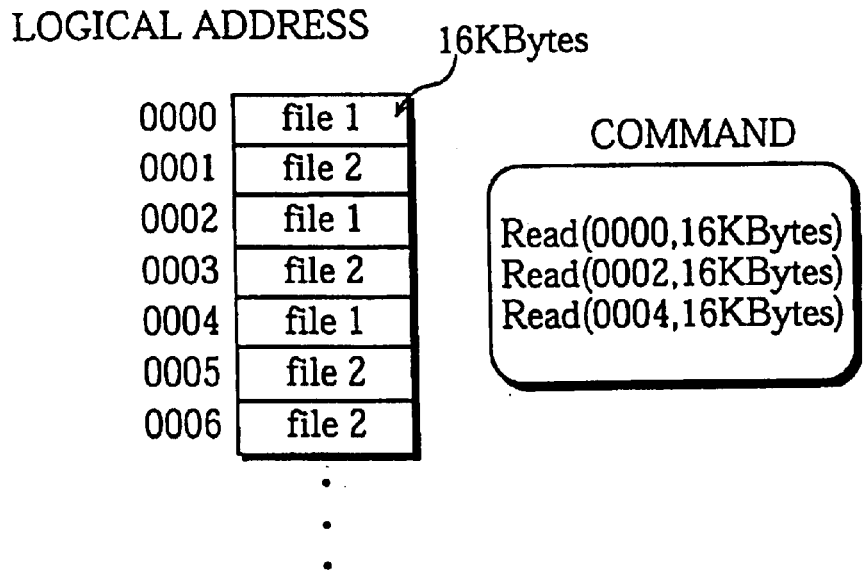
FIGS. 27A and 27B show the relationship of cause-and-effect between fragmentation and overheads when a command is issued.
Figure 27B:
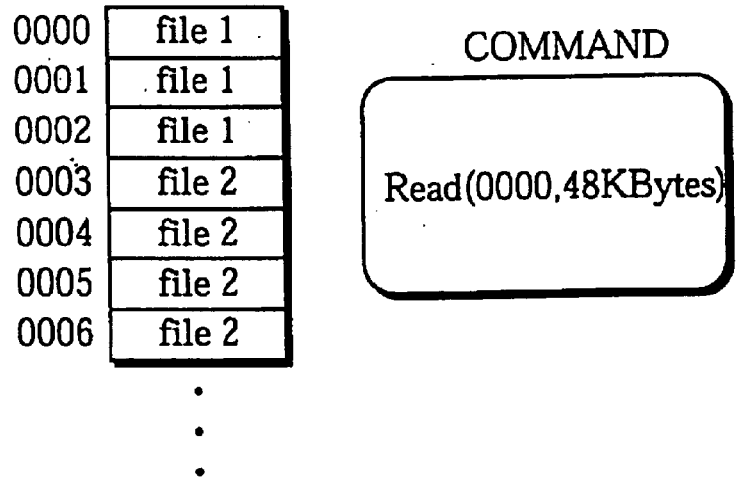

The impact that fragmentation has on the overheads generated when commands are issued can be more easily understood if described with reference to FIGS. 27A and 27B. FIG. 27A illustrates a situation in which a 48 KB file is divided into three 16 KB file sections and stored at random in three areas. FIG. 27B illustrates a situation in which a 48 KB file is stored in consecutive memory areas. In FIGS. 27A and 27B, the file system operation unit 9 issues a read command in the format 'Read (add, size)' to the nonvolatile memory to have a data read performed. Here, 'add' represents a logical address of a read destination, and 'size' represents the size of the data that is to be read. The time taken by each read command is the sum of a data read time that is proportional to the length of the read data, and a fixed overhead time required to issue the read command. In the data arrangement shown in FIG. 27A, a file 1 must be read by issuing three read commands: 'Read(0000, 16 KByte)', 'Read(0002, 16 KByte)', and 'Read(0004, 16 KByte)'. This means that the time required to read this file is 36 ms (=(8+4)×3). On the other hand, if data is arranged as in FIG. 27B, the entire 48 KB of data for the file can be read simply by issuing one command 'Read(0000, 48 KByte)'. Consequently, the time taken to read the file in this case is 28 ms (=(8×3+4)). Thus, it can be seen that the overhead generated when commands are issued increases in proportion to degree of randomness with which file sections are stored.

2. FAT Cache

A FAT cache is an anticipatory read of the FAT arranged in the system area of the semiconductor memory card 100 to the internal memory of the access apparatus 200, which allows the FAT to be referred to at high speed by accessing the internal memory. The FAT is cached frequently if the access apparatus 200 is a portable device with a small-scale internal memory. The FAT is cached by sequentially reading sections of the FAT that have been stored consecutively in the memory. However, if FAT fragmentation has been generated, caching the FAT will involve reading both sections containing the FAT and sections contained other data in order to the internal memory. If data other than FAT sections is read to the internal memory, a large quantity of data which is not the object of the cache will be read, thereby generating a cache miss. If a large number of such cache misses are generated, the number of reads to the internal memory will increase correspondingly, and so the time required to read the FAT will be lengthened.

Despite the present of these two problems, applying the same means to resolve fragmentation in the semiconductor memory card 100 as was used to solve the problem in a disc is not a wise course of action. The reason for this is that modifying data stored in blocks in the semiconductor memory card 100 requires erasure of the stored data, and such erasure requires a longer processing time than is required when equivalent processing is performed on a disc. In this embodiment, changing the correspondences between physical addresses and logical addresses is proposed as a countermeasure to combat the increases in command overheads and cache misses generated when fragmentation occurs. In other words, the correspondences between physical addresses and logical addresses are changed so that the blocks in which FAT sections are stored can be shown consecutively using logical addresses, without needing to change their physical arrangement in the memory.

When a 48 KB file is divided into three 16 KB sections and stored in three separate memory areas, as in FIG. 27A, the access apparatus 200 can read the file sections stored in these three areas (blocks) provided that the logical addresses for the blocks are indicated consecutively. Reading is performed by issuing one read command indicating the first of the plurality of logical addresses, and the data length of the file (here 48 KB). Furthermore, if the FAT is divided into three sections, and stored in three memory areas (blocks), the access apparatus 200 can read non-consecutively stored FAT sections to the internal memory in order, provided that the logical addresses for the blocks are indicated consecutively.

Here, reading is performed by issuing read commands indicating each of the consecutive logical addresses as read destinations in turn. If such processing is performed, cache misses are no longer generated. Thus, even if a plurality of file and FAT sections are stored at random in a plurality of areas, these areas can be allocated consecutive logical addresses, resolving the problem of overheads generated when read commands are issued, and enabling the generation of cache misses to be avoided.

Figure 29A:
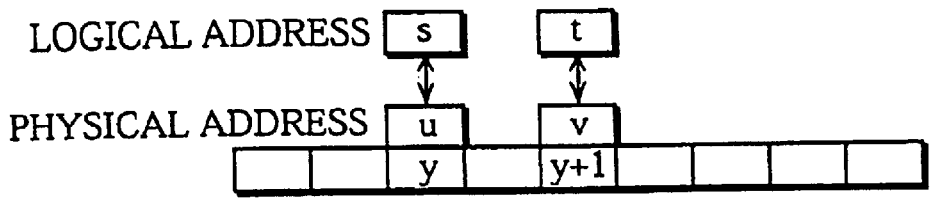
FIGS. 29A to 29D show models envisaged for each of variables s, t, u, v, and y shown in the flowchart of FIG. 28.

The processing performed by the precedent erase control unit 29 to resolve the issue of fragmentation using logical addresses is explained with reference to the procedure shown in the flowchart of FIG. 28. FIG. 29, which shows actual objects to which variables t, u, v, and y in the flowchart correspond, is also referred to during this explanation. At step S50, the precedent erase control unit 29 sets initial values for the variables x and y (x←1, y←1). This means that processing is to be performed on a first section of a first file. Next, at step S51, the precedent control unit 29 compares positions of a logical address s, corresponding to a block storing a yth section of an xth file, and a logical address t, corresponding to a block storing a y+1th section of the xth file, to determine whether these blocks are adjacent. When, as shown in FIG. 29A, the yth section and the y+1th section are stored in non-adjacent erasable blocks, in the order of y→y+1, step S52 is Yes, and the precedent erase control unit 29 moves to step S54.

Figure 29B:
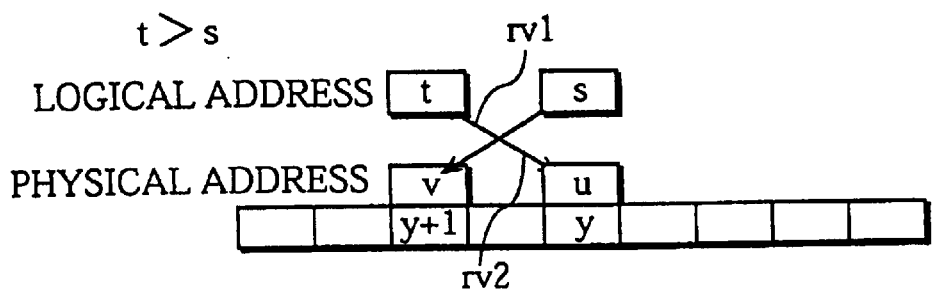
Figure 29C:
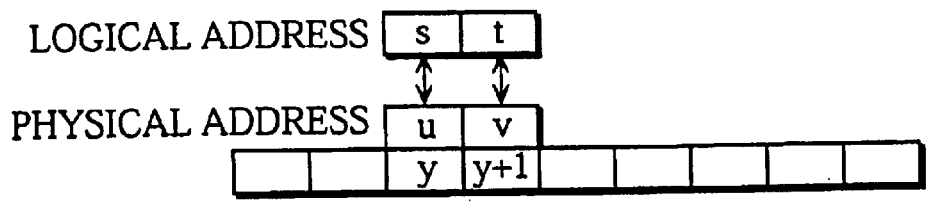
Figure 29D:
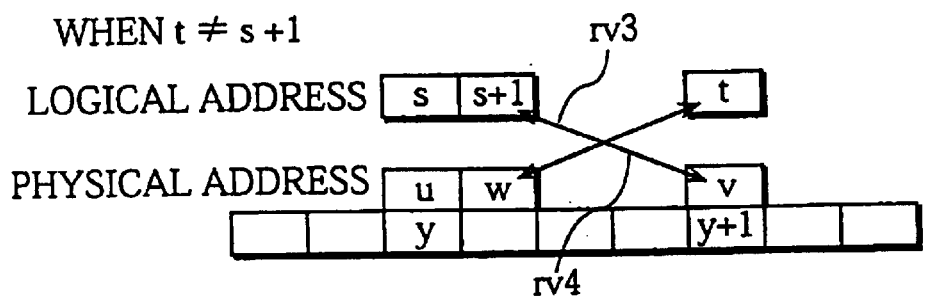

When the sections are stored in the order y+1→y, as shown in FIG. 29B, the precedent erase control unit 29 moves to step S53, and allocates a physical address u to the logical address t, and a physical address v to the logical address s. As a result, the allocation of physical addresses to logical addresses changes as shown by the arrows rv1 and rv2 in FIG. 29B. Next, at step S54, the precedent erase control unit 29 judges whether the logical address of the erasable block storing the yth section, and the logical address of the erasable block storing the y+1th section are consecutive. If the erasable block storing the y+1 section immediately follows the erasable block storing the yth section, as shown in FIG. 29C, a relationship s+1=t is established, so that step S54 is Yes, and processing moves to step S56. If the erasable blocks storing the yth section and they +1th section are non-adjacent, the relationship s+1=t is not established, so step S54 is No, and processing moves to step S55. Here, if a physical address corresponding to the logical address s+1 is w, at step S55, the physical address v for the erasable block storing the y+1th section is allocated to the logical address s+1, and the physical address w is allocated to the logical address t. If the processing of step S55 is executed when the yth and the y+1th sections are stored as shown in FIG. 29D, address correspondences are changed as shown by the arrows rv3 and rv4.

Once the above processing has been completed, at step S56, the precedent erase control unit 29 judges whether the variable y is a last section number. If y is not the last number, the precedent erase control unit 29 increments y at step S57, and processing moves to step S51. The processing of steps S51 to S57 is repeated for each of the sections in an xth file by performing the check of step S56, and the incrementing of y at step S57.

If, on the other hand, step S56 is Yes, the precedent control erase unit 29 judges whether x is the last file number, at step S58, and if the answer is No, moves to step S59, increments the variable x (x←x+1), and sets an initial value for the variable y at step S60. Thus, the processing of steps S51 to S57 is repeated for all files by performing the check of step S58, and the incrementing of the variable y at step S59.

Figure 30A:
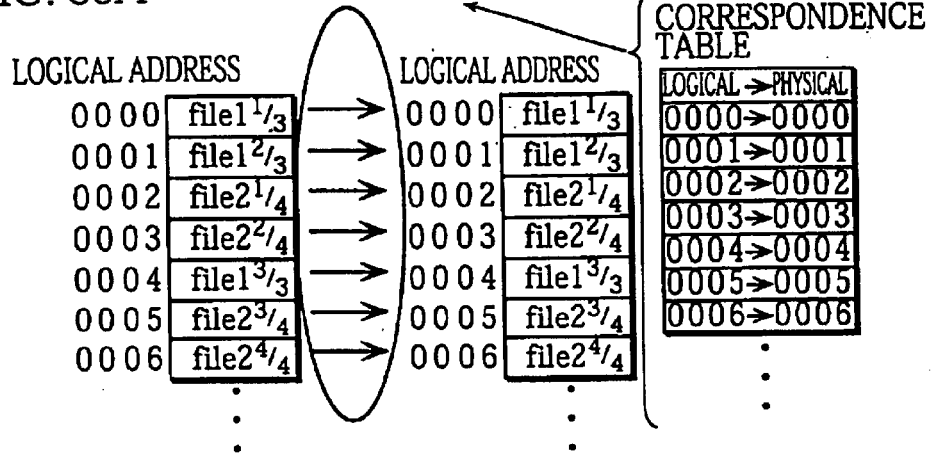
FIGS. 30A to 30C shows how fragmentation is eliminated in a fifth embodiment.
Figure 30B:
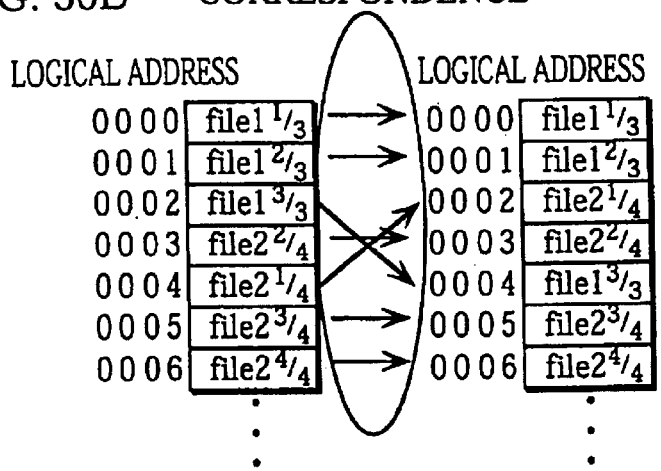
Figure 30C:
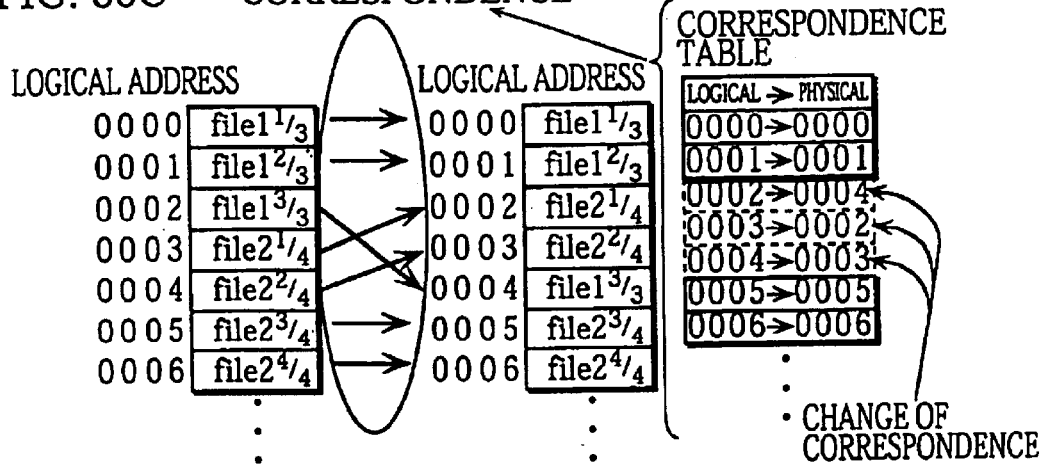

The resolution to the problems posed by fragmentation proposed in this embodiment is explained with reference to an actual example shown in FIG. 30. In the initial state shown in FIG. 30A, sections file 1-1/3, file 1-2/3, and file 1-3/3 forming a file 1 are stored in erasable blocks corresponding to logical addresses 0000, 0001, and 0004. In addition, sections file 2-1/4, file 2-2/4, file 2-3/4, and file 2-4/4 forming a file 2 are stored in erasable blocks corresponding to logical addresses 0002, 0003, 0005, and 0006.

Section file 2-1/4 is stored in an erasable block corresponding to an address (logical address 0002) following the logical address 0001 in which file section file 1-2/3 is stored, and section file 1-3/3 is stored in an erasable block corresponding to a logical address 0004.

If the processing in the flowchart of FIG. 28 is applied to the example in this drawing, sections file 1-1/3 and file 1-2/3 correspond respectively to the logical addresses 0000, and 0001, so that these sections are arranged in the same order as the corresponding logical addresses, and their correspondences are not interchanged. However, if the relationship between sections file 1-2/3, and file 1-3/3 is considered, it can be seen that while the erasable block storing the section file 1-2/3 corresponds to the logical address 0001, the erasable block corresponding to the next logical address 0002 is file 2-1/4. Consequently, step S54 is No, and processing moves to step S55. Then, at step S55, the correspondence between the logical and physical addresses of the erasable block storing the section file 1-3/3, and the correspondence between the logical and physical addresses of the erasable block storing the section file 2-1/4 are interchanged. As a result, the sections file 1-2/3, and file 1-3/3 can be shown by consecutive logical addresses, so that the physical address 0002 of the erasable block storing the file section file 2-1/4 is allocated the logical address 0004, and conversely the physical address 0004 of the erasable block storing the section file 1-3/3 is allocated the logical address 0002. The correspondences between physical and logical addresses following this change are shown in FIG. 30B. Once processing for section file 1-3/3 has been completed, the processing for section file 2-2/4 is performed. In FIG. 30B, the relationship between sections file 2-1/4, and file 2-2/4 is such that section file 2-1/4 is stored in an erasable block corresponding to the logical address 004, and the next section file 2-2/4 is stored in an erasable lock corresponding to the logical address 0003. Thus, the logical addresses attached to these sections should be in the reverse order. As a result, step S52 is No, and processing moves to step S53, where the order of addresses corresponding to the sections file 2-1/4, and file 2-2/4 is interchanged. Here, the physical address 0002 corresponding to an erasable block storing the section file 2-1/4 is allocated to the logical address 0003, and the physical address 0003 corresponding to the erasable block storing the section file 2-2/4 is allocated to the logical address 0004. As a result of this processing, the file sections forming files 1 and 2 are all indicated by consecutive logical addresses.

In this embodiment, even if file sections are stored in non-consecutive memory areas, these memory areas can be allocated consecutive logical addresses, thereby reducing the overheads generated when read commands are issued, and cache misses occurring when the FAT and files are cached.

Sixth Embodiment

The sixth embodiment describes an improvement applied when a variety of contents are recorded in the nonvolatile memory via a distribution service, and the recorded contents reproduced on a portable player. In this case, files having a variety of attributes, such as music, images, games, and text, are likely to be stored on the semiconductor memory card 100. Should there be differences in whether files are readable or editable depending on file type, the file system operation unit 9 in the access apparatus 200 needs to check the contents of the file before performing reading or editing. If such a check is required each time a file is read or edited, the processing performed by the file system operation unit 9 will become complicated. Consequently, universal disc format (UDF) used in digital versatile discs (DVDs) sets an extended attribute for each file, enabling the type of data stored in a file to be recognizable at a glance, without there being any need to check the contents of the file.

Figure 31:
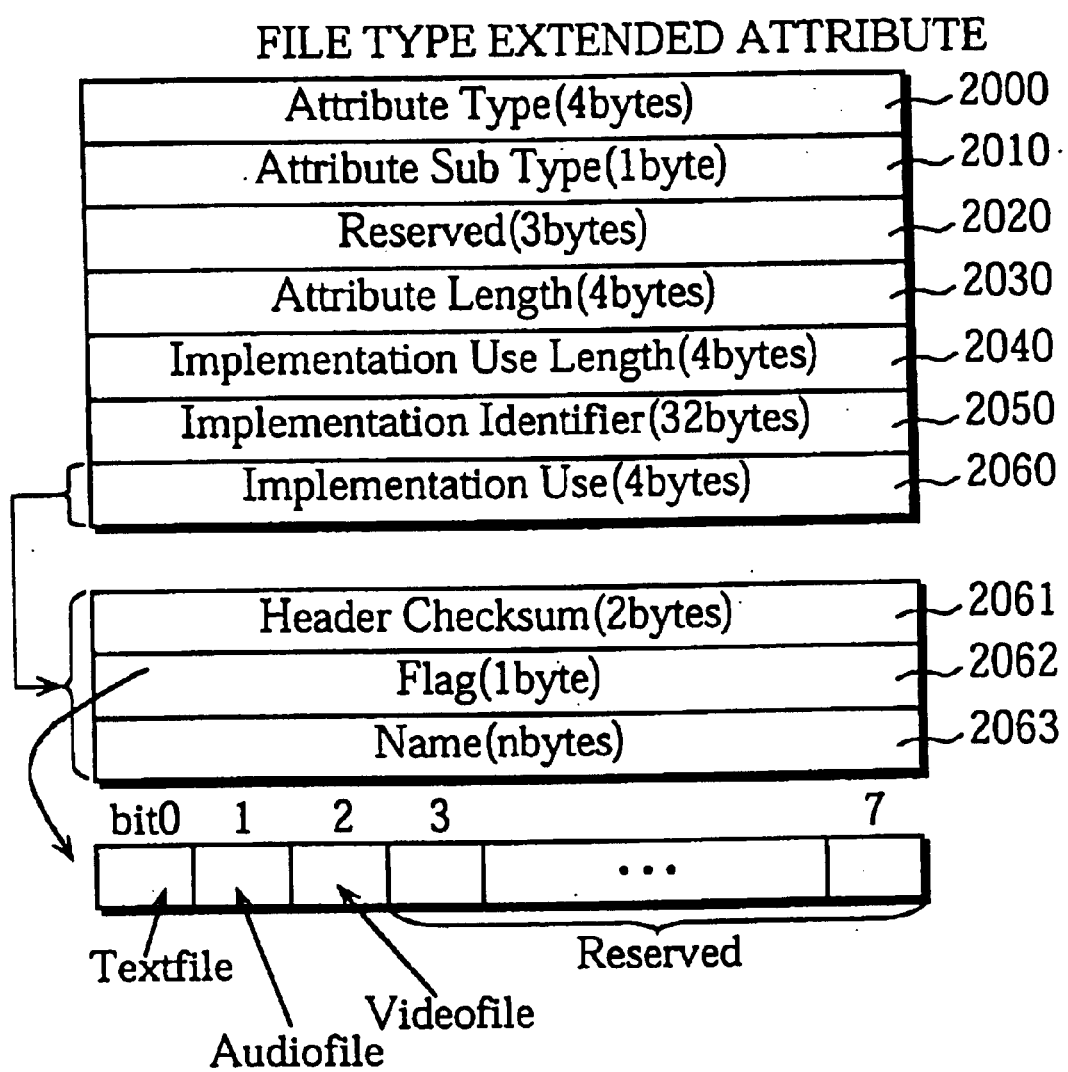
FIG. 31 shows a new extended attribute specified using an implementation use extended attribute in UDF.

FIG. 31 shows an example of an extended attribute. The attribute shown in the drawing is a new type of extended attribute formed based on an implementation use extended attribute in the UDF. The extended attribute includes an attribute type 2000, an attribute subtype 2010, a reserved area 2020, an attribute length 2030, an implementation use length 2040, an implementation identifier 2050 (these are identical to fields in the implementation use extended attribute in the UDF, so a more detailed explanation is omitted here), and an implementation use 2060. The implementation use 2060 includes a header checksum 2061 storing a checksum for the header section of the extended attribute, a name 2063 storing a file name, and a flag 2062 storing a file attribute. Each bit in the flag 2062 is set at '0' or at '1' to illustrate a file attribute. The first bit of the flag 2062 shows whether the corresponding file is a text file, the second bit shows whether the corresponding file is an image file, and an area from the third bit onward is a reserved area.

If this extended attribute is stored in the semiconductor memory card 100, one difficulty is immediately evident. This is that the volume management information of the semiconductor memory card 100 is compliant with the data structure set out in the TSO/TEC 9293 standard, as previously explained, and so there is no provision for giving each file an extended attribute.

Figure 32:
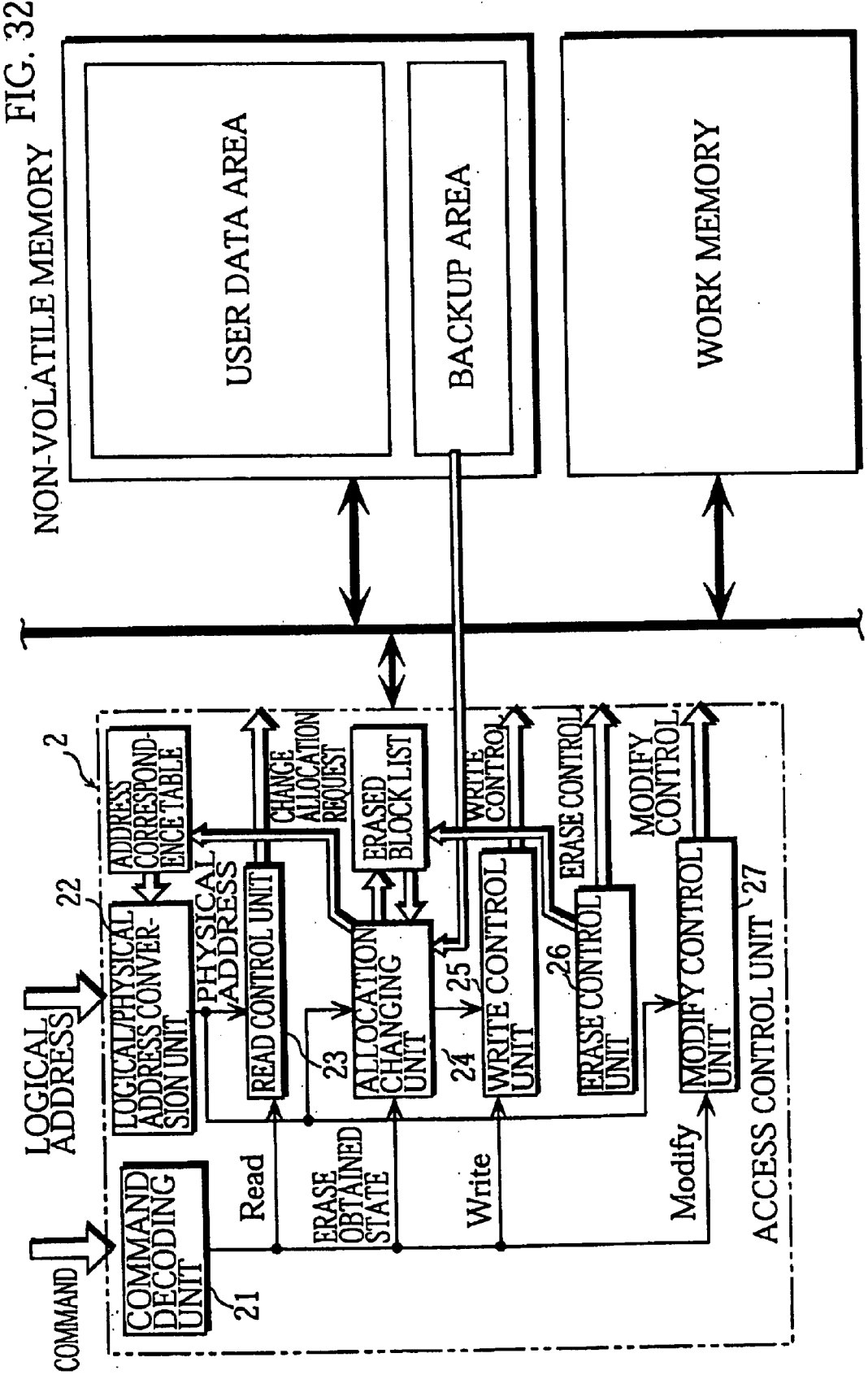
FIG. 32 shows an internal structure of a semiconductor memory card provided with a backup area.

In this embodiment, the extended attribute is stored in at least one of the protected area and a backup area. The protected area has already been explained in the second embodiment, so further explanation is omitted here. The backup area is managed separately from the normal partition in the user area. When a defective sector appears in the user area of the nonvolatile memory, the allocation changing unit 24, chooses a sector from the backup area to replace the defective sector. FIG. 32 shows an internal structure of a semiconductor memory card 100 that is provided with the defective sector. New extended attributes that cannot be defined in a FAT file system can be set for each file by storing such attributes in the protected area or the backup area. Furthermore, since the user area and user data area used by a general user utilize a conventional file system that is totally independent of the newly set extended attributes, the system is compatible with other systems. In addition, since the access apparatus 200 need only implement the operations necessary for each file type, fewer operations are implemented by the access apparatus 200, thereby enabling the memory size of the access apparatus 200 to be reduced. Furthermore, since the file type for each file can be judged just by referring to the extended attribute information rather than referring to the contents of the file, high-speed operations can be realized.

Seventh Embodiment

Figure 33:
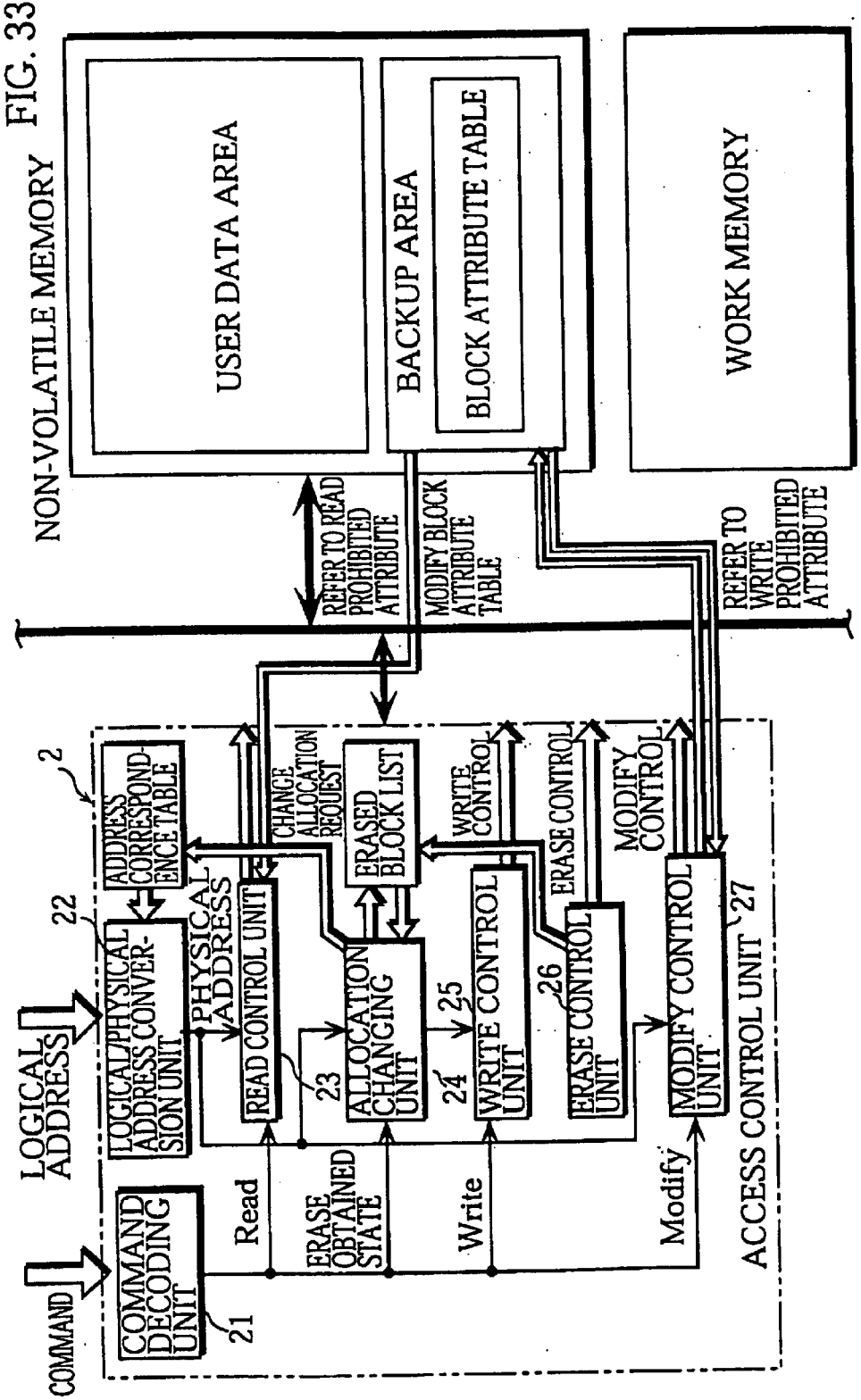
FIG. 33 shows an internal structure of a semiconductor memory card in a sixth embodiment.

This embodiment proposes that files in a FAT file system be set as write prohibited and read prohibited to further improve file protection. In a conventional FAT file system, attributes for individual files, such as write prohibited and read prohibited, can be set in file entries. The file system operation unit 9 in the access apparatus 200, when connected to the semiconductor memory card 100, reads and holds volume management information, and refers to the file attribute for a particular file to judge whether the file can be read or written. Provided that the application program 8 in the access apparatus 200 accesses the semiconductor memory card 100 via the file system operation unit 9, the attributes in the file entries are valid. However, if the application program 8 accesses the semiconductor memory card 100, bypassing the file system operation unit 9 and performing a write or read by issuing a direct write or read command to the semiconductor memory card 100, any write prohibited or read prohibited attributes set in the file entries will be meaning less. Here, this embodiment proposes that the semiconductor memory card 100 be structured as shown in FIG. 33, so that write prohibited and read prohibited attributes will be valid even if the application program 8 accesses the semiconductor memory card 100 directly. FIG. 33 shows an internal structure of a semiconductor memory card 100 in the seventh embodiment. The characteristics of this drawing are that the nonvolatile memory 1 has a backup area, which contains a block attribute table.

The block attribute table is made up of entries corresponding to erasable blocks included in the volume area. If an entry is set at '1', the corresponding block is write prohibited. Furthermore, if an entry is set at '2', the corresponding block is read prohibited. The file system operation unit 9 and the access control unit 2 disclosed in the fifth embodiment perform operations on the block attribute table, as well as on file entries. If the application program 8 instructs the file system operation unit 9 to open a file for which an attribute has been set, the file system operation unit 9 sets the attribute in the file entry corresponding to this file. For example, if the application program 8 has been instructed to set a file as write prohibited, the attribute for the corresponding file entry is set as write prohibited. If the application program 8 has been instructed to set a file as read prohibited, the attribute for the corresponding file entry is set as read prohibited. If the application program 8 has been instructed to set a hidden attribute, the file system operation unit 9 sets a read prohibited attribute in the corresponding file entry.

If file attributes are set in file entries in this fashion, the file system operation unit 9 divides a file into cluster-sized sections, and records these sections in a plurality of clusters in the user area. Following recording of the file sections in the clusters, the file system operation unit 9 sets the file attribute in entries in the block attribute table that correspond to each of the erasable blocks in which the file is stored. If writing of the file is prohibited, the file system operation unit 9 sets a write prohibited attribute in entries corresponding to each of the clusters storing the file sections, and if the file attribute is read prohibited, sets a read prohibited attribute in entries corresponding to each of the clusters storing the file sections. If the file attribute is a hidden attribute, the file system operation unit 9 sets a read prohibited attribute in entries corresponding to each of the clusters storing the file sections.

If the file is recorded in the user area in this way, data is read from or written to blocks according to attributes shown in the block attribute table. In other words, if a read command is issued by the access apparatus 200, the read control unit 23 refers to an entry in the block attribute table corresponding to the read destination address. If the entry shows that reading is permitted, the read control unit 23 reads data from the block shown by the read destination address, or if the entry shows that reading is prohibited, does not read data from the block shown by the read destination address.

If a write command is issued by the access apparatus 200, the write control unit 25, or the modify control unit 27, refers to the entry in the block attribute table corresponding to the write destination address. If the entry shows that writing is permitted, the write control unit 25, or the modify control unit 27, writes data into the block shown by the write destination address, and if the entry shows that writing is prohibited, does not write data into the block shown by the write destination address.

This kind of write and read control can be performed both when the application program 8 issues a write or read command via the file system operation unit 9, and when the application program 8 issues a write or read command directly, bypassing the file system operation unit 9. Thus writing and reading of blocks can be restricted whether the access apparatus 200 issues commands via the file system operation unit 9 or not. The file system operation 9 in the present embodiment is explained with reference to an actual example in FIG. 34. In FIG. 34A, data contained in a file 1 is stored in erasable blocks with addresses 0000, 0002, and 0003, data contained in a file 2 is stored in erasable blocks with addresses 0001 and 0004, data contained in a file 3 is stored in an erasable block with an address 0005, and data contained in a file 4 is stored in an erasable block with an address 0006. FIG. 34B shows a situation, when a file 1, for which a write prohibited attribute has been set, is stored. In a block attribute table, entries corresponding to blocks storing sections of file 1 (addresses 0000, 0002, and 003) are set at '1' indicating a write prohibited attribute. If the block attribute table is set in this way, the write control unit 25 will reject commands to perform write processing on the blocks with addresses 0000, 0002, and 0003.

FIG. 34C shows a situation when a file 2, for which a read prohibited attribute has been set, is stored in the nonvolatile memory 1. In this case, a flag indicating a read prohibited attribute is set in entries in the block attribute table that correspond to the file 2. Then, the file 2 is divided into a plurality of sections, and these sections are stored in a plurality of blocks in the user area.

When the file sections of file 2 are stored in blocks with logical addresses 0001 and 0004, entries in the block attribute table that correspond to these blocks are set at '2', indicating a read prohibited attribute. If the block attribute table is set in this way, the read control unit 23 rejects commands to read data from blocks having the addresses 0001 and 0004.

In the above embodiment, read prohibited and write prohibited attributes corresponding to each block can be set in the semiconductor memory card 100, so that even if the application program 8 accesses the semiconductor memory card 100 directly, bypassing the file system operation unit 9, access of files which is prohibited can be prevented by the semiconductor memory card 100. Therefore, by setting read prohibited and write prohibited attributes for blocks storing a file in this way, protection of the file can be assured, and, should the file be copyrighted, copyright protection can also be achieved.

In this embodiment, the flag showing the write prohibited attribute is shown by '1', and the flag showing the read prohibited attribute is shown by '2', but these are merely examples, and the invention need not be limited to such flags. Furthermore, in this embodiment, a block attribute table is used to attach read and write prohibited attributes to each block in the nonvolatile memory 1, but provided that an attribute can be set for each individual block, a list or similar structure may be used. In this embodiment, a method for setting read and write prohibited attributes in the nonvolatile memory 1 as block attributes is described, but information other than that described in the embodiments may be used as block attributes. Examples include managing blocks so that only users with a root privilege can obtain access, or giving each block a user ID, and allowing only users in possession of that ID to obtain access, or setting access privileges to blocks for each individual user. In the above explanation of the file system, a FAT file system is used, but similar effects may be obtained by using other conventional file systems such as UDF or the New Technology File System (NTFS) used in WindowsNT™, or a customized file system. Furthermore, in these embodiments, the number of sectors contained in one erasable block is 32, but this is just one example, and the number of sectors in one erasable block may be more or less than this.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A semiconductor memory card comprising:
   a memory area having a data structure including:
      a plurality of sectors wherein data in each group of $2^j$ sectors (j being 0 or a positive integer) is managed as a cluster, one or more clusters is managed as a file, each group of $2^i$ consecutive sectors in the memory area form a block (i being 0 or a positive integer), and a block is a smallest unit on which data erasure can be performed;
      a first area comprising: a first block including a first sector having a master boot record and a partition table recorded therein; a predetermined number of skipped sectors; and at least one block different from the first block including subsequent sectors having partition boot sector information, a file allocation table, and a root directory entry recorded therein such that an end of the root directory entry aligns with an end of the first area;
      a second area; and
      a backup area having attribute information of the blocks recorded therein.

2. The semiconductor memory of claim 1, wherein:
   the attribute information indicates at least one of write prohibited and read prohibited.

3. The semiconductor memory of claim 1, wherein:
   the attribute information indicates at least one of: only users with a root privilege can obtain access; only users with a user ID can obtain access; and information for setting access privileges for each user.

4. The semiconductor memory of claim 1, wherein the backup area includes:
   a sub-backup area that has sectors which, when defective sectors appear in at least one of the first area and the second area, are to replace the defective sectors.

5. The semiconductor memory of claim 4, wherein:
   the sub-backup area includes a block attribute table for recording attribute information of the block.

6. An access apparatus for performing file access on a semiconductor memory card that has a memory area comprising a plurality of sectors by managing data in each group of $2^j$ sectors (j being 0 or a positive integer) as a cluster, and managing one or more clusters as a file, each group of $2^i$ consecutive sectors in the memory area forming a block (i being 0 or a positive integer), a block being a smallest unit on which data erasure can be performed, said access apparatus comprising:
   a calculation unit operable to calculate a size of volume management information including a master boot record, a partition table, partition boot sector information, a file allocation table, and a root directory entry;
   a reserving unit operable to reserve a first area having two or more blocks, a second area, and a backup area; and
   a recording unit operable to record the master boot record and the partition table in a first sector of a first block of the first area, skip a predetermined number of sectors and then record the partition boot sector information, the file allocation table, and the root directory entry in subsequent sectors in order to align an end of the first area with an end of the root directory entry, record user data in the second area, and record attribute information of the blocks in the backup area, wherein the partition boot sector information, the file allocation table, and the root directory entry are recorded in at least one block which is different from the first block.

7. The access apparatus of claim 6, wherein:
   the attribute information indicates at least one of write prohibited and read prohibited.

8. The access apparatus of claim 6, wherein:
   the attribute information indicates at least one of: only users with a root privilege can obtain access; only users with a user ID can obtain access; and information for setting access privileges for each user.

9. The access apparatus of claim 6, further comprising:
   an attribute determining unit operable to determine the attribute information of the blocks by referring to the attribute information recorded in the backup area.

10. The access apparatus of claim 9, further comprising:
    an access judgment unit operable to judge whether the user data can be accessed, based on the attribute determined by the attribute determining unit.

11. The access apparatus of claim 10, wherein:
    said access judgment unit manipulates the user data.

12. The access apparatus of claim 6, wherein the backup area includes:
    a sub-backup area that has sectors which, when defective sectors appear in at least one of the first area and the second area, are to replace the defective sectors.

13. The access apparatus of claim 12, wherein:
    the sub-backup area includes a block attribute table for recording attribute information of the block.

14. An initialization method for initializing a computer to perform file access on a semiconductor memory card that has a memory area comprising a plurality of sectors, by managing data in each group of $2^j$ sectors (j being 0 or a positive integer) as a cluster, and managing one or more clusters as a file, each group of $2^i$ consecutive sectors in the memory area forming a block (i being 0 or a positive integer), a block being a smallest unit on which data erasure can be performed, said initialization method comprising:
    calculating a size of volume management information including a master boot record, a partition table, partition boot sector information, a file allocation table, and a root directory entry;

reserving a first area having two or more blocks, a second area, and a backup area; and recording the master boot record and the partition table in a first sector of a first block of the first area, skipping a predetermined number of sectors and then recording the partition boot sector information, the file allocation table, and the root directory entry in subsequent sectors in order to align an end of the first area with an end of the root directory entry, recording user data in the second area, and recording attribute information of the blocks in the backup area, wherein the partition boot sector information, the file allocation table, and the root directory entry are recorded in at least one block which is different from the first block.

15. A recording medium storing a program in a computer-readable format for initializing a computer to perform file access on a semiconductor memory card that has a memory area comprising a plurality of sectors, by managing data in each group of $2^j$ sectors (j being 0 or a positive integer) as a cluster, and managing one or more clusters as a file, each group of $2^i$ consecutive sectors in the memory area forming a block (i being 0 or a positive integer), a block being a smallest unit on which data erasure can be performed, said program being operable to cause the computer to:

calculate a size of volume management information including a master boot record, a partition table, partition boot sector information, a file allocation table, and a root directory entry;

reserve a first area having two or more blocks, a second area, and a backup area; and record the master boot record and the partition table in a first sector of a first block of the first area, skip a predetermined number of sectors and then record the partition boot sector information, the file allocation table, and the root directory entry in subsequent sectors in order to align an end of the first area with an end of the root directory entry, record user data in the second area, and record attribute information of the blocks in the backup area, wherein the partition boot sector information, the file allocation table, and the root directory entry are recorded in at least one block which is different from the first block.

16. The recording medium of claim 15, wherein:

the attribute information indicates at least one of write prohibited and read prohibited.

17. The recording medium of claim 15, wherein:

the attribute information indicates at least one of: only users with a root privilege can obtain access; only users with a user ID can obtain access; and information for setting access privileges for each user.

18. The recording medium of claim 15, wherein the backup area includes:

a sub-backup area that has sectors which, when defective sectors appear in at least one of the first area and the second area, are to replace the defective sectors.

19. The recording medium of claim 18, wherein:

the sub-backup area includes a block attribute table for recording attribute information of the block.

* * * * *